(12) United States Patent
Boebel et al.

(10) Patent No.: US 12,398,246 B2
(45) Date of Patent: Aug. 26, 2025

(54) POLYMERIC DISPERSANTS FROM PHENYL GLYCIDYL ETHER

(71) Applicant: Stepan Company, Northbrook, IL (US)

(72) Inventors: Timothy A. Boebel, Wilmette, IL (US); Xue Min Dong, Lincolnshire, IL (US); E. Carolina Rojas, Highland Park, IL (US); Renee Luka, Park Ridge, IL (US); Gary Luebke, St. James, MO (US); Paul W. Knox, Kenosha, WI (US)

(73) Assignee: STEPAN COMPANY, Northfield, IL (US)

( * ) Notice: Subject to any disclaimer, the term of this patent is extended or adjusted under 35 U.S.C. 154(b) by 0 days.

(21) Appl. No.: 18/582,837

(22) Filed: Feb. 21, 2024

(65) Prior Publication Data

US 2024/0209160 A1    Jun. 27, 2024

Related U.S. Application Data

(62) Division of application No. 16/836,544, filed on Mar. 31, 2020, now Pat. No. 11,939,434.

(51) Int. Cl.

| | |
|---|---|
| *A01N 25/04* | (2006.01) |
| *A01N 25/14* | (2006.01) |
| *A01N 37/34* | (2006.01) |
| *A01N 43/50* | (2006.01) |
| *A01N 43/653* | (2006.01) |
| *A01N 43/70* | (2006.01) |
| *C08G 65/26* | (2006.01) |
| *C08J 3/09* | (2006.01) |
| *C08L 71/02* | (2006.01) |
| *C09D 5/02* | (2006.01) |

(52) U.S. Cl.
CPC .............. *C08J 3/095* (2013.01); *A01N 25/04* (2013.01); *A01N 25/14* (2013.01); *A01N 37/34* (2013.01); *A01N 43/50* (2013.01); *A01N 43/653* (2013.01); *A01N 43/70* (2013.01); *C08G 65/2609* (2013.01); *C08G 65/2612* (2013.01); *C08G 65/2624* (2013.01); *C08G 65/2627* (2013.01); *C08G 65/263* (2013.01); *C08G 65/2636* (2013.01); *C08L 71/02* (2013.01); *C09D 5/022* (2013.01); *C09D 5/027* (2013.01); *C08J 2371/02* (2013.01); *C08J 2421/02* (2013.01); *C08L 2201/54* (2013.01)

(58) Field of Classification Search
CPC .......... C08J 3/095; A01N 25/04; A01N 25/14; A01N 37/34; A01N 43/50; A01N 43/653; A01N 43/70; C08G 65/2609; C08G 65/2612; C08G 65/2624; C08G 65/2627; C08G 65/263; C08G 65/2636; C08L 71/02; C09D 5/022; C09D 5/027
See application file for complete search history.

(56) References Cited

U.S. PATENT DOCUMENTS

| | | |
|---|---|---|
| 4,059,550 A | 11/1977 | Shimp |
| 4,839,460 A | 6/1989 | Molzahn |
| 5,470,813 A | 11/1995 | Le-Khac |
| 5,482,908 A | 1/1996 | Le-Khac |
| 5,508,324 A | 4/1996 | Cook |
| 5,825,273 A | 10/1998 | Roger |
| 6,825,273 B2 | 11/2004 | Duan et al. |
| 6,852,664 B2 | 2/2005 | Ooms |
| 7,169,956 B2 | 1/2007 | Suzuki |
| 7,388,068 B2 | 6/2008 | Falk |
| 7,442,724 B2 | 10/2008 | Esselborn |
| 7,605,224 B2 | 10/2009 | Falk |
| 7,812,114 B2 | 10/2010 | Falk |
| 8,367,762 B2 | 2/2013 | Jaunky |
| 9,221,947 B2 | 12/2015 | Blanco Gonzalez |
| 9,605,111 B2 | 3/2017 | Blanco Gonzalez |
| 2003/0120022 A1 | 6/2003 | Sunder |
| 2011/0257326 A1 | 10/2011 | Jaunky |
| 2015/0038654 A1 | 2/2015 | Ogasawara |

(Continued)

FOREIGN PATENT DOCUMENTS

| | | |
|---|---|---|
| BR | 112020006527 A2 | 10/2020 |
| CN | 1433441 | 7/2003 |

(Continued)

OTHER PUBLICATIONS

Australian Examination Report No. 1 issued in App. No. AU2018348031, dated Jul. 20, 2023, 4 pages.
Australian Examination Report No. 2 issued in App. No. AU2018348031, dated Sep. 7, 2023, 4 pages.

(Continued)

*Primary Examiner* — Alma Pipic

(74) *Attorney, Agent, or Firm* — DILWORTH IP, LLC

(57) ABSTRACT

Copolymers comprising recurring units of a phenyl glycidyl ether and alkylene oxides are disclosed. Some of the copolymers comprise a di- or polyfunctional nucleophilic initiator and recurring units of the phenyl glycidyl ether and an alkylene oxide. The di- or polyfunctional nucleophilic initiator is an alcohol, phenol, amine, thiol, thiophenol, sulfinic acid, or deprotonated species thereof. Other copolymers comprise a monofunctional nucleophilic initiator selected from thiols, thiophenols, aralkylated phenols, sulfinic acids, secondary amines, $C_{10}$-$C_{20}$ terpene alcohols, and deprotonated species thereof. Pigments dispersions comprising the copolymers are also disclosed. The copolymers meet the growing needs of the industry with their ease of manufacture, diverse structures, and desirable performance attributes for dispersing a wide range of organic and inorganic pigments. Agricultural applications for the copolymers are also disclosed.

6 Claims, No Drawings

(56) References Cited

U.S. PATENT DOCUMENTS

| | | |
|---|---|---|
| 2017/0081469 A1 | 3/2017 | Fiedel |
| 2017/0088667 A1 | 3/2017 | Fiedel |
| 2017/0218134 A1 | 8/2017 | Tuerk |

FOREIGN PATENT DOCUMENTS

| | | |
|---|---|---|
| CN | 1317314 C | 5/2007 |
| CN | 102292377 | 12/2011 |
| DE | 102009040068 A1 | 5/2010 |
| DE | 102009040064 A1 | 6/2010 |
| KR | 20010032049 | 4/2001 |
| KR | 20110097904 | 8/2011 |
| WO | 9324544 R | 12/1993 |
| WO | 9925768 A1 | 5/1999 |
| WO | 2004026468 A1 | 4/2004 |
| WO | 2013169676 A1 | 11/2013 |

OTHER PUBLICATIONS

Australian Notice of acceptance for your patent application issued in App. No. AU2018348031, dated Nov. 14, 2023, 2023, 4 pages.
Chinese Office Action (including English translation) issued for App. No. CN201880066353.8, dated Apr. 8, 2022, 19 pages.
Chinese Office Action (including English translation) issued for App. No. CN201880066353.8, dated Jul. 27, 2022, 14 pages.
Chinese Office Action (including English translation) issued for App. No. CN201880066353.8, dated Feb. 11, 2023, 15 pages.
European Patent Office Communication pursuant to Article 94(3) EPC issued in App. No. EP18797245, dated Jul. 5, 2022, 4 pages.
Suto et al., "The Preparation and Some Surfactant Properties of Long Chain Alcohol—Alkylene Oxide—Ethylene Oxide (RAE) Block Polymer Nonionics", 1982 vol. 31 Issue 9 pp. 598-604.
Yu et al., "Synthesis of a-Aliphatic and β-Aromatic Substituted Taurines via Regioselective Ring Opening of Thiiranes with Ammonia", Synthesis 2009(13): 2205-2209 (1 page abstract only).
Intellectual Property Office of Singapore—Written Opinion, Application No. 11202003036V, Issued Apr. 19, 2021, 6 pages.
Indian Examination Report for App. No. IN202027011932, dated Oct. 27, 2021, 6 pages.
Examination Report issued in App. No. SG11202003036V, dated May 20, 2022, 5 pages.
Substantive Examination Report (Restriction) issued in App. No. PH1/2020/550097, dated Jul. 28, 2022, 3 pages.
Subsequent Substantive Examination Report issued in App. No. PH1/2020/550097, dated Sep. 20, 2022, 3 pages.
Subsequent Substantive Examination Report issued in App. No. PH1/2020/550097, dated Jan. 26, 2023, 5 pages.
Office Action (Non-Final Rejection) dated Mar. 1, 2023 for U.S. Appl. No. 16/836,544 (pp. 1-9).
Korean Office Action (including English translation) issued in App. No. KR20207011899, dated May 28, 2023, 18 pages.
Office Action (Final Rejection) dated Jun. 23, 2023 for U.S. Appl. No. 16/836,544 (pp. 1-12).
Gao (Prog. Polym. Sci. Published 2004, pp. 183-187) (Year: 2004).
Sunder (Macromolecules 1999, 32, 4240-4246) (Year: 1999).
Office Action (Notice of Allowance and Fees Due (PTOL-85)) dated Dec. 6, 2023 for U.S. Appl. No. 16/836,544 (pp. 1-11).
Search Report issued in App. No. SG10202250501F, dated Jun. 13, 2024, 2 pages.
Search Report issued in App. No. SG10202250500D, dated Jun. 11, 2024, 3 pages.
Extended European Search Report and Search Opinion received for EP Application No. 24192847.2, mailed on Jan. 22, 2025, 7 pages.
Luke, S., Anonymous: "Access Agilent eNewsletter", Agilent, available online at: <https://www.agilent.com/en/ newsletters/accessagilent/2014/sep/gpctips>, Sep. 30, 2014, 3 pages.
Saunders, G., et al., "Fundamentals and Properties of Size-Exclusion Chromatography Packings and Columns", LCGC, vol. 30, No. 4, Apr. 1, 2012, pp. 46-53.
Stevens, M. P., "Polymer Chemistry: An Introduction, 3Rd Ed.", Dec. 31, 1999, pp. 53-57.
Office Action received for Australian Patent Application No. 2024201001, mailed on May 22, 2025, 3 pages.
Fang Yusheng et al., "Polyurethane Foam 2nd Edition", pp. 165-176, dated Aug. 31, 1994, printed Apr. 1, 2022.

POLYMERIC DISPERSANTS FROM PHENYL GLYCIDYL ETHER

FIELD OF THE INVENTION

The invention relates to copolymers, dispersant compositions comprising the copolymers, and pigment dispersions that use the dispersant compositions.

BACKGROUND OF THE INVENTION

Phenyl glycidyl ether ("PGE") is known as a monomer for ring-opening polymerizations, including reactions to make random or block copolymers of alkylene oxides and PGE (see, e.g., U.S. Pat. No. 6,825,273). Some reported copolymers are generated with a monofunctional, monounsaturated initiator such as allyl alcohol (see, e.g., U.S. Pat. Nos. 7,388,068; 7,605,224; and 7,812,114). Linear block copolymers of PGE and ethylene oxide produced with monofunctional alcohol initiators (e.g., 1-octanol or 3-phenyl-1-propanol) and their use in pigment dispersions are also known (see N. Suto et al., *J. Jpn. Oil Chem. Soc.* 31 (1982) 598 and U.S. Pat. No. 8,367,762).

Pigment dispersions come in many varieties. The medium can be aqueous, polar organic, or non-polar organic, and the pigment can be many kinds of organic or inorganic materials. It is difficult to predict which dispersant can provide a satisfactory dispersion for any given pigment among hundreds of possible pigments. This creates a great need for commensurate variety in the available pigment dispersants.

The hydrophobic nature of phenyl glycidyl ether blocks and the relatively hydrophilic nature of ethylene oxide blocks provide opportunities to produce polymeric dispersants that can work with various organic and inorganic pigments, especially in aqueous media. Preferred copolymers could effectively disperse multiple pigment types to give aqueous dispersions with low viscosity, good optical properties, and desirable particle sizes within the range of 100 to 1000 nm. Preferred copolymers would also have low- or zero-VOC character to aid in complying with increasingly strict regulations. Ideally, the copolymers could give good dispersions at low use levels and could enable improved productivity by dispersing more pigment per unit of time.

SUMMARY OF THE INVENTION

In one aspect, the invention relates to copolymers comprising recurring units of a phenyl glycidyl ether, especially (unsubstituted) phenyl glycidyl ether ("PGE"). The copolymers comprise a di- or polyfunctional nucleophilic initiator, 1 to 30 recurring units per active hydrogen equivalent of the initiator of a phenyl glycidyl ether, and 1 to 100 recurring units per active hydrogen equivalent of the initiator of one or more alkylene oxides ("AO") selected from ethylene oxide, propylene oxide, butylene oxides, and combinations thereof. The di- or polyfunctional nucleophilic initiator is selected from alcohols, phenols, amines, thiols, thiophenols, sulfinic acids, and deprotonated species thereof. The copolymers comprise 20 to 60 wt. % of phenyl glycidyl ether recurring units based on the combined amounts of phenyl glycidyl ether and AO recurring units. In addition, the copolymers have a number-average molecular weight within the range of 1,900 to 56,000 g/mol.

In another aspect, the invention includes copolymers comprising recurring units of a phenyl glycidyl ether, one or more alkylene oxides, and a monofunctional nucleophilic initiator selected from thiols, thiophenols, aralkylated phenols, sulfinic acids, secondary amines, $C_{10}$-$C_{20}$ terpene alcohols, and deprotonated species thereof. These copolymers also comprise 1 to 30 recurring units per active hydrogen equivalent of the initiator of a phenyl glycidyl ether, and 1 to 100 recurring units per active hydrogen equivalent of the initiator of one or more alkylene oxides selected from ethylene oxide, propylene oxide, butylene oxides, and combinations thereof. The copolymers comprise 20 to 60 wt. % of phenyl glycidyl ether recurring units based on the combined amounts of phenyl glycidyl ether and AO recurring units. In addition, the copolymers have a number-average molecular weight within the range of 900 to 12,000 g/mol.

The invention includes dispersions comprising a carrier (preferably water), a solid (preferably a pigment), usually a pH adjusting agent, and the copolymers described above.

The universe of available pigments and their myriad uses demands commensurately diverse dispersants with the ability to produce aqueous dispersions having desirably low viscosities and practical particle size distributions. By varying the initiator identity and functionality, the proportions and distribution of phenyl glycidyl ether and alkylene oxide(s), and the nature of any capping group, a family of compositions useful as pigment dispersants is readily produced. The phenyl glycidyl ether copolymers described herein meet the growing needs of the industry with their ease of manufacture, diverse structures, and desirable performance attributes, including low- or zero-VOC character, for dispersing a wide range of organic and inorganic pigments in aqueous or organic media.

DETAILED DESCRIPTION OF THE INVENTION

Architectures

The copolymers useful as dispersants can have a variety of different general structures or "architectures." For instance, they can be linear with one tail extending from the initiator, linear with two tails extending from the initiator, "T-shaped" (i.e., three tails extending from a central initiator), "star-shaped" (i.e., four or more tails extending from a central initiator, or "comb-shaped" (polyfunctional initiator backbone with the tails as "teeth" of the comb).

Generally, the structure will include a nucleophilic initiator, one or more phenyl glycidyl ether units (typically, a block of 2-20 phenyl glycidyl ether units per active hydrogen of the initiator), one or more alkylene oxide units (ethylene oxide ("EO"), propylene oxide ("PO"), or butylene oxides ("BO") in homopolymer or random or block copolymer configurations), and optionally, a capping group. As will be discussed later, the copolymers can be built starting with the initiator or in some cases in reverse order starting with the capping group or a polyoxyalkylene or alkyl-capped polyoxyalkylene starter.

In some aspects, the copolymers may have a bolaphilic or amphiphilic structure comprising alternating blocks of hydrophobic (e.g., PGE) and hydrophilic (e.g., EO) groups. For instance, a polyethylene glycol starter could be reacted at both ends with PGE to add hydrophobic blocks, optionally with a capping group. Bolaphiles or amphiphiles could also be made using the strategies described for making linear, T-shaped, or star-shaped copolymers.

Nucleophilic Initiators:

The copolymer dispersants are usually synthesized from a nucleophilic initiator. The nucleophilic initiator can be monofunctional, difunctional, or polyfunctional.

1. Monofunctional Nucleophilic Initiators

When the desired copolymer has a single tail, a monofunctional nucleophilic initiator is used. Suitable monofunctional nucleophilic initiators include thiols, thiophenols, aralkylated phenols, aryl-substituted phenols, sulfinic acids, secondary amines, $C_{10}$-$C_{20}$ terpene alcohols, and deprotonated versions thereof.

Suitable monofunctional thiols, thiophenols, aralkylated phenols, aryl-substituted phenols, and sulfinic acids include, for example, hexanethiol, octanethiol, 1-dodecanethiol, benzyl mercaptan, furfuryl mercaptan, 2-benzothiazolylthiol, thiophenol, 4-chlorothiophenol, styrenated phenols, 4-(triphenylmethyl)phenol, 4-phenylphenol, phenylsulfinic acid, and the like, and mixtures thereof. After serving as the initiator, sulfur atoms on many of these initiators can be oxidized to give sulfoxides or sulfones as illustrated below. By controlling the stoichiometry of the oxidant, some or all of the sulfur atoms can be oxidized (see Scheme 6). When a sulfinic acid is used as the initiator, a sulfone is produced directly.

Secondary amines also serve as initiators for single-tail copolymers. Suitable secondary amines include, for example, diethylamine, di-n-propylamine, di-n-butylamine, diisopropylamine, di-n-octylamine, N-methylaniline, morpholine, piperidine, diphenylamine, dibenzylamine, imidazoles, 1,1,3,3-tetramethylguanidine, and the like. After serving as the initiator, any resulting tertiary nitrogen atoms on these initiators can be quaternized or converted to N-oxides (see Scheme 6).

Suitable $C_{10}$-$C_{20}$ terpene alcohols include, for example, farnesol, terpineol, linalool, geraniol, nerolidol, geranylgeraniol, and the like, and mixtures thereof.

2. Di- or Polyfunctional Nucleophilic Initiators

When the desired copolymer has two or more tails, a di- or polyfunctional nucleophilic initiator is used. The average functionality of these initiators is determined by summing the total of active hydrogens bonded to an oxygen, nitrogen, or sulfur atom. Preferred di- or polyfunctional nucleophilic initiators will have average functionalities within the range of 2 to 8, 2 to 6, or 2 to 4.

Suitable di- or polyfunctional nucleophilic initiators include alcohols, phenols, amines, thiols, thiophenols, sulfinic acids, and deprotonated species thereof. Thus, suitable di- or polyfunctional nucleophilic initiators include polyfunctional alcohols (diols, triols, tetrols, sugars, and the like), polyphenols, primary amines, di- or polyfunctional secondary amines, di- or polyfunctional sulfur-containing initiators (thiols, dithiols, thiophenols, sulfinic acids), mixed nucleophiles, and the like.

Suitable polyfunctional alcohols include, for example, 1,3-propanediol, 2-methyl-1,3-propanediol, 1,4-butanediol, 3-methyl-1,5-pentanediol, 1,6-hexanediol, 1,8-octanediol, 1,12-dodecanediol, ethylene glycol, diethylene glycol, triethylene glycol, polyethylene glycols having number-average molecular weights from 400 to 4,000 g/mol, glycerol, trimethylolpropane, trimethylolethane, pentaerythritol, di(pentaerythritol), di(trimethylolpropane), bis-tris methane, 1,4-cyclohexanedimethanol, 1,4-dihydroxy-2-butyne, 2,4,7,9-tetramethyl-5-decyn-4,7-diol, isosorbide, castor oil, xylitol, sorbitol, glucose, 1,2-O-isopropylidene-α,D-glucofuranose, N-methyldiethanolamine, triethanolamine, polyglycerols, polyvinyl alcohols, and the like, and mixtures thereof. After serving as the initiator, any resulting tertiary nitrogen atoms on these initiators can be quaternized or converted to N-oxides.

Suitable polyphenols include, for example, bisphenols (e.g., bisphenol A, bisphenol F, bisphenol S, bisphenol acetophenone), biphenols (2,2'-biphenol, 4,4'-biphenol), resorcinol, catechol, 1,6-dihydroxynaphthalene, phloroglucinol, pyrogallol, ellagic acid, tannins, lignins, natural polyphenols, poly[phenol-co-formaldehyde], poly[cresol-co-formaldehyde], and the like, and mixtures thereof.

Suitable amines include primary amines such as, for example, n-butylamine, n-octylamine, cocamine, oleylamine, cyclohexylamine, benzhydrylamine, taurine, anilines (e.g., 4-chloroaniline, 4-aminophenol, 3-methoxyaniline, 4,4'-diaminodiphenylmethane, sulfanilamide), benzylamines, benzenesulfonamide, ethylenediamine, diethylenetriamine, melamine, N,N-dimethylethylenediamine, 3,3'-diaminobenzidine, polyetheramines, polyethylenimines, and the like.

Suitable amines also include di- or polyfunctional secondary amines such as, for example, piperazine, N,N'-dimethylethylenediamine, N,N'-dimethyl-1,6-hexanediamine, N,N'-dimethyl-1,8-octanediamine, 1,3,5-triazinane, 4,4'-trimethylenedipiperidine, and the like. After serving as the initiator, nitrogen atoms on these initiators can be quaternized or converted to N-oxides. Primary amines provide two-tail initiators. Some of the initiators (e.g., ethylenediamine, diethylenetriamine, melamine, polyethylenimines, polyetheramines) provide a starting point for multiple tails.

Suitable di- or polyfunctional sulfur-containing initiators include, for example, 1,4-butanedithiol, 1,6-hexanedithiol, 2,2'-(ethylenedioxy)diethanethiol, trithiocyanuric acid, and the like, and mixtures thereof. After serving as the initiator, sulfur atoms on many of these initiators can be oxidized to give sulfoxides or sulfones.

Suitable di- or polyfunctional mixed nucleophiles include, for example, ethanolamine, 2-mercaptoethanol, 2-aminoethanethiol, diethanolamine, 4-aminophenol, 4-aminothiophenol, glucosamine, 2-amino-1,3-propanediol, 1,3-diamino-2-propanol, 3-mercapto-1,2-propanediol, bis-tris propane, 4-hydroxy-1,2,2,6,6-pentamethylpiperidine, and the like, and mixtures thereof. After serving as the initiator, the nitrogen and/or sulfur atoms can be oxidized or quaternized as described above.

Suitable nucleophilic initiators include partially or fully deprotonated species corresponding to any of the above protonated materials. As those skilled in the art will appreciate, many convenient syntheses of the copolymers will start by reacting a monofunctional nucleophilic initiator (thiol, thiophenol, secondary amine, or $C_{10}$-$C_{20}$ terpene alcohol) or a di- or polyfunctional nucleophilic initiator (alcohol, phenol, amine, thiol, or thiophenol) with a deprotonating agent. Suitable deprotonating agents are well known and include, for instance, metal hydrides (LiH, NaH, KH, $CaH_2$), metal alkoxides (sodium methoxide, sodium ethoxide, potassium ethoxide, potassium tert-butoxide), methyl hydroxides (NaOH, KOH), metal carbonates ($NaHCO_3$, $Na_2CO_3$, $K_2CO_3$, $Cs_2CO_3$), amines (trimethylamine, N,N-diisopropylethylamine, pyridine), and the like.

Phenyl Glycidyl Ethers

The copolymer dispersants comprise recurring units of a phenyl glycidyl ether, especially unsubstituted phenyl glycidyl ether ("PGE"). In some aspects, the dispersants comprise 1 to 30, 2 to 20, 2 to 15, or 2 to 5 recurring phenyl glycidyl ether units per active hydrogen equivalent of the initiator. As used herein, "active hydrogen equivalent" refers herein to a group having an active hydrogen atom (alcohol, thiol, amine) or its deprotontated counterpart. In some aspects, the phenyl glycidyl ether recurring units occur in a single block. In other aspects, the phenyl glycidyl ether recurring units are interspersed with recurring units of alkylene oxides, functionalized glycidyl ethers, or other monomers as described below. In a preferred aspect, a block of phenyl glycidyl ether recurring units is reacted with the nucleophilic initiator as a first reaction step. In some aspects, an alkyl-, alkoxy-, or halo-substituted phenyl glycidyl ether (e.g., 2-methylphenyl glycidyl ether, 4-methoxyphenyl glycidyl ether, or 2-chlorophenyl glycidyl ether) is used instead of or in addition to PGE. In other aspects, styrene oxide is used to replace some or all of the phenyl glycidyl ether recurring units.

Alkylene Oxides

The copolymer dispersants comprise recurring units of one or more alkylene oxides. In some aspects, the dispersants comprise from 1 to 100, 5 to 80, 10 to 60, or 20 to 40 recurring units per active hydrogen equivalent of the initiator of one or more alkylene oxides selected from the group consisting of ethylene oxide, propylene oxide, butylene oxides, and combinations thereof. The alkylene oxide recurring units can be arranged in random, block, or gradient fashion, e.g., as blocks of a single alkylene oxide, blocks of two or more alkylene oxides (e.g., a block of EO units and a block of PO units), or as a random copolymer. In preferred aspects, the alkylene oxide is ethylene oxide, propylene oxide, or combinations thereof. In more preferred aspects, the alkylene oxide consists essentially of ethylene oxide, which imparts hydrophilic character to the copolymer.

Other Monomers

The copolymer dispersants can incorporate recurring units of other monomers capable of copolymerizing with phenyl glycidyl ether or the above-mentioned alkylene oxides. The other monomers include, for example, other glycidyl ethers (e.g., butyl glycidyl ether, isopropyl glycidyl ether, t-butyl glycidyl ether, 2-ethylhexyl glycidyl ether, allyl glycidyl ether, benzyl glycidyl ether, guaiacol glycidyl ether, 1-ethoxyethyl glycidyl ether, 2-ethoxyethyl glycidyl ether, 2-methylphenyl glycidyl ether, 2-biphenyl glycidyl ether, tristyrylphenol glycidyl ether, 3-glycidyl(oxypropyl) trimethoxysilane, 3-glycidyl(oxypropyl)triethoxysilane, propargyl glycidyl ether), other epoxides (e.g., styrene oxide, cyclohexene oxide, 1,2-epoxyhexane, 1,2-epoxyoctane, 1,2-epoxydecane, 1,2-epoxydodecane, 1,2-epoxyteradecane, 1,2-epoxhexadecane, 1,2-epoxyoctadecane, 1,2-epoxy-7-octene, 3,4-epoxytetrahydrofuran, (2,3-epoxypropyl) trimethylammonium chloride), thiiranes (phenoxymethyl thiirane, 2-phenylthiirane), caprolactone, tetrahydrofuran, and the like. The thiiranes can be produced from the corresponding epoxides and thiourea as described, e.g., in Yu et al., *Synthesis* (2009) 2205.

In some aspects, reaction of the nucleophilic initiator with an epoxy-functional monomer (epoxide, glycidyl ether) is used to produce a more complex "initiator" that can be further reacted with recurring units of phenyl glycidyl ether and alkylene oxides.

For instance, reaction of triethanolamine with three equivalents of 3,4-epoxytetrahydrofuran (or 1,2-epoxyhexadecane, e.g.) provides a composition having three free hydroxyl groups. This "initiator" can then be reacted with the phenyl glycidyl ether to produce a hydrophobe, which is thereafter reacted with ethylene oxide (or EO/PO combination) to give a suitable dispersant. Exemplary hydrophobes of this type are shown below:

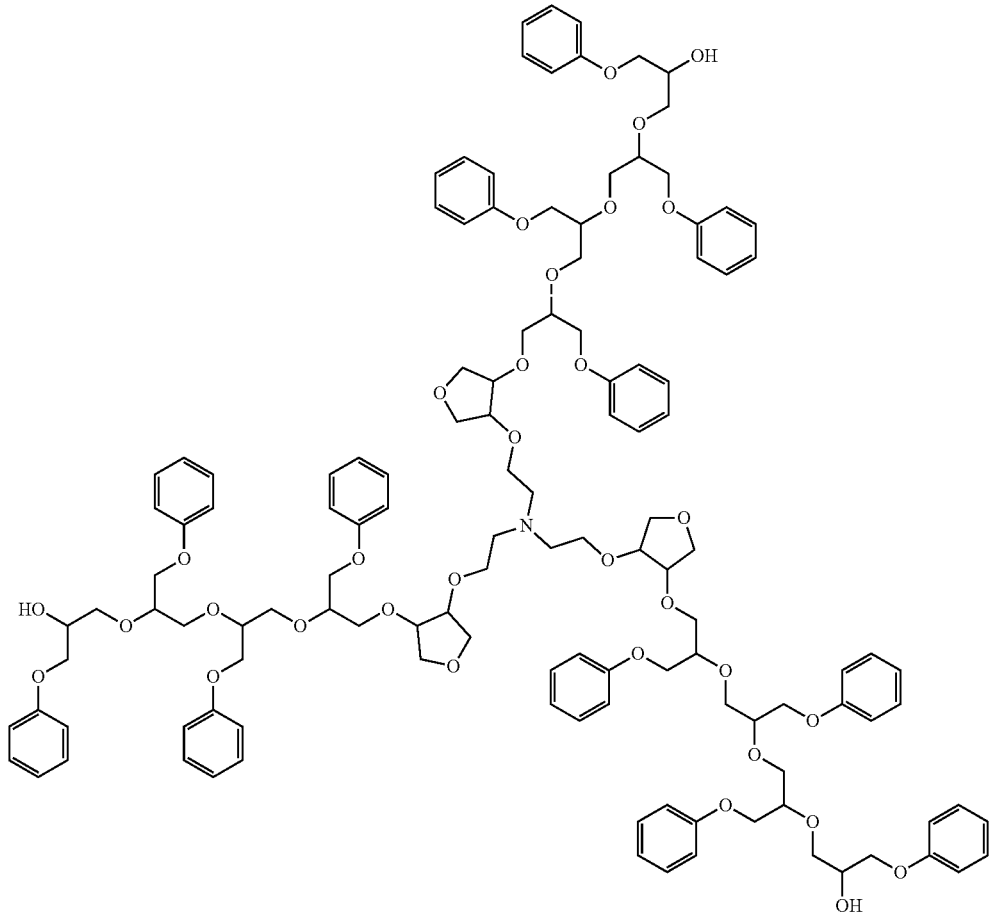 [SMILES: OC(COc1ccccc1)COC(COc1ccccc1)COC(COc1ccccc1)COC(COc1ccccc1)COC1COCC1OCCN(CCOC1COCC1OCC(COc1ccccc1)OCC(COc1ccccc1)OCC(COc1ccccc1)OCC(O)COc1ccccc1)CCOC1COCC1OCC(COc1ccccc1)OCC(COc1ccccc1)OCC(COc1ccccc1)OCC(O)COc1ccccc1]

-continued
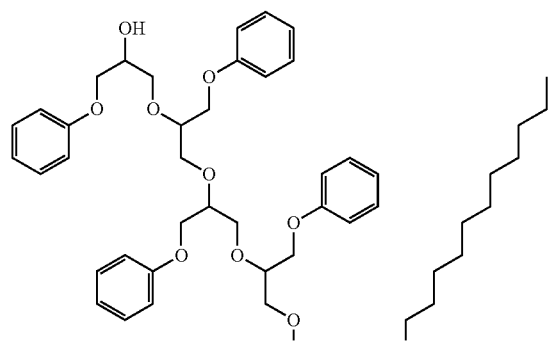
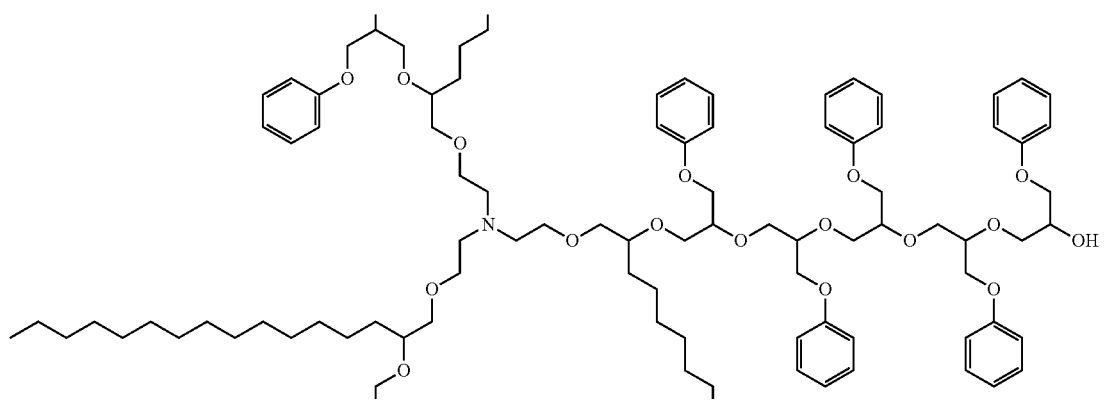
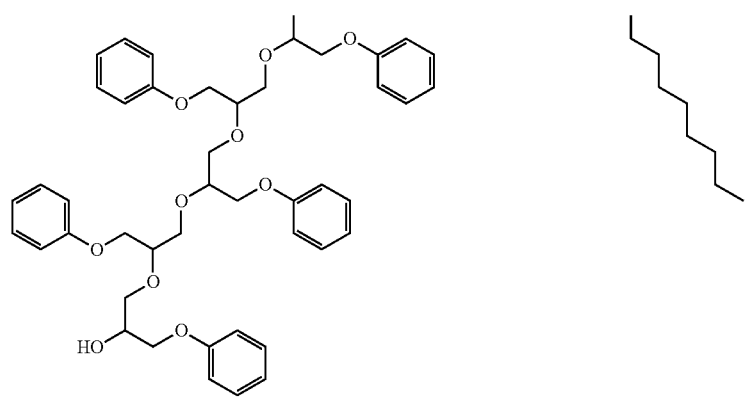

Similarly, reaction of trimethylolpropane with three equivalents of allyl glycidyl ether gives a complex initiator that can be further reacted with PGE to give a hydrophobe and then ethoxylated to give the dispersant:

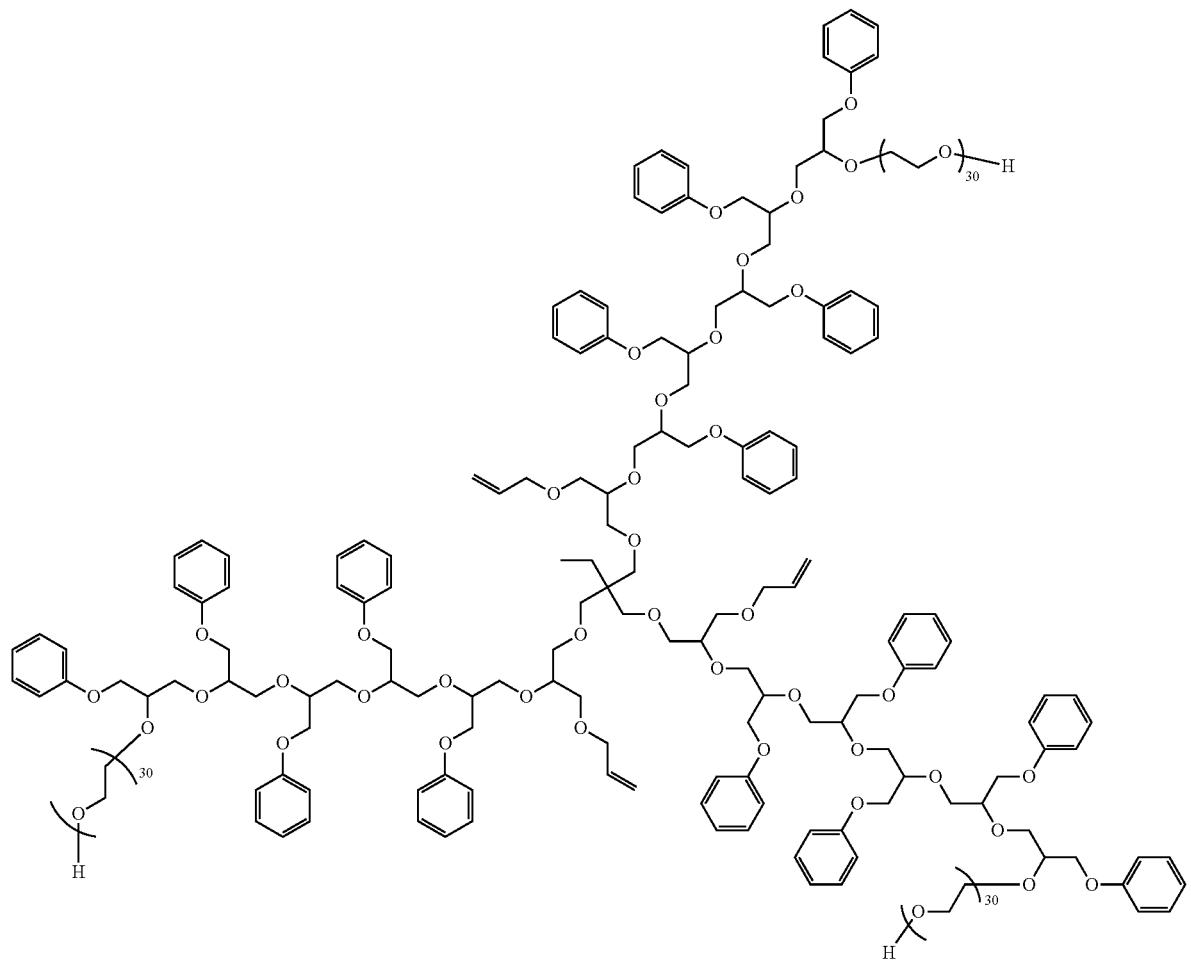

In yet another example, the complex initiator is made by reacting triethanolamine with three equivalents of 2-ethylhexyl glycidol to give the hydroxy-functional complex initiator. Further reaction with PGE, then EO provides the desired dispersant:

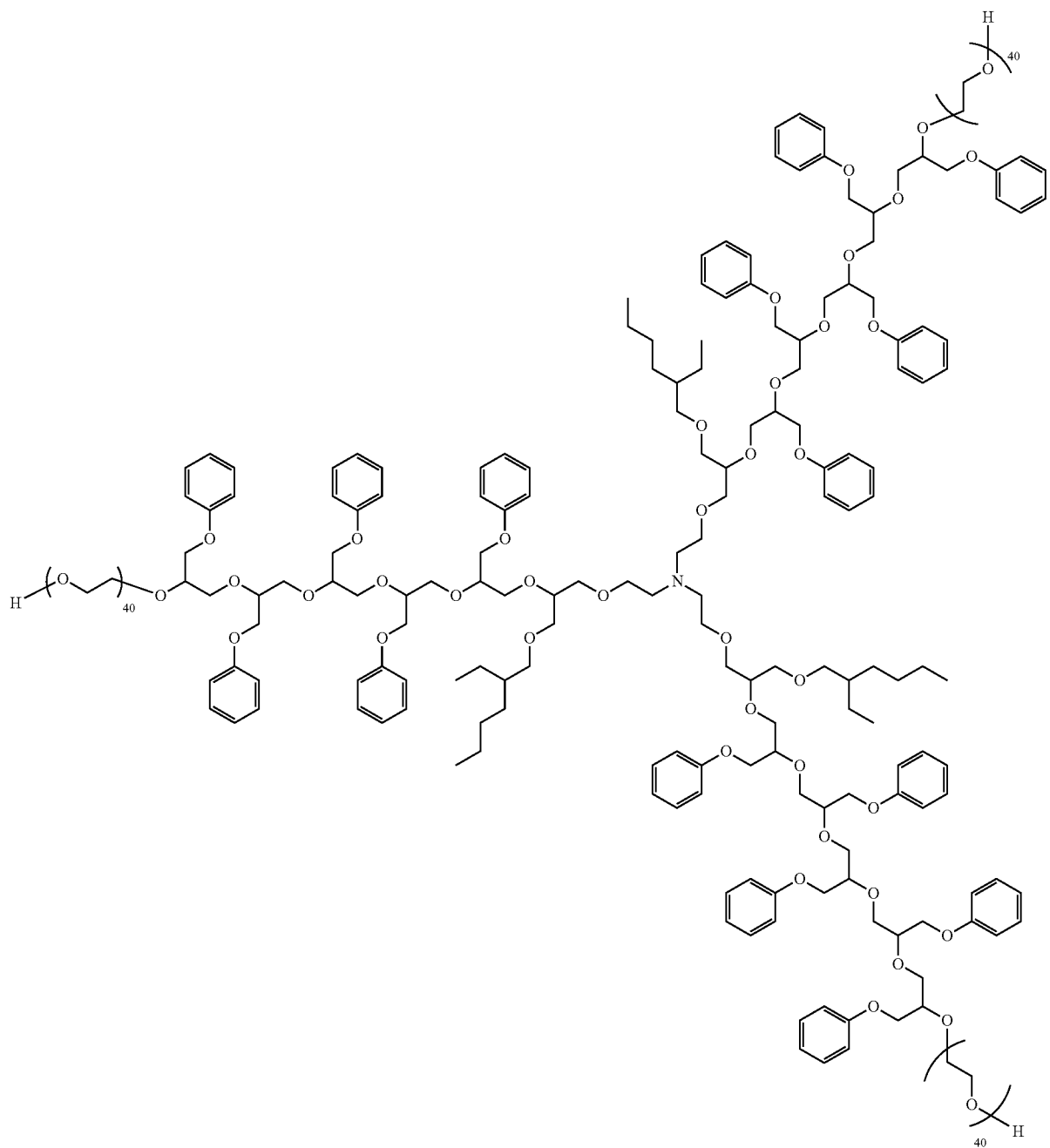

Functionalized Glycidyl Ethers

The copolymer dispersants can incorporate one or more units of glycidyl ethers having a built-in functional "handle." Suitable functionalized glycidyl ethers have a glycidyl ether group, a linking group, and a functional handle. The linking group is any combination of atoms or bonds capable of linking the glycidyl ether group to the functional handle. Suitable functional handles will have functional groups capable of further manipulation. For instance, if the functionalized glycidyl ether incorporates a benzaldehyde "handle," the free aldehyde group can be reacted with an amine to give an imine, an amino acid to give an imine-acid, or an anhydride to give a cinnamic acid derivative via the Perkin reaction. In another example, if the functionalized glycidyl ether incorporates a thioether "handle," oxidation can provide a sulfoxide or a sulfone.

Commercially available 1-ethoxyethyl glycidyl ether (i.e., 2-[(1-ethoxyethoxy)-methyl]oxirane) can be used to introduce an acid-sensitive hemiacetal (RO—CH(CH$_3$)OEt) as the functional handle. Subsequent treatment with an acid liberates the alcohol (ROH), which can be converted to a phosphate, sulfate, acetate, or other useful functionalities.

In another exemplary synthetic approach, the nucleophilic initiator is first reacted with a portion of the phenyl glycidyl ether to be used, then with a desired proportion of functionalized glycidyl ether, then with the remaining amount of the phenyl glycidyl ether to embed functionality within the block of phenyl glycidyl ether recurring units. Introduction of heteroatoms or charged functionalities (e.g., amine oxides) can be helpful for dispersing inorganic pigments.

Hydrophobe Synthesis

In a preferred aspect, the nucleophilic initiator is reacted with a phenyl glycidyl ether in the presence of a catalyst, preferably a basic catalyst. In some aspects, 1 to 30, 2 to 20, and preferably 2 to 15 or 2 to 5 phenyl glycidyl ether equivalents are used per active hydrogen equivalent of the initiator. In a preferred approach, about 5 equivalents of phenyl glycidyl ether per active hydrogen in the initiator is used, as this provides a desirable level of hydrophobicity. It may be desirable to perform the reaction, at least initially, in the presence of a solvent. Ether solvents such as methyl t-butyl ether (MTBE) work well with alkoxide catalysts. In one suitable approach, a reaction vessel is charged with the required amount of nucleophilic initiator and solvent, and a suitable catalyst (e.g., potassium methoxide) is added. An initial charge of the phenyl glycidyl ether is added, and solvent is removed. As the temperature is increased, the ring-opening reaction proceeds, and the mixture exotherms. Addition of the phenyl glycidyl ether continuously or in increments enables control over reaction exotherms. Reaction progress can be monitored by $^1$H NMR or other suitable techniques. The resulting hydrophobe alkoxide is normally used "as is" for subsequent reaction steps.

The hydrophobic portion of the copolymer will have preferred number-average molecular weights as measured by gel-permeation chromatography (GPC) that are somewhat functionality-dependent as shown in the following table:

| Nominal functionality | Preferred Mn for the hydrophobe (by GPC) |
| --- | --- |
| 1 | 500 to 4,000 |
| 2 | 750 to 5,000 |
| 3 | 1,000 to 6,000 |
| 4 | 1,250 to 7,000 |
| 5 | 1,400 to 8,000 |
| 6 | 1,500 to 9,500 |

Scheme 1 illustrates hydrophobe syntheses using PGE, potassium methoxide catalyst, MTBE solvent, and a variety of nucleophilic initiators to produce single-tail, two-tail, three-tail, and four tail hydrophobes. Scheme 2 illustrates syntheses in which alternatives to PGE are included.

Alkoxylation

Alkoxylation normally follows reaction of the nucleophilic initiator, catalyst, and the phenyl glycidyl ether to produce the hydrophobe. Hydroxyl groups of the hydrophobe react in the presence of the catalyst with one or more equivalents of an alkylene oxide to give the alkoxylated product. In some aspects, enough alkylene oxide is added to introduce 1 to 100, 2 to 80, 5 to 60, or 10 to 40 recurring units of alkylene oxide per active hydrogen equivalent of the nucleophilic initiator. In some aspects, the alkylene oxide is selected from the group consisting of ethylene oxide, propylene oxide, butylene oxides, and combinations thereof. The alkylene oxide recurring units can be arranged in random, block, or gradient fashion, e.g., as blocks of a single alkylene oxide, blocks of two or more alkylene oxides (e.g., a block of EO units and a block of PO units), or as a random copolymer. In preferred aspects, the alkylene oxide is ethylene oxide, propylene oxide, or combinations thereof. In more preferred aspects, the alkylene oxide consists essentially of ethylene oxide.

Although basic catalysts are usually most convenient, alternative catalysts can be used in some aspects. For instance, Lewis acids such as boron trifluoride can be used to polymerize PGE and alkylene oxides. Double metal cyanide catalysts can also be used (see, e.g., U.S. Pat. Nos. 5,470,813; 5,482,908; 6,852,664; 7,169,956; 9,221,947; 9,605,111; and U.S. Publ. Nos. 2017/0088667 and 2017/0081469).

The alkoxylation reaction is conveniently practiced by gradual addition of the alkylene oxide as mixtures or in steps to produce the desired architecture. The reaction mixture will normally be heated until most or all of the alkylene oxide has reacted to give the desired copolymer. Following alkoxylation, the copolymer can be neutralized to give a hydroxy-functional dispersant. In some cases, it may be desirable to convert the hydroxyl groups to other functional groups such as sulfates, phosphates, amines, or the like. In other cases, it may be desirable to cap the hydroxyl groups to give ethers, esters, carbonates, carbamates, or the like using the capping groups discussed previously. Some representative alkoxylation processes are shown below in Scheme 3.

The alkoxylates will have preferred number-average molecular weights as measured by gel-permeation chromatography (GPC) that are somewhat functionality-dependent as shown in the following table:

| Nominal functionality | Preferred Mn for the alkoxylate (by GPC) |
| --- | --- |
| 1 | 900 to 12,000 |
| 2 | 1,900 to 21,000 |
| 3 | 2,700 to 30,000 |
| 4 | 3,700 to 38,000 |
| 5 | 4,600 to 47,000 |
| 6 | 5,500 to 56,000 |

Scheme 1: Hydrophobe Syntheses
Single Tail Analog
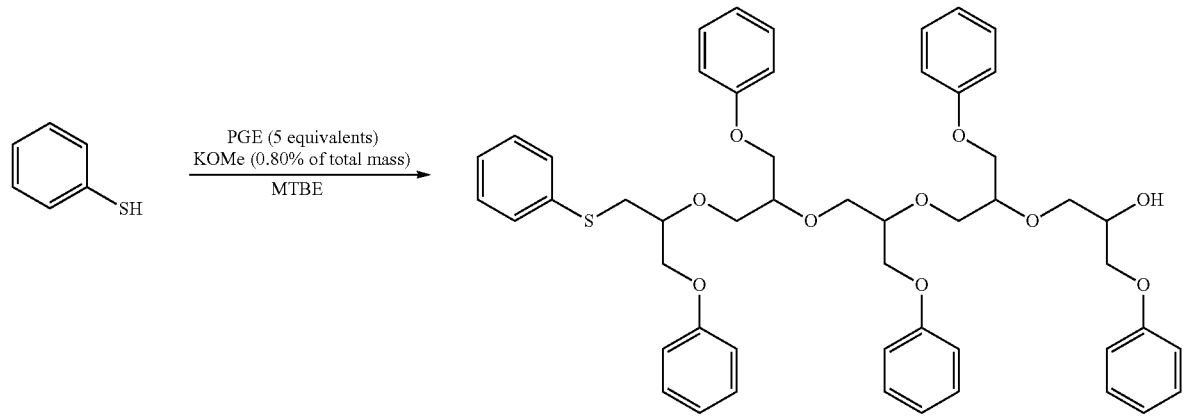
Two Tail Analog
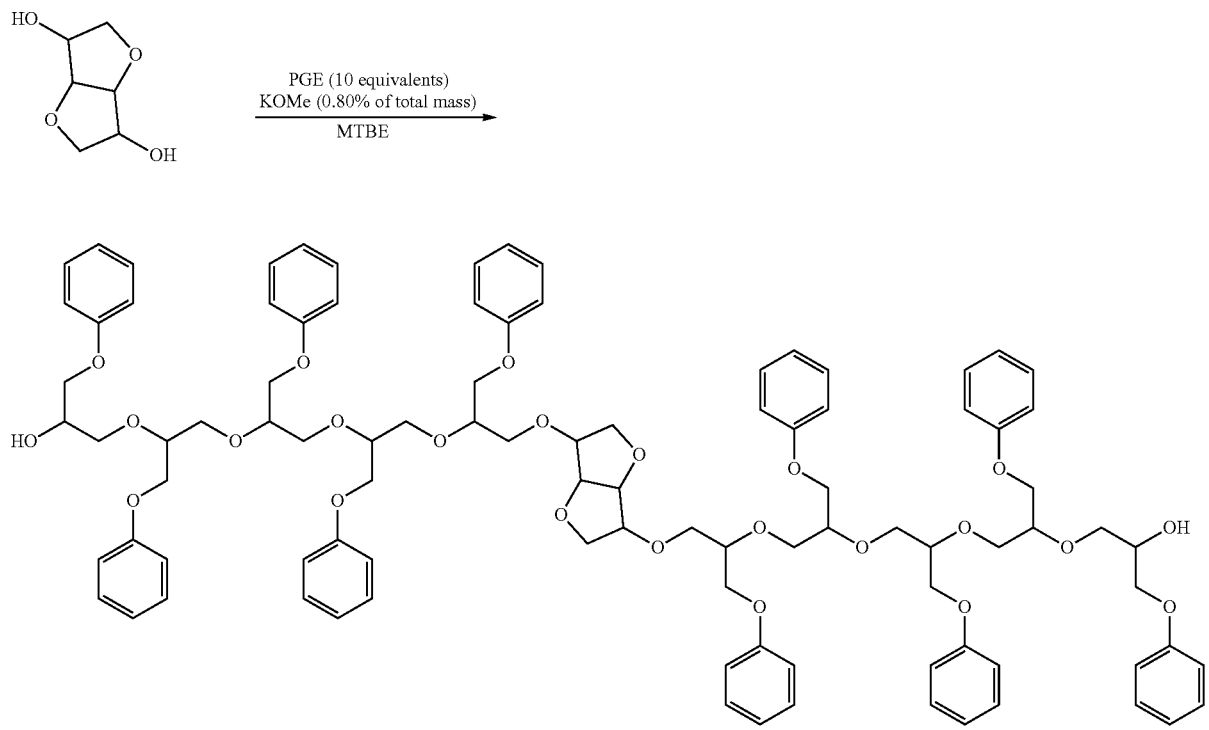
Three Tail Analog
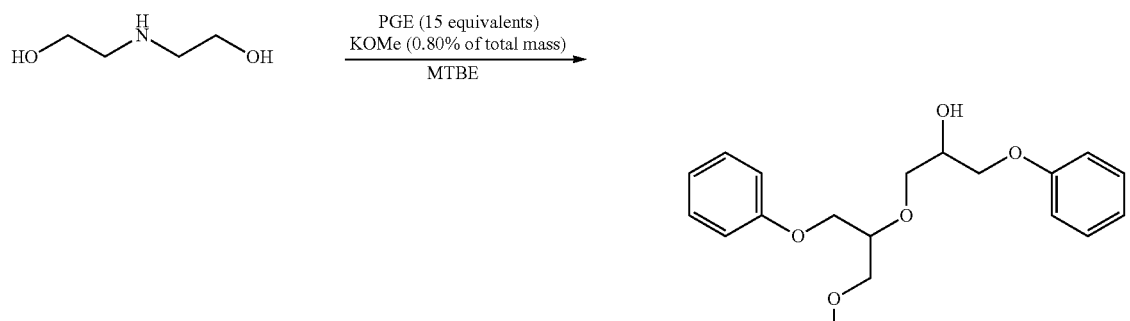

17 18
-continued
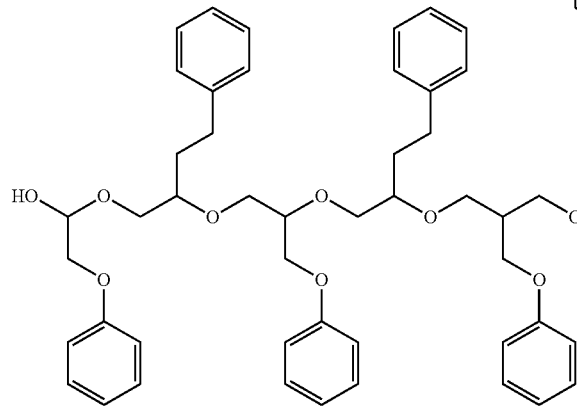
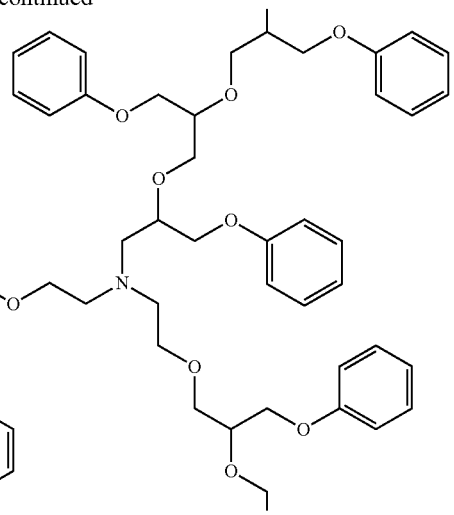
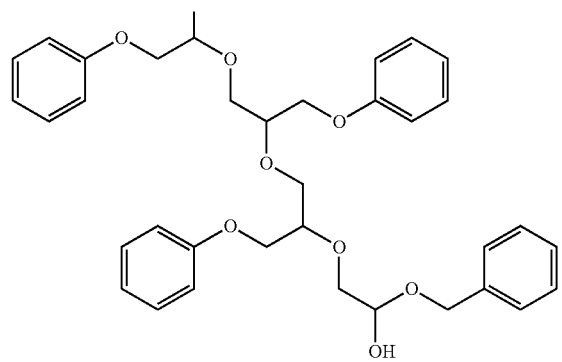
Four Tail Analog
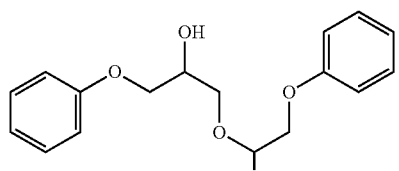

-continued
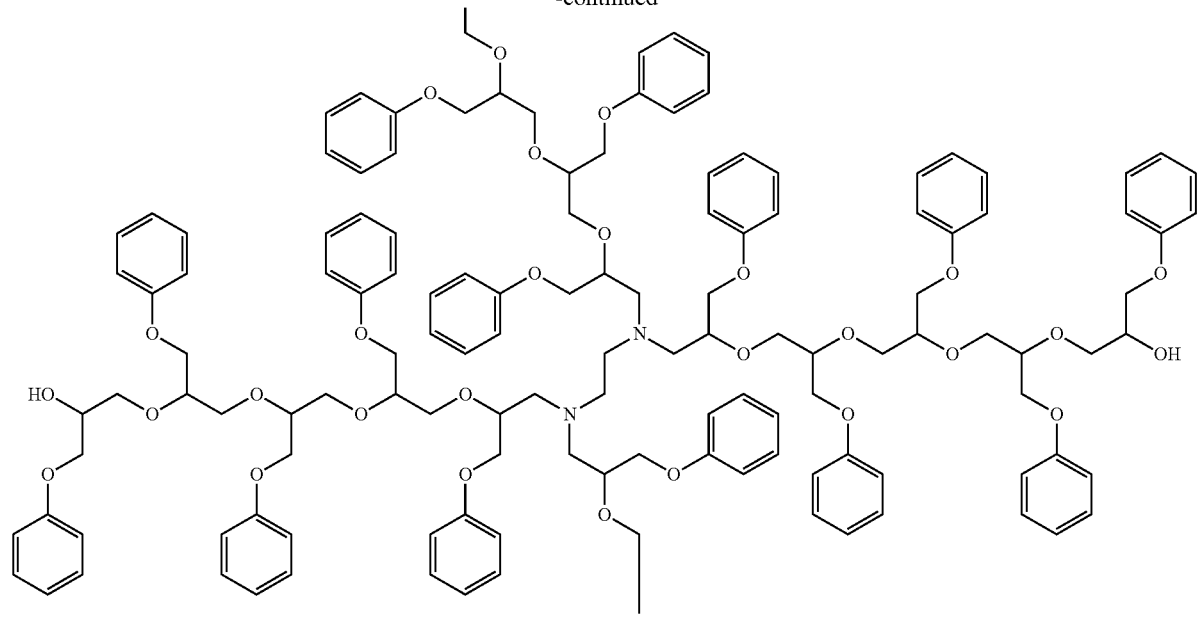
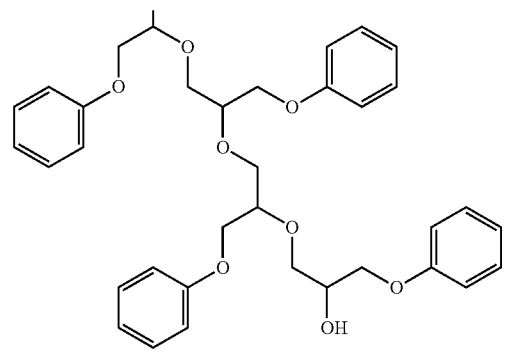
Scheme 2: Alternative Hydrophobe Syntheses
PGE Alternative, Example 1
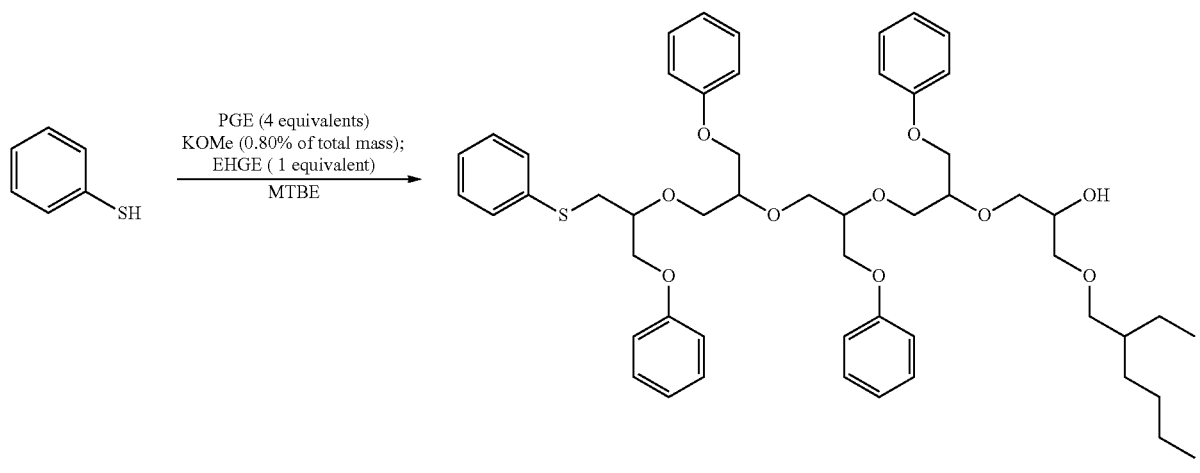
EHGE = 2-Ethylhexyl glycidyl ether PGE Alternative, Example 2
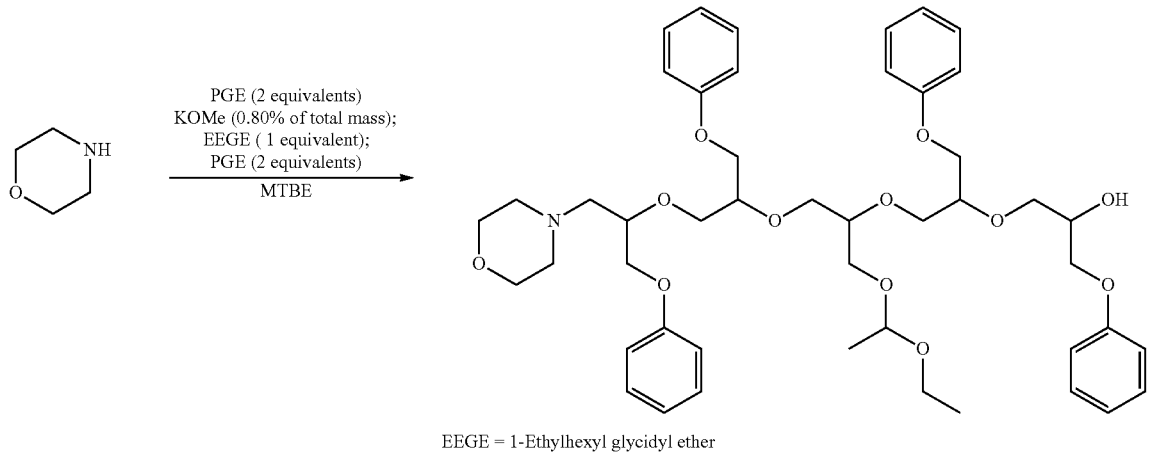
EEGE = 1-Ethylhexyl glycidyl ether
PGE Alternative, Example 3
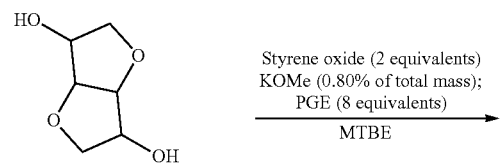
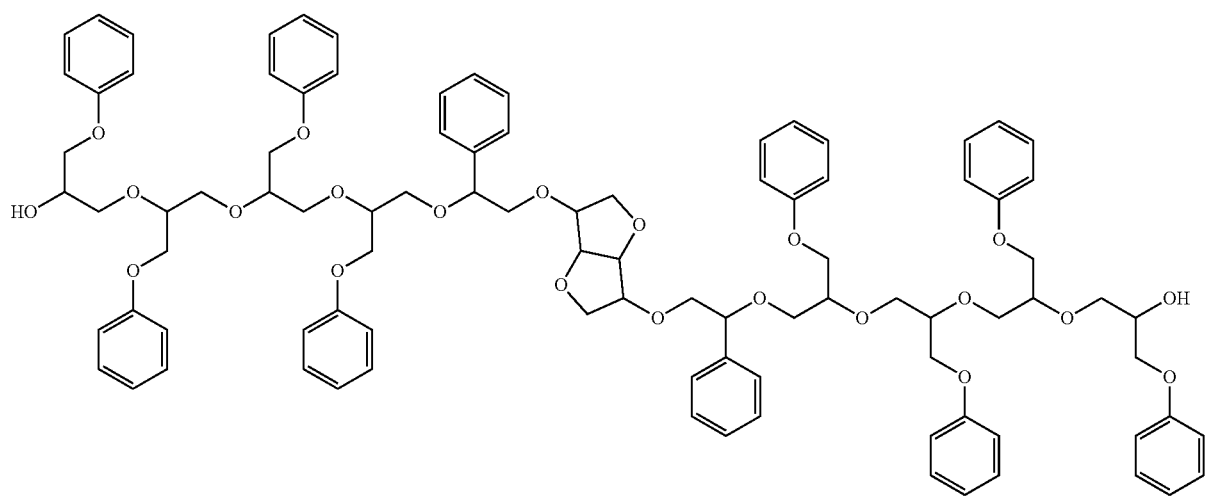

Scheme 3. Alkoxylation Reactions
EO Only
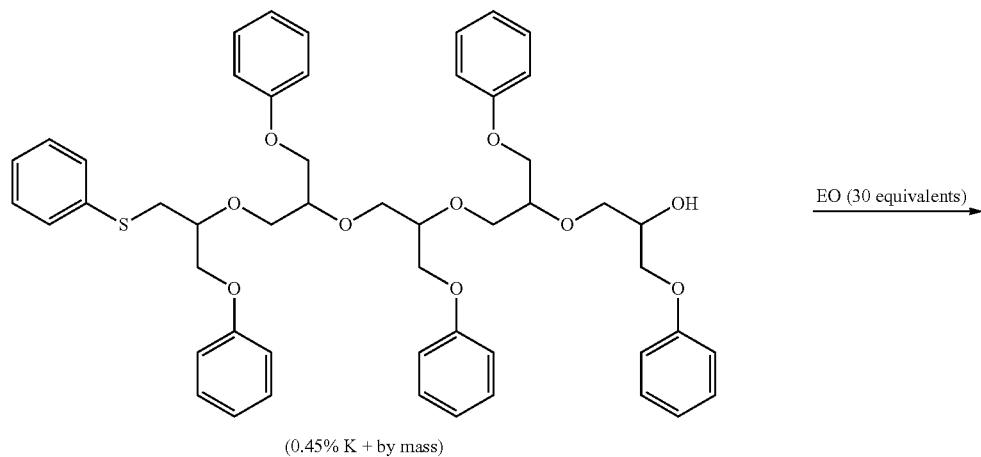
EO and then PO
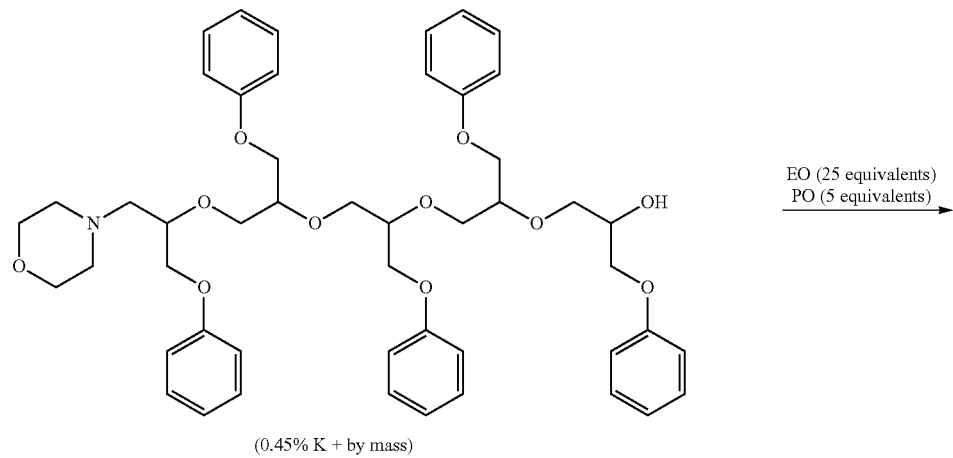

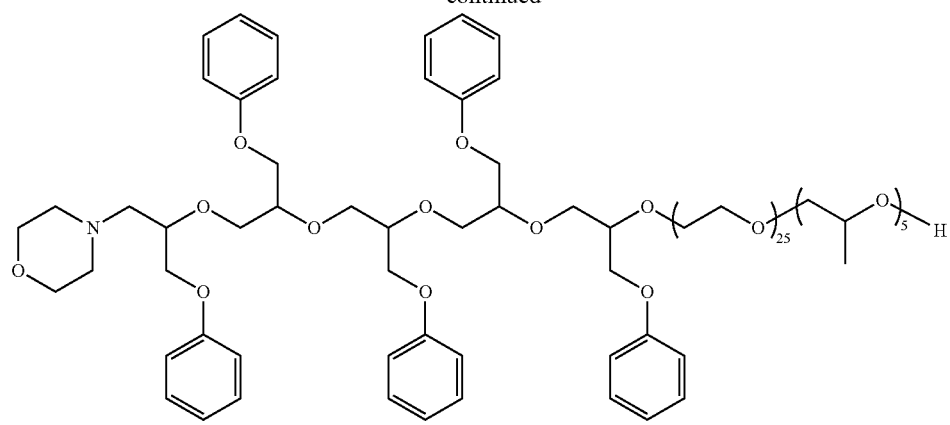
PO and then EO
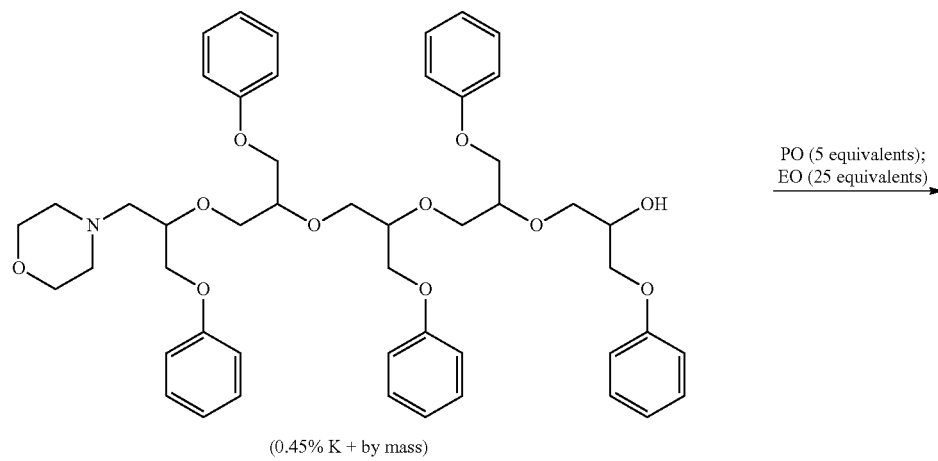
(0.45% K + by mass)
PO (5 equivalents);
EO (25 equivalents)
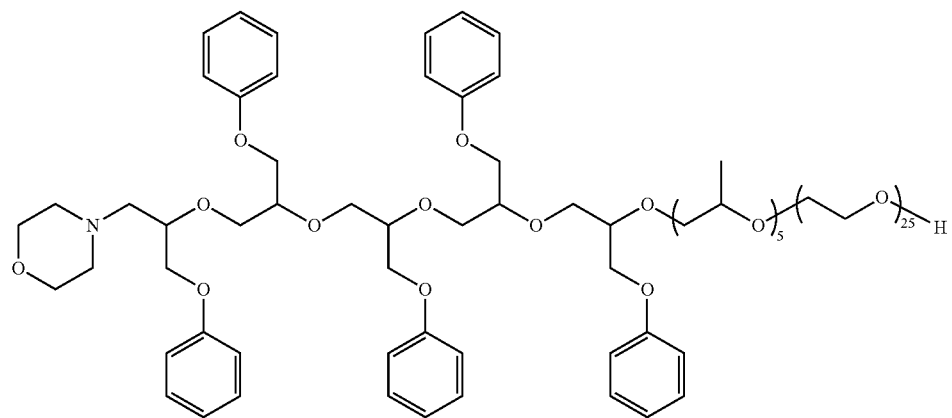

Random EO/PO

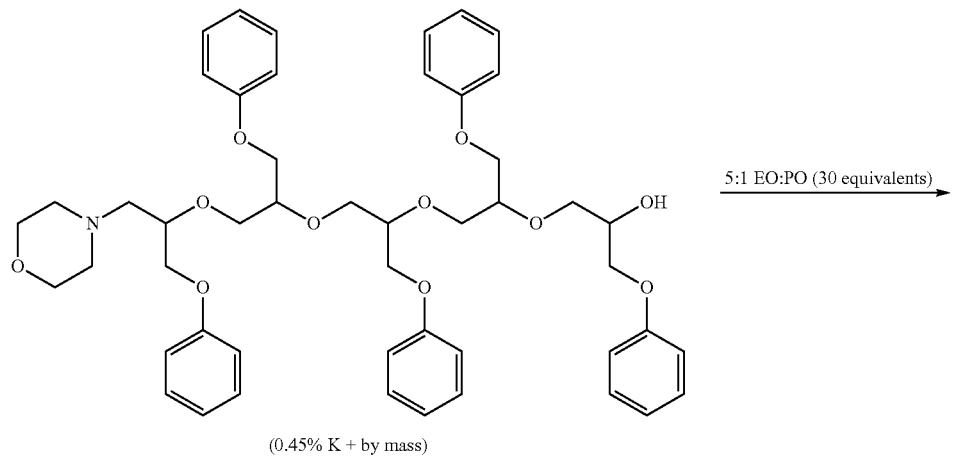

(0.45% K+ by mass)

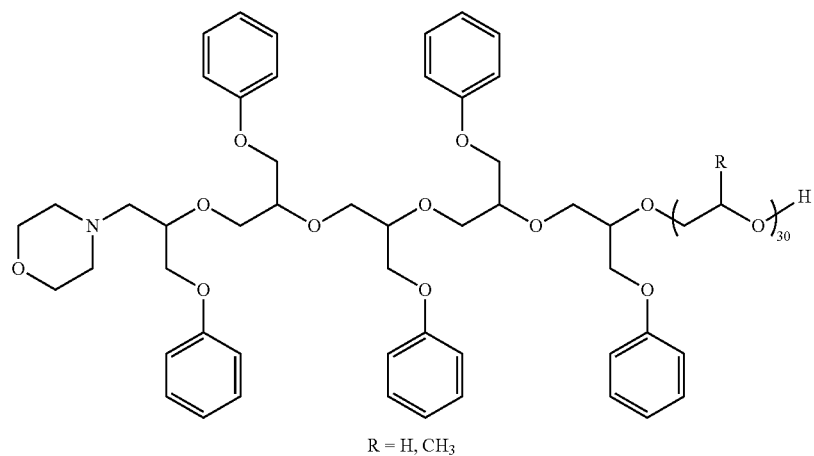

R = H, CH₃

More Dispersants

In another aspect, the dispersant is produced from a different kind of complex initiator. In this case, a di- or polyfunctional glycidyl ether or a di- or polyfunctional epoxide is reacted with an alcohol, secondary amine, or thiol to give a hydroxy-functional intermediate. This intermediate is then reacted with a phenyl glycidyl ether to produce a hydrophobe. The hydrophobe is then alkoxylated as previously described to give the dispersant. An exemplary dispersant produced in this way from resorcinol diglycidyl ether, 1-dodecanethiol, PGE, and ethylene oxide, is shown below:

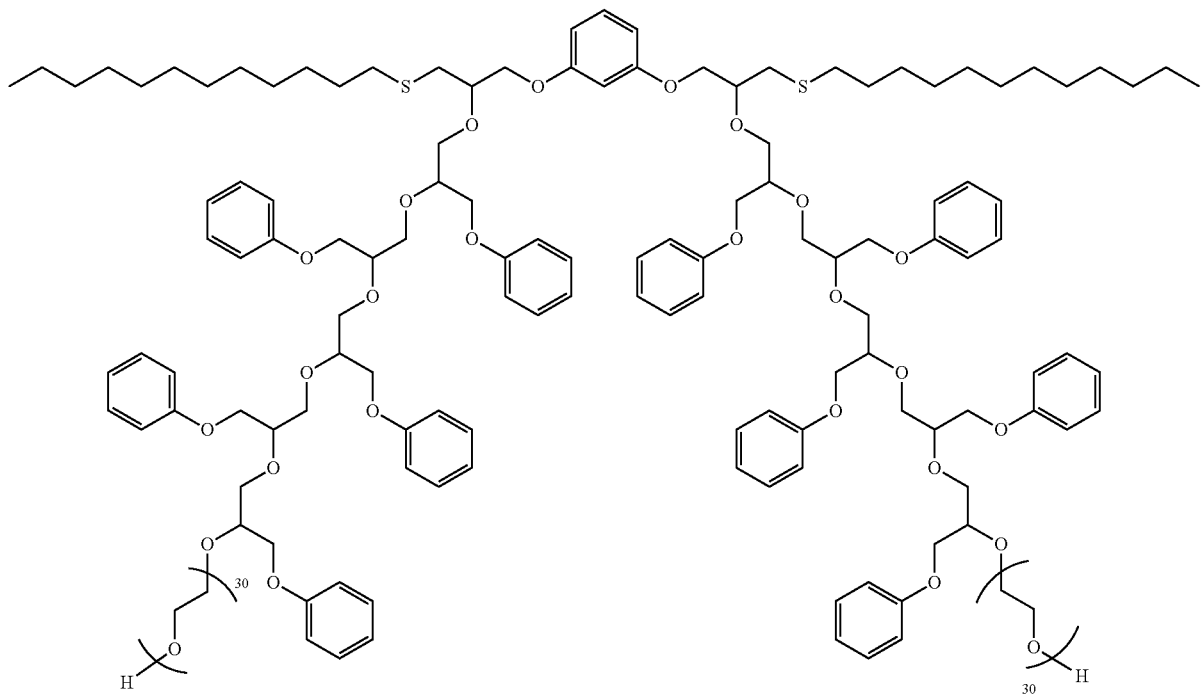

Reverse Synthesis

An alternative way to produce the copolymers useful as dispersants is to use a reverse or backwards synthesis. An advantage of this approach would be to avoid an alkoxylation process when a suitable ether-capped polyalkylene glycol starter is an article of commerce or is otherwise readily available. For instance, methoxy-capped polyethylene glycol can be converted to the alkoxide with a base catalyst and then be reacted with a desired number of equivalents of phenyl glycidyl ether, followed by any desired "nucleophilic initiator" to complete the synthesis.

In one "reverse synthesis" strategy, the hydrophilic portion is more centrally located. For instance, the ether-capped polyalkylene glycol (e.g., mPEG) can be reacted with an equivalent amount of a di- or polyfunctional glycidyl ether (e.g., resorcinol diglycidyl ether or 1,4-butanediol diglycidyl ether) to give a hydroxy-functional intermediate. This intermediate is then reacted with a phenyl glycidyl ether and any other epoxides and/or capping groups to grow the hydrophobic portion. The following dispersants illustrate products that could be made by this strategy:

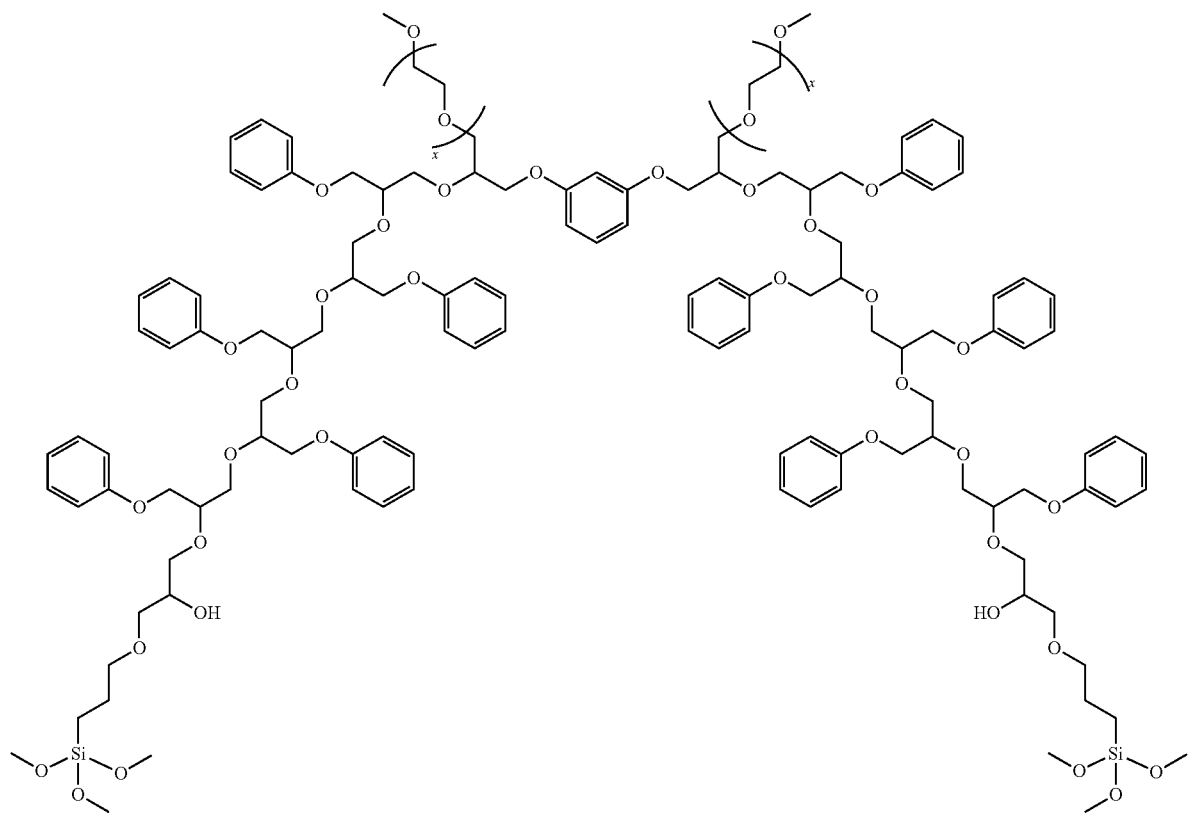

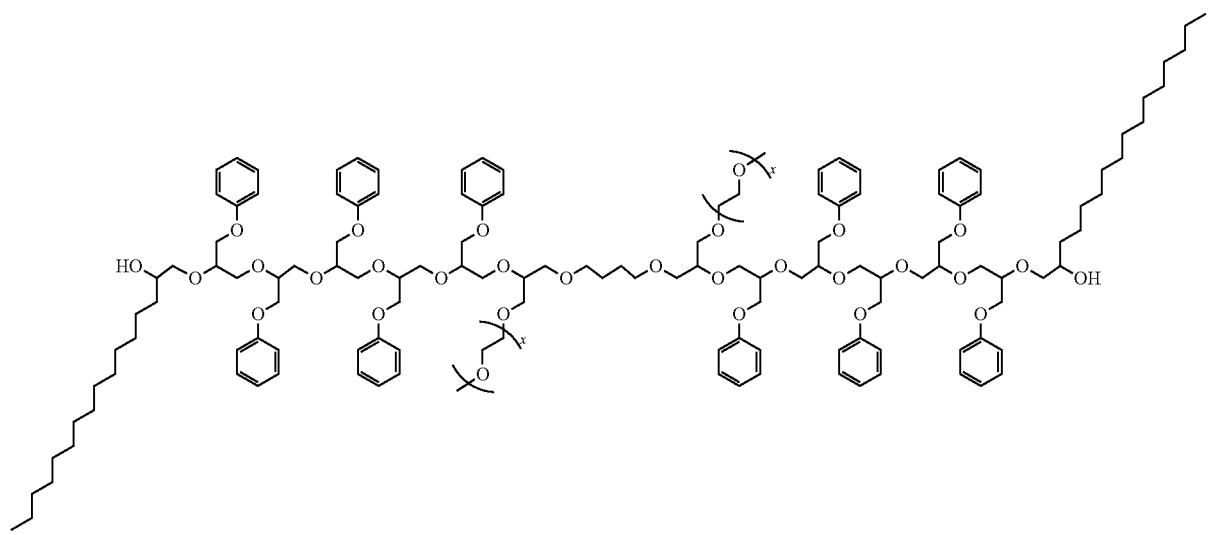

In another "reverse synthesis" strategy, a di- or polyfunctional carboxylic acid, ester, anhydride, or acid chloride, or a di- or polyisocyanate, or with a di- or polyfunctional aryl sulfonyl halide can be used to quench free hydroxyl groups in a finishing step after growing a chain from the ether-capped polyalkylene glycol and a phenyl glycidyl ether. The following dispersants illustrates products made by this strategy:

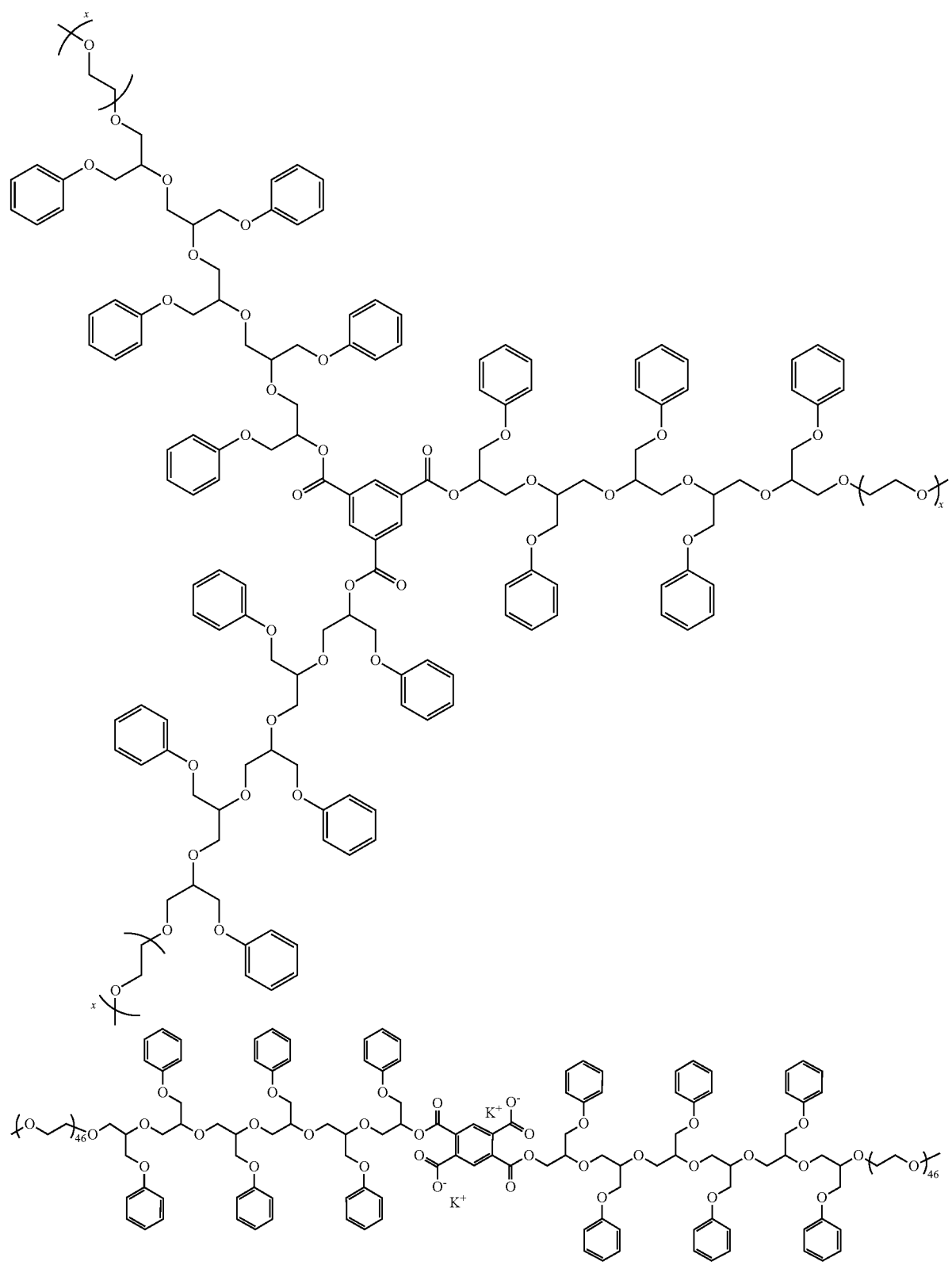

Functionalized Olycidyl Ethers

Commercially available 1-ethoxyethyl glycidyl ether (i.e., 2-[(1-ethoxyethoxy)-methyl]oxirane) can be used to introduce an acid-sensitive hemiacetal (RO—CH(CH$_3$)OEt) as the functional handle. Subsequent treatment with an acid liberates the alcohol (ROH), which can be converted to a phosphate, sulfate, acetate, or other useful functionalities (see Scheme 4).

Capping Groups and Reactions

In some aspects, the copolymer dispersants may include a capping group. The capping group can be used to cap some or all of the available hydroxyl groups of the alkoxylates.

Reacting triethanolamine with PGE, followed by ethoxylation and capping with enough succinic anhydride to react with a third of the hydroxyl groups gives this dispersant:

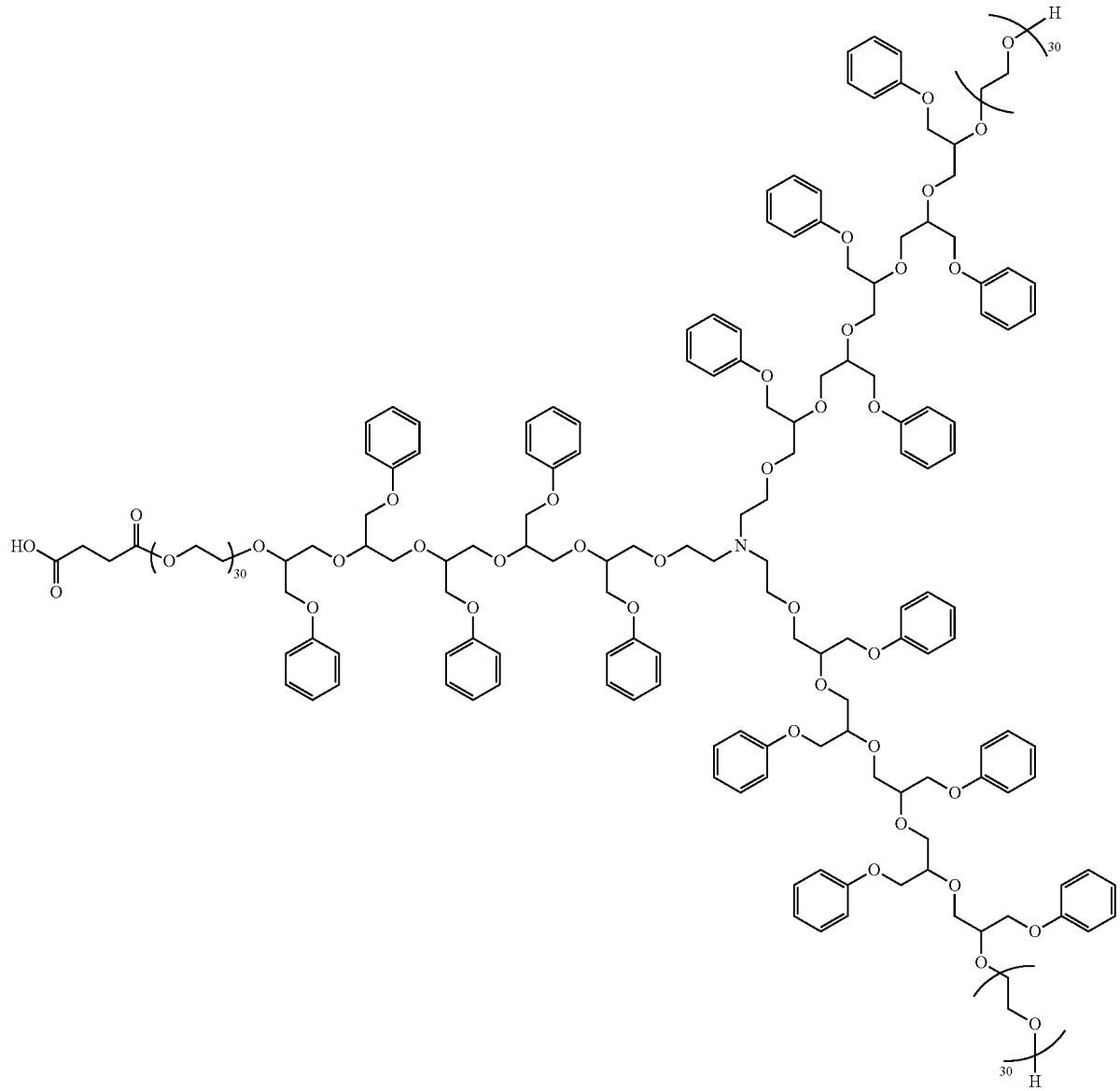

Suitable capping groups for hydroxy-functional polymers are well known. Examples include ethers, esters, carbonates, carbamates, carbamimidic esters, borates, sulfates, phosphates, phosphatidylcholines, ether acids, ester alcohols, ester acids, ether diacids, ether amines, ether ammoniums, ether amides, ether sulfonates, ether betaines, ether sulfobetaines, ether phosphonates, phospholanes, phospholane oxides, and the like, and combinations thereof. For structures of many of these capping groups, see Scheme 5, below. Scheme 6 illustrates acetylation, phosphation, sulfation, and alkylamination as possible capping approaches.

Succinic anhydride, for instance, can be used to cap some or all of the available hydroxyl end groups of a dispersant. Deprotonation of the resulting carboxylic acid groups can significantly change the hydrophilicity of the dispersant.

Further Reaction at Sulfur or Nitrogen; Split Tails:

As noted above, nitrogen atoms from the nucleophilic initiator can be alkylated or oxidized to give quaternized compositions or amine oxides, respectively. Similarly, sulfur atoms from the nucleophilic initiator can be oxidized to sulfoxide functionality, sulfone functionality, or both. Scheme 7 provides some illustrations.

In some aspects, it may be desirable to introduce further branching into the hydrophobe prior to alkoxylation. This can be accomplished by reacting the prepared hydrophobe with 1-ethoxyethyl glycidyl ether followed by acid-mediated hydrolysis of the residual hemiacetal functionality to effectively double the number of free hydroxyl groups available for alkoxylation. For example, reaction of trimethylolpropane with about five equivalents of PGE to give the hydrophobe, followed by reaction with an equivalent of 1-ethoxyethyl glycidyl ether, acid-mediated hydrolysis to liberate the additional hydroxyl functionalities from the hemiacetals, and then ethoxylation provides a dispersant having the structure shown immediately below.

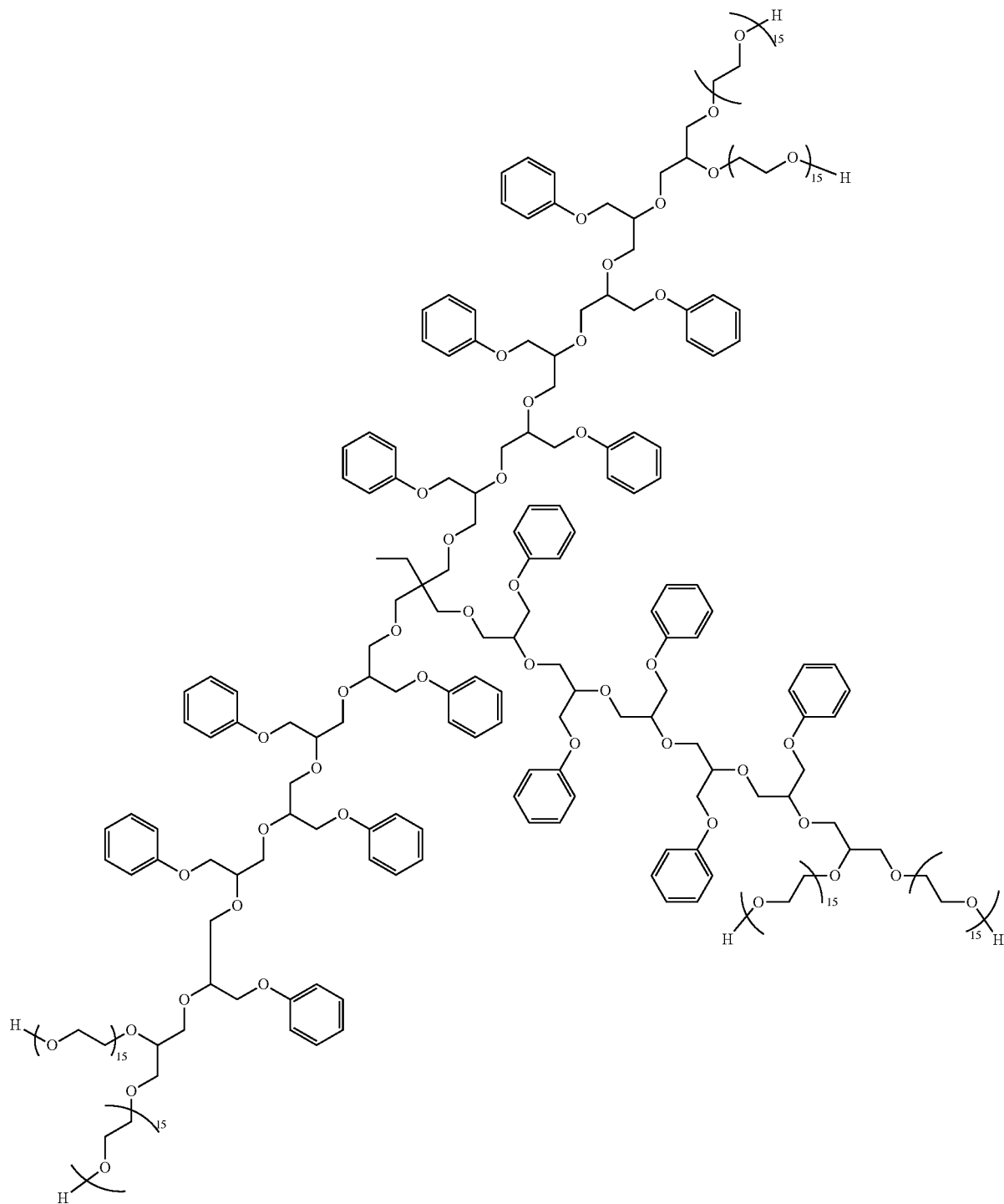

Scheme 8 illustrates syntheses of hydrophobes attached to split EO tails using either a forward or a forward-and-reverse synthetic strategy.

Scheme 4. Incorporation of a Functionalized Glycidyl Ether
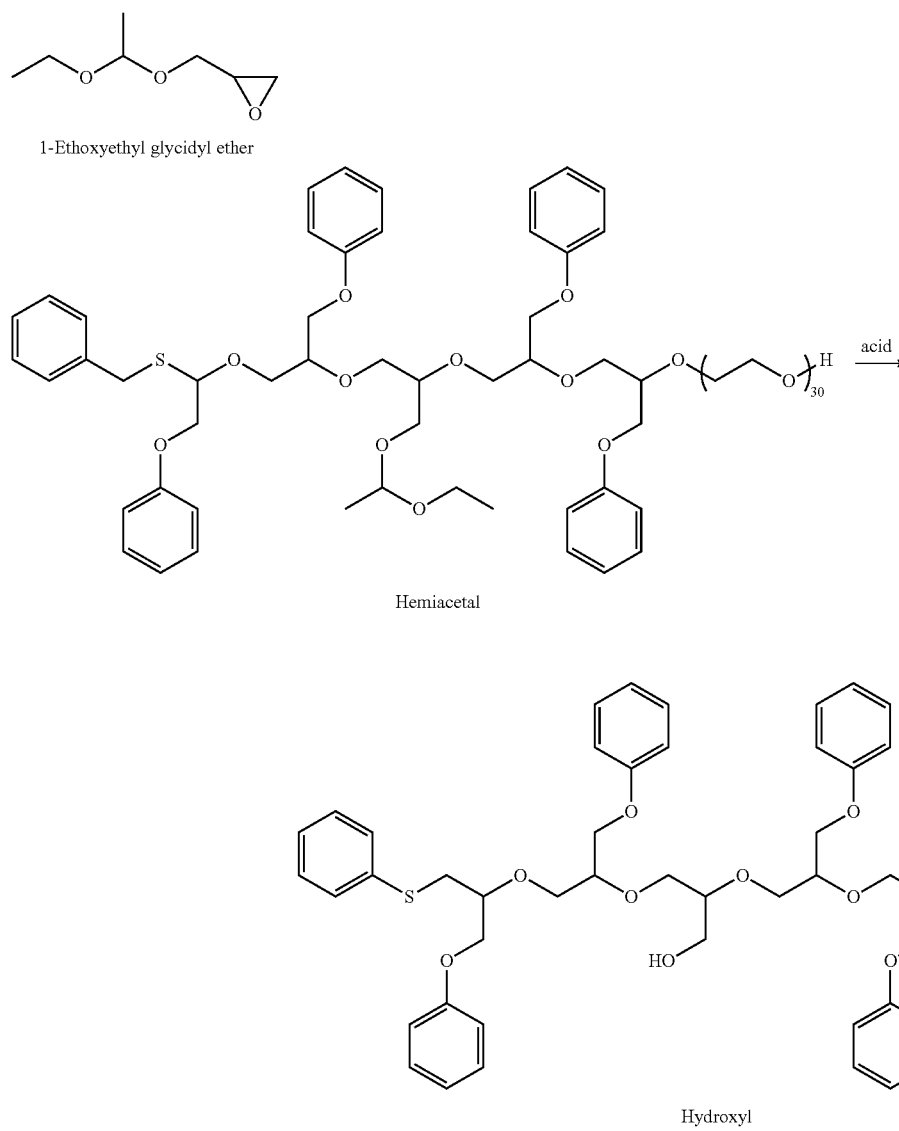
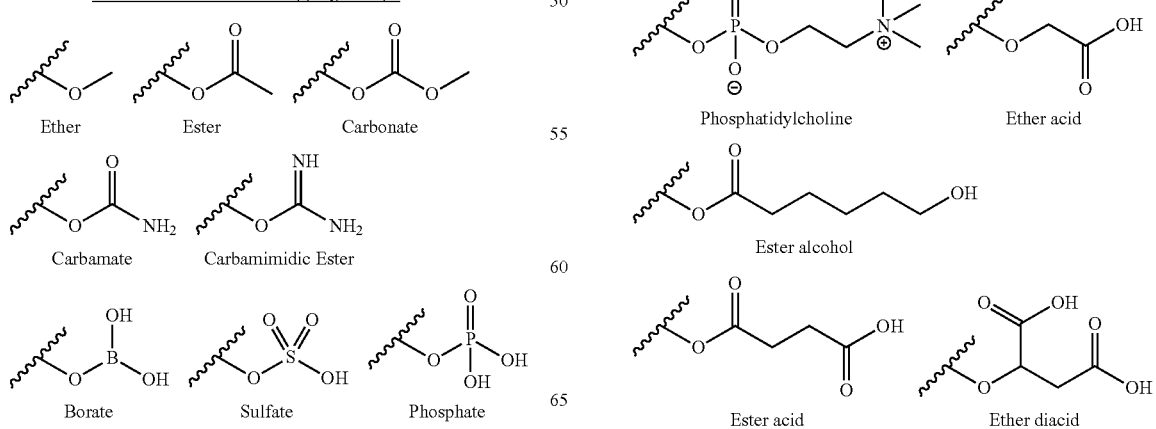

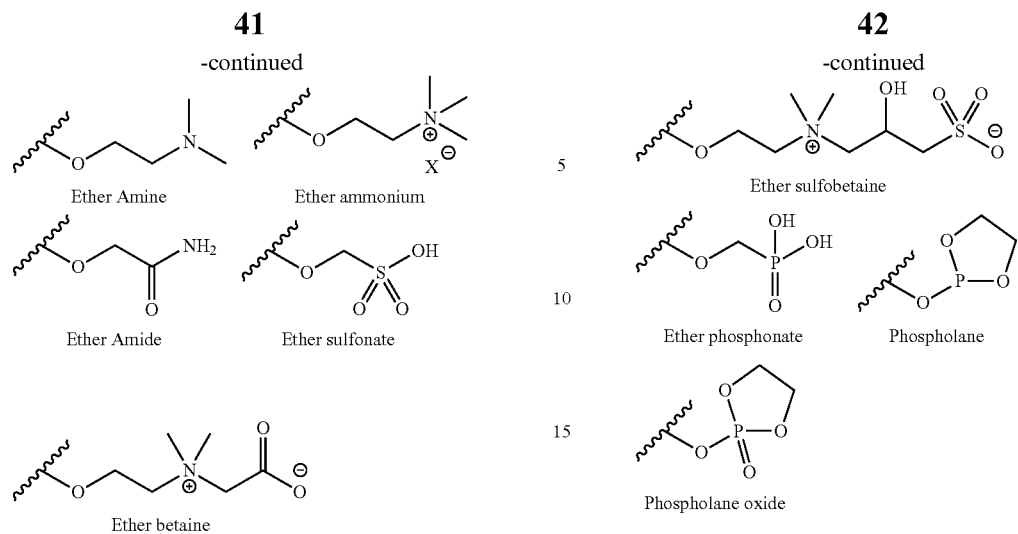
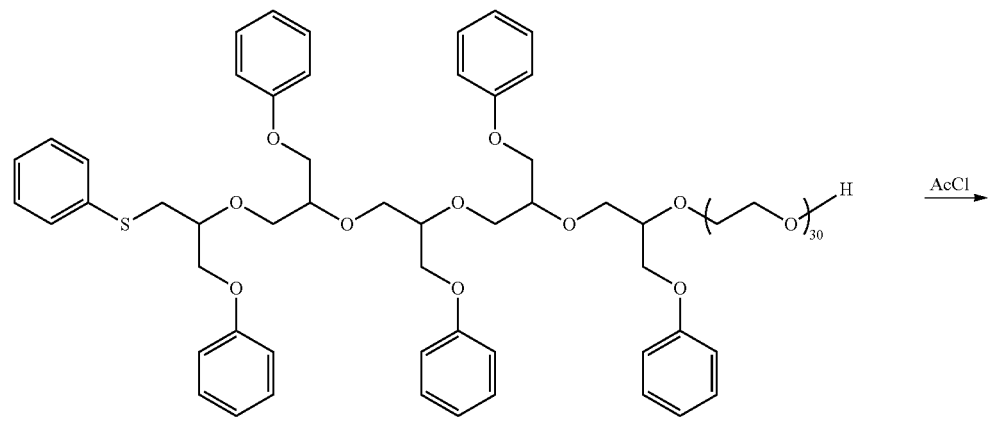
Scheme 6: Capping Reactions
Acetylation
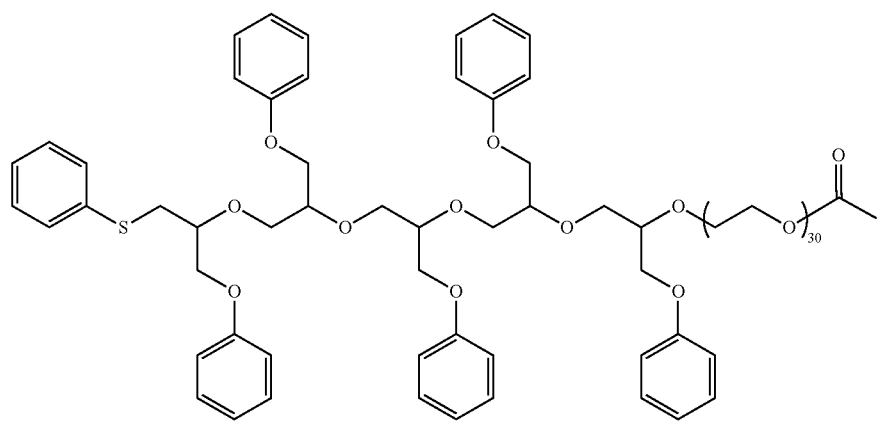

Phosphation
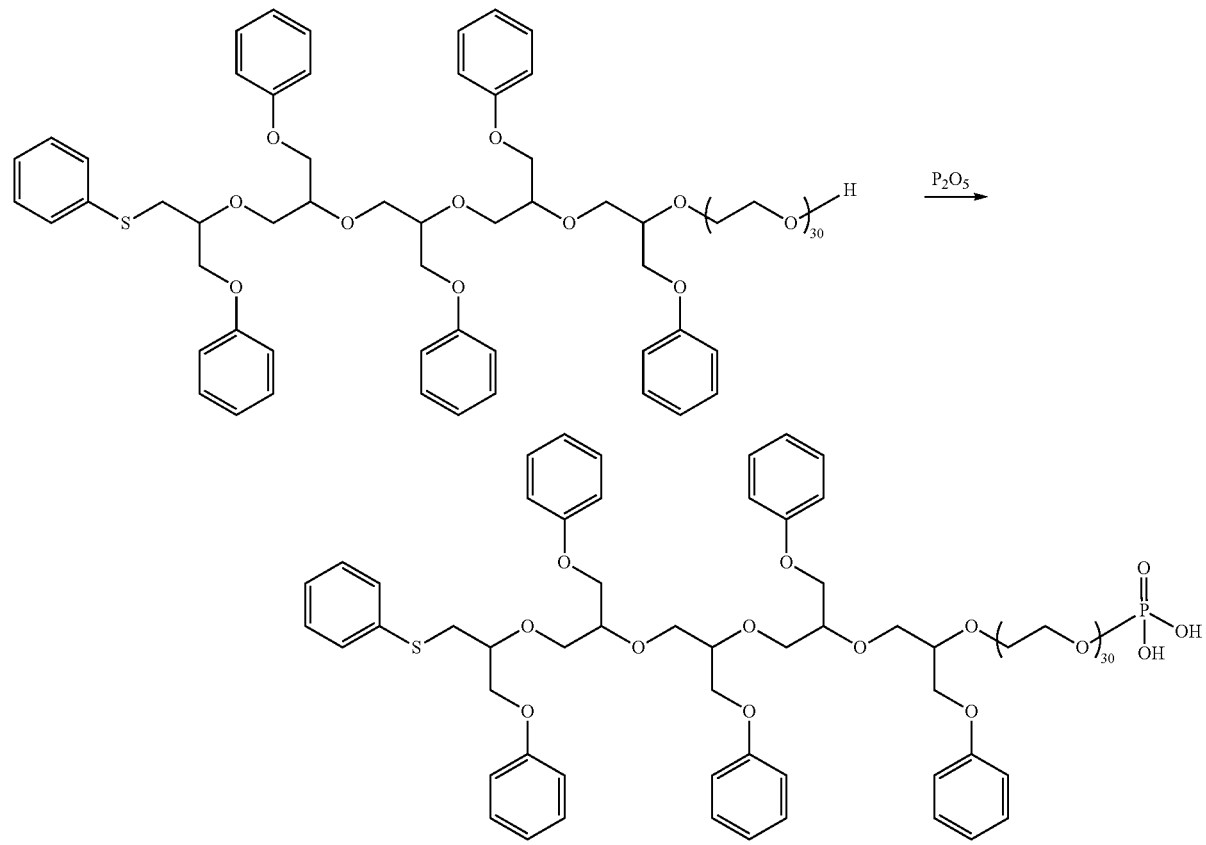
Sulfation
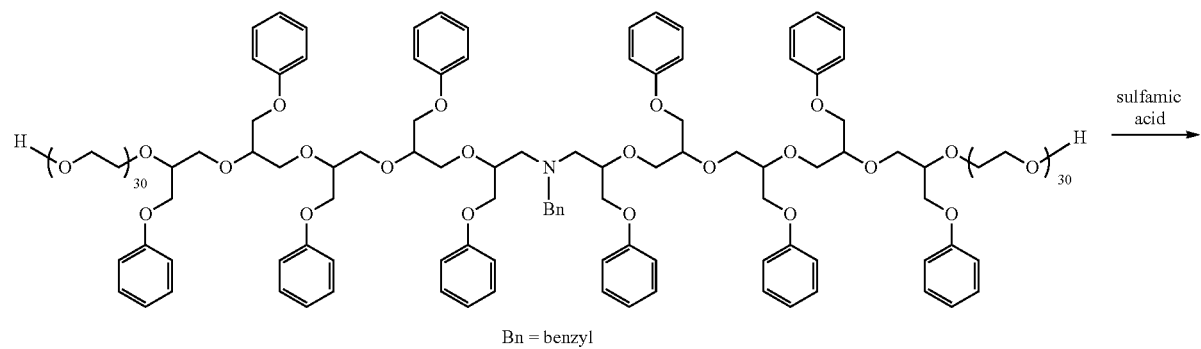
Bn = benzyl
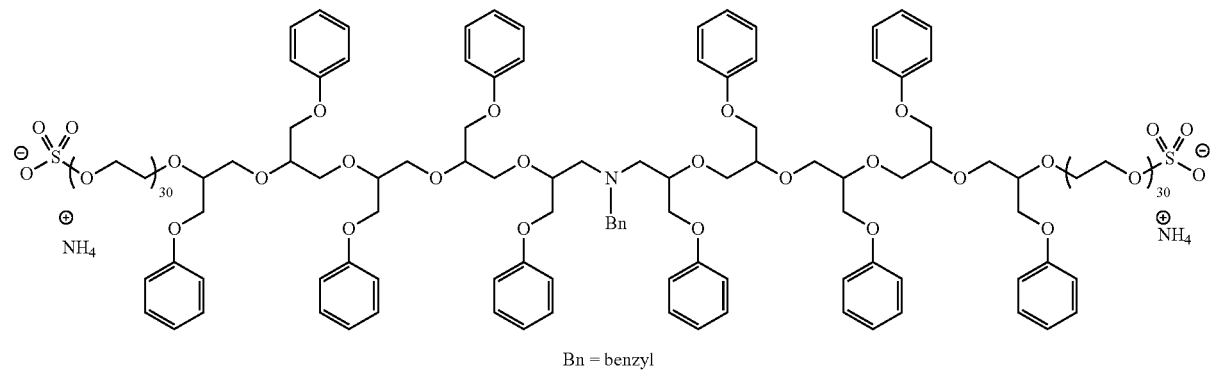
Bn = benzyl

Alkylamination
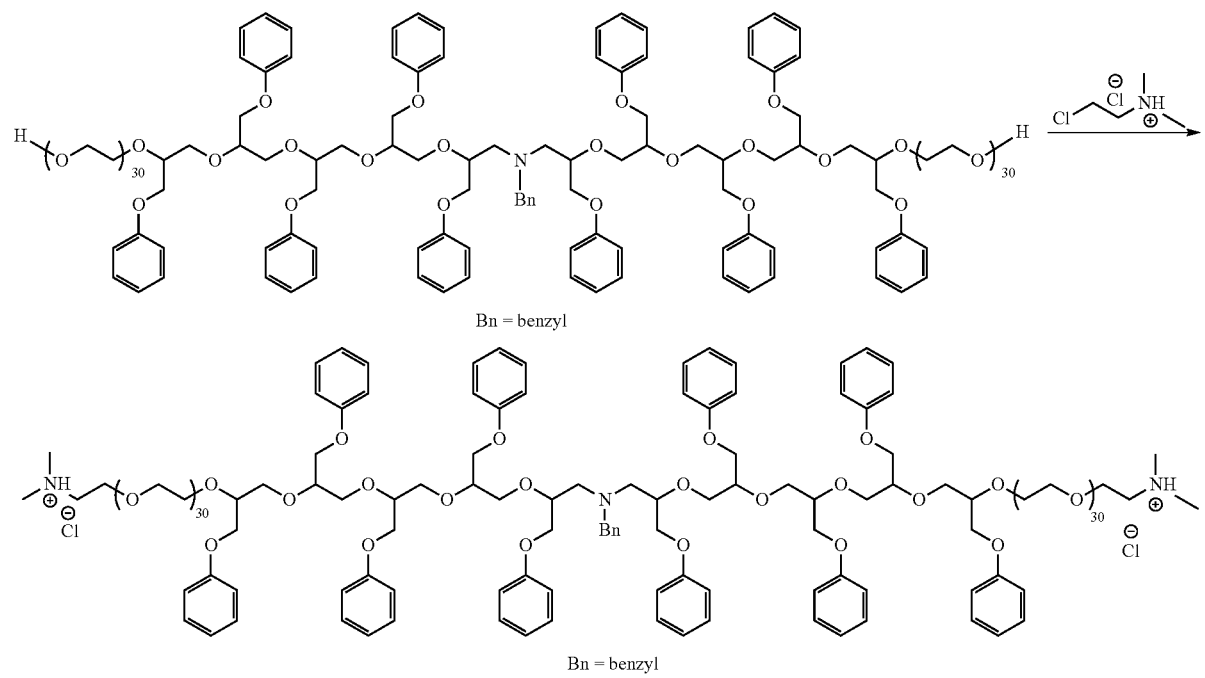
Bn = benzyl
Scheme 7. Further Functionalization of Nitrogen or Sulfur Atoms
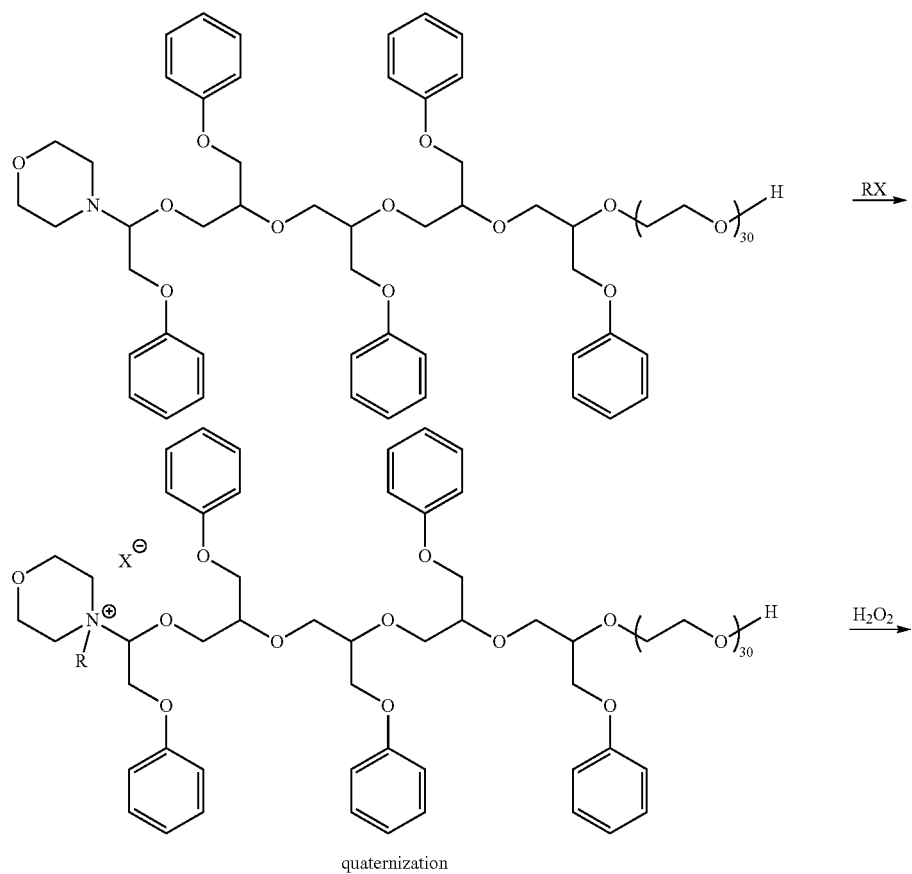
quaternization -continued
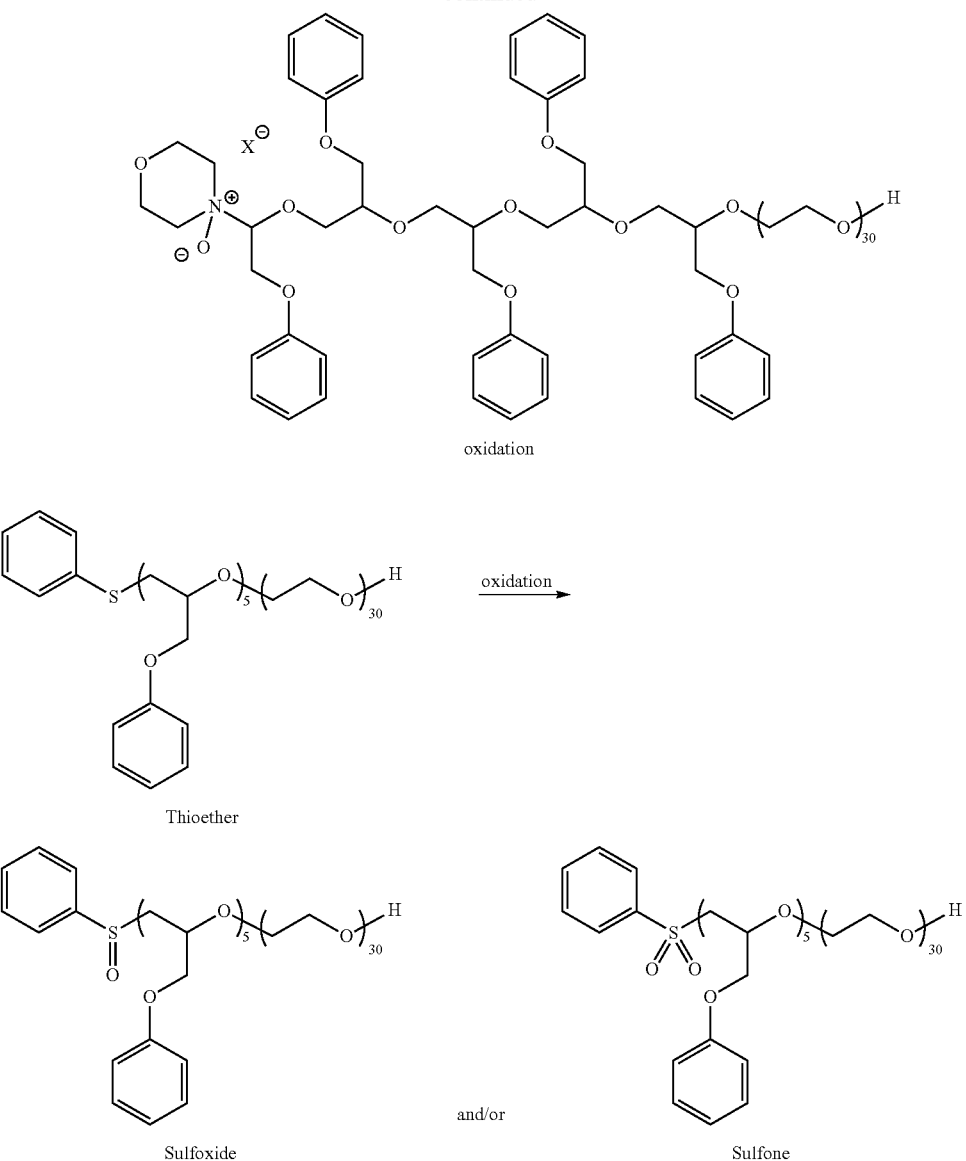
Scheme 8. Dispersants with Split Tails
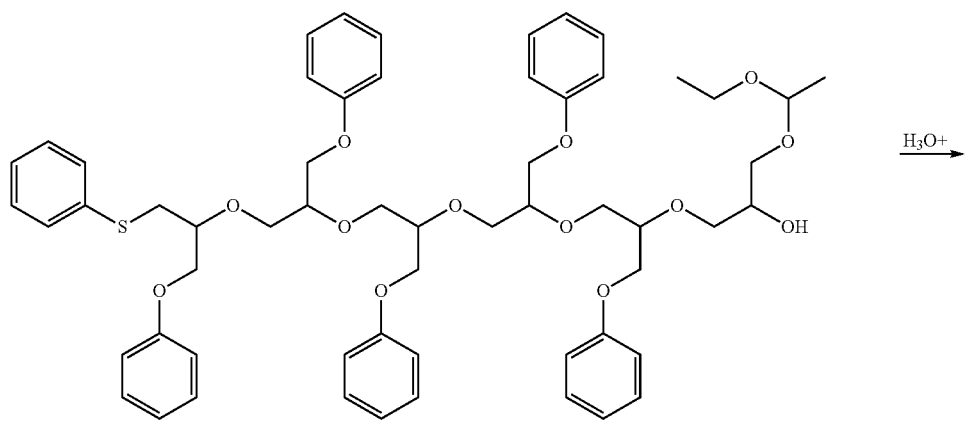

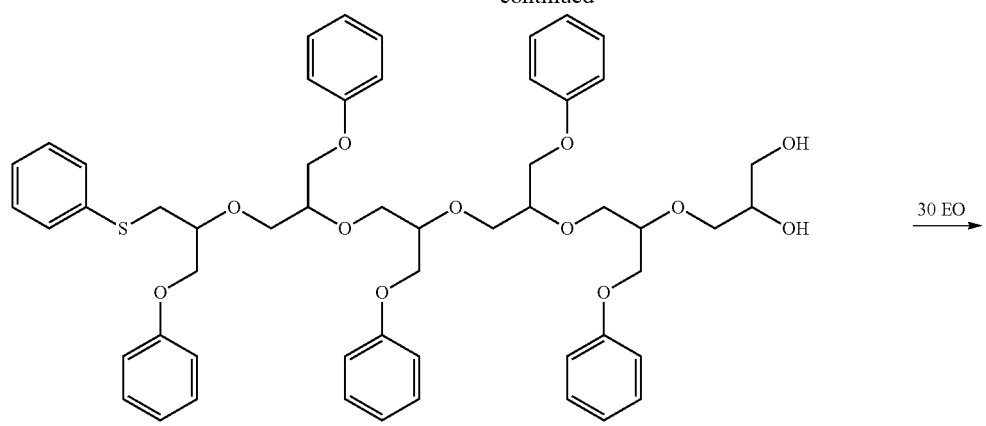
30 EO →
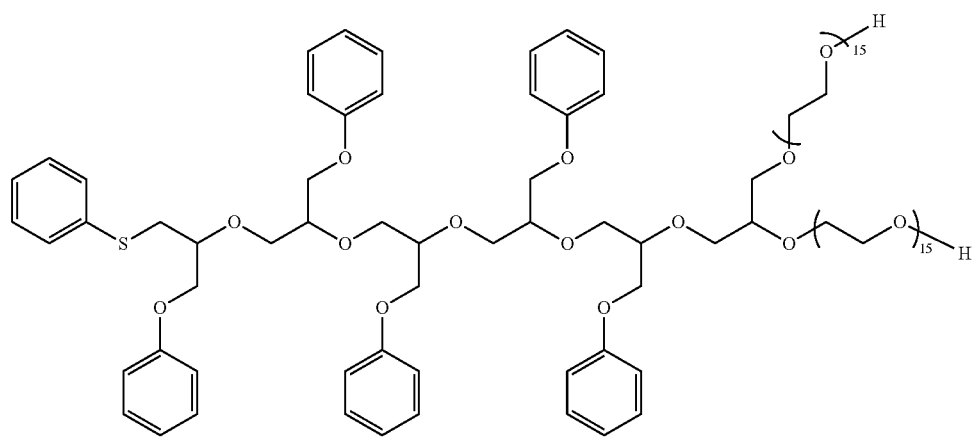
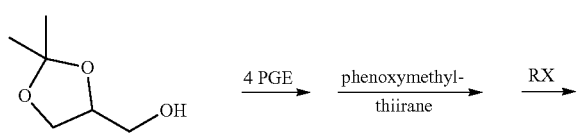
4 PGE → phenoxymethyl-thiirane → RX →
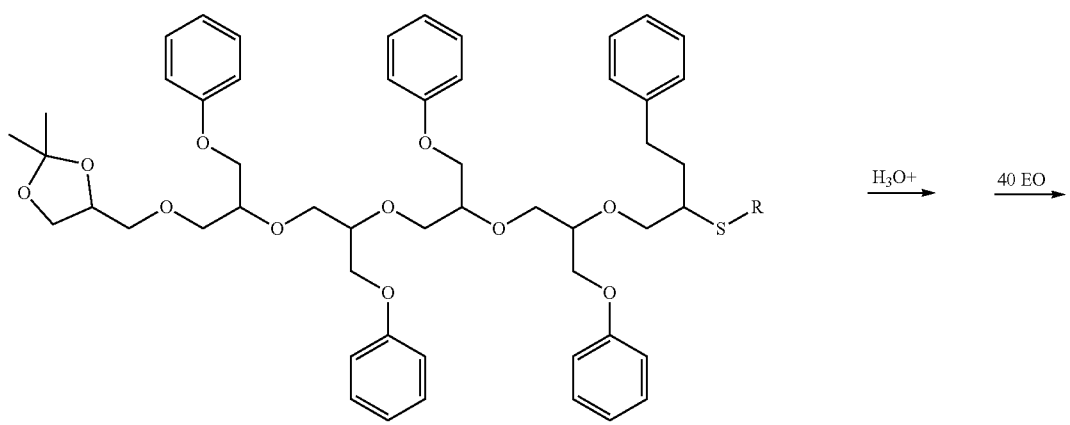
H₃O+ → 40 EO →

-continued

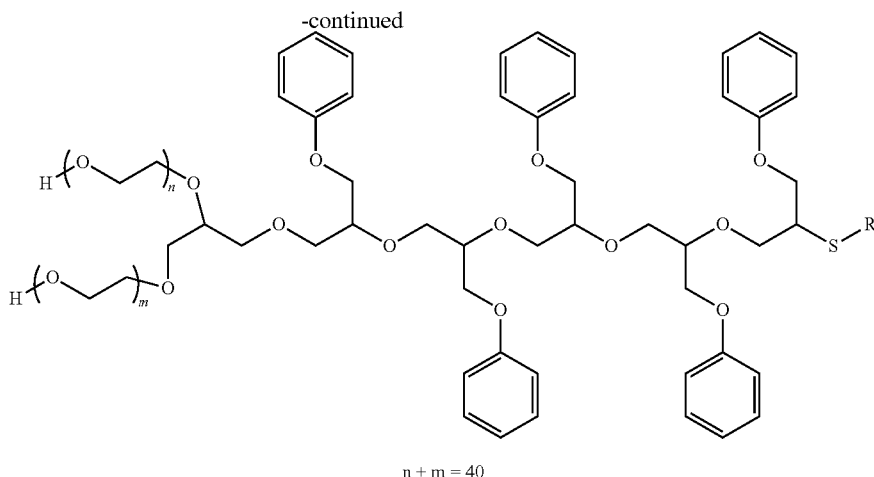

n + m = 40

Sulfonation/Sulfation of Aromatic Rings

In some aspects, it may be desirable to use conventional sulfonating agents, e.g., sulfur trioxide, to sulfonate some portion of the aromatic rings present in the dispersant. Thus, aromatic rings from recurring units of phenyl glycidyl ether, 2-methylphenyl glycidyl ether, styrene oxide, or other aromatic rings can be sulfonated to introduce sulfonate groups into the dispersant. In one example, triethanolamine-PGE (18)-EO(105) is reacted with sulfur trioxide under conditions effective to sulfonate at least a portion of the aromatic rings. Under typical sulfonation conditions, free hydroxyl groups will also be sulfated, and in some cases a mixed sulfate/sulfonate will be the desired end product. In that case, the reaction product is simply neutralized with a suitable base. If only a sulfonate is desired, any sulfates generated can be hydrolyzed, e.g., with dilute acid treatment, to regenerate free hydroxyl groups.

Pigments:

Suitable pigments for use in making the pigment dispersions are well known and readily available. Many of the pigments are organic compounds, although inorganic pigments are also common. Examples appear in U.S. Pat. No. 7,442,724, the teachings of which are incorporated herein by reference. Suitable organic pigments include, for example, monoazos, diazos, anthraquinones, anthrapyrimidines, quinacridones, quinophthalones, dioxazines, flavanthrones, indanthrones, isoindolines, isoindolinones, metal complexes, perinones, perylenes, phthalocyanines, pyranthrones, thioindigos, triphenylmethanes, anilines, benzimidazolones, diarylides, diketopyrrolopyrroles, naphthols, and aldazines. Suitable inorganic pigments include, for example, white pigments, black pigments, chromatic pigments, and luster pigments.

Pigment Dispersions:

The copolymers are useful for preparing pigment dispersions, especially water-based pigment dispersions. Many of the inventive copolymers are relatively soluble in water and provide stable dispersant solutions or emulsions. The pH of the dispersant solution or emulsion is usually adjusted with acid (e.g., hydrogen chloride) or base (e.g., sodium hydroxide) to be within the range of 3 to 12, or in some aspects, within the range of 7 to 11, or 8 to 10, or 8.5 to 9.5. Pigments are combined with a carrier (preferably water), the copolymer, and any pH adjusting agent, biocide, defoamer, rheology modifier, stabilizer, or other desired components to give a mixture with the desired proportion of copolymer to pigment. Typically, the solids content of the pigment dispersion will be within the range of 5 to 95 wt. %, 15 to 90 wt. %, or 25 to 85 wt. %. The mixtures are preferably milled, for instance in a paint mixer with metal, ceramic, or glass balls, to produce pigment dispersions that can be evaluated for relevant physical properties.

A desirable aqueous pigment dispersion will have low viscosity and an intermediate particle size. For instance, the dispersion desirably has a viscosity less than 5,000 cP at 25° C. and a shear rate of 10 s$^{-1}$, preferably less than 3,000 cP at 25° C. and a shear rate of 10 s$^{-1}$, more preferably less than 1,000 cP at 25° C. and a shear rate of 10 s$^{-1}$. This shear rate corresponds to the amount of shear typically experienced by the dispersion during pouring. The particle size of the aqueous dispersion, as measured by dynamic light scattering (or other suitable techniques) should be within the range of 100 nm to 1000 nm, preferably from 100 nm to 500 nm or from 100 nm to 300 nm.

Desirable pigments dispersions make efficient use of the dispersant, which is usually a relatively expensive component of the dispersion. In other words, the less dispersant needed for a given amount of pigment, the better. The usage level requirements for the present copolymers can vary, but typically range from 0.5 to 80 wt. %, 2 to 60 wt. %, or 3 to 50 wt. % of copolymer dispersant based on the total amount of pigment dispersion.

Productivity also matters. The ability to produce a good dispersion in a short time translates into reduced overall cost. We found that the inventive copolymers can give stable, non-viscous dispersions having desirable particle sizes expeditiously with many pigments.

Shorthand Names

It is convenient to name the copolymers by indicating the initiator used followed by PGE(x)AO(y) to indicate the number of moles of the phenyl glycidyl ether and alkylene oxide used to make the copolymer. When a capping group is used, a designation can be added after the alkylene oxide portion. Thus, a reaction product of morpholine with 5 moles of phenyl glycidyl ether and then 20 moles of ethylene oxide is conveniently abbreviated as: "morpholine-PGE(5)-EO(20)." When the nucleophilic initiator has more than one active hydrogen, the average number of PGE or EO units per arm can be approximated by dividing the total number of moles of PGE or EO indicated by the functionality of the initiator. Thus, "pentaerythritol-PGE(20)-EO(120)," an initiator with functionality=4, nominally has an average of 5

PGE units and 30 EO units per arm, although as the skilled person will appreciate, these values are approximations. The conventions are used in the examples below.

Certain inventive copolymers may provide advantages when combined with particular pigments. We found, for instance, that monoazo yellow pigment provides an excellent aqueous dispersion when used at pH 8 to 10 in combination with the dispersants or dispersant blends listed in Tables 4, 4A, 4B and 5. Similarly, quinacridone violet pigment provides an excellent aqueous dispersion when used at pH 8 to 10 in combination with the dispersants or dispersant blends listed in Tables 6 and 6A. Phthalocyanine blue provides an excellent aqueous dispersion when used at pH 8 to 10 when used in combination with the dispersants or dispersant blends listed in Tables 7, 8, 9, and 10.

Latex Emulsion Stabilization

In one aspect, the invention includes a method which comprises stabilizing flow properties of an emulsion latex polymer. The method protects against temperature-induced changes in the properties that occur within the range of −20° C. to 50° C. The method comprises combining the emulsion latex polymer with an effective amount of a dispersant composition produced by combining the copolymers described herein with water.

Alkyd Compositions

In another aspect, the invention relates to a method of enhancing the hydrophobic character of an alkyd coating. This method comprises combining an alkyd resin with an effective amount of a dispersant composition comprising the copolymers described herein and a non-aqueous carrier such as an organic solvent. In a preferred aspect, the alkyd resin comprises a reaction product of glycerol, soybean oil, and isophthalic acid.

Agricultural Applications

The inventive copolymers are useful in agricultural formulations as emulsifiers, as dispersants for suspension concentrates, as dispersants for seed coatings, as wetting agents, as spreaders, as adjuvants to promote the uptake of actives into leaf surfaces, and as dispersant components of water-dispersible granules. We found, for instance, that the copolymers perform as well as or better than controls as dispersants for wettable powders from atrazine, chlorothalonil, or imidacloprid (see Table 15, below). Good suspension concentrates comprising the inventive copolymers can also be made (see, e.g., Table 16, below). Suitable carriers for agricultural applications, particularly emulsions or suspension concentrates, include organic solvents, water, and combinations of water and water-miscible organic solvents.

Other Applications

The polymers can be used to disperse solids (e.g., organic and/or inorganic pigments, fillers or latex) in coatings as is discussed above and in greater detail below related to organic and inorganic pigments, especially organic pigments. However, the polymers can also be used in agricultural applications (as discussed above) and as dispersants for other particulate materials, such as cement, minerals, asphaltene, or particulate soils. The polymers may also find utility as rheology modifiers, foamers, defoamers, or auxiliary components of laundry detergents or personal care products, including cleansers and cosmetics. The polymers may also be useful as coating additives, where they could enhance film quality as compatibilizers, adhesion promoters or leveling agents.

The following examples illustrate the invention; the skilled person will recognize many variations that are within the spirit of the invention and scope of the claims.

TABLE 1

PGE Dispersants

Comparative

| | |
|---|---|
| butanol-PGE(6.4)-EO(20) | phenol-PGE(5)-EO(30) |
| butanol-PGE(6.4)-EO(30) | phenol-PGE(5)-EO(40) |
| butanol-PGE(6.4)-EO(40) | |

Inventive

| | |
|---|---|
| 4-aminobenzenethiol-PGE(15)-EO(90) | morpholine-PGE(5)-EO/PO(24:6) random |
| benzenesulfonamide-PGE(10)-EO(60) | morpholine-PGE(5)-EO/PO(5:1) random |
| benzylamine-PGE(10)-EO(40) | morpholine-PGE(5)-PO(5)-EO(25) |
| benzylamine-PGE(10)-EO(60) | morpholine-PGE(5)-PO(25)-EO(5) |
| benzylamine-PGE(10)-EO(80) | morpholine-PGE(5)-EO(25)-PO(5) |
| bisphenol A-PGE(10)-EO(60) | morpholine-PGE(25)-EO(30) |
| bisphenol A-PGE(10)-EO(90) | morpholine-PGE(3)-EO(30) |
| bisphenol A-PGE(10)-EO(110) | morpholine-PGE(8)-EO(30) |
| bisphenol S-PGE(10)-EO(40) | morpholine-PGE(15)-EO(30) |
| bisphenol S-PGE(10)-EO(60) | 1,8-octanediol-PGE(10)-EO(40) |
| bisphenol S-PGE(10)-EO(80) | 1,8-octanediol-PGE(10)-EO(60) |
| 2-butyne-1,4-diol-PGE(10)-EO(60) | 1,8-octanediol-PGE(10)-EO(80) |
| 1,4-cyclohexanedimethanol-PGE(10)-EO(60) | pentaerythritol-PGE(20)-EO(120) |
| diethanolamine-PGE(15)-EO(90) | piperazine-PGE(10)-EO(60) |
| ethylenediamine-PGE(20)-EO(120) | 1,3-propanediol-PGE(10)-EO(40) |
| 2,2'-(ethylenedioxy)diethanethiol-PGE(10)-EO(60) | 1,3-propanediol-PGE(10)-EO(60) |
| farnesol-PGE(5)-EO(20) | 1,3-propanediol-PGE(10)-EO(80) |
| farnesol-PGE(5)-EO(30) | resorcinol-PGE(10)-EO(40) |
| farnesol-PGE(5)-EO(40) | resorcinol-PGE(10)-EO(60) |
| isosorbide-PGE(10)-EO(60) | resorcinol-PGE(10)-EO(80) |
| isosorbide-SO(10)-EO(60) | thiophenol-PGE(5)-EO(20) |
| isosorbide-SO(10)-EO(80) | thiophenol-PGE(5)-EO(30) |
| N-methylaniline-PGE(5)-EO(20) | thiophenol-PGE(5)-EO(40) |
| N-methylaniline-PGE(5)-EO(30) | triethanolamine-PGE(15)-EO(90) |
| N-methylaniline-PGE(5)-EO(40) | triethanolamine-PGE(18)-EO(105) |
| morpholine-PGE(5)-EO(20) | triethanolamine-PGE(15)-PO(15)-EO(75) |

TABLE 1-continued

PGE Dispersants morpholine-PGE(5)-EO(30)
morpholine-PGE(5)-EO(40)
triethanolamine-PGE(15)-PO(21)-EO(105)
trimethylolpropane-PGE(15)-EO(90)

PGE = phenyl glycidyl ether;
EO = ethylene oxide;
PO = propylene oxide;
SO = styrene oxide

TABLE 1A

More PGE Dispersants
Inventive di(pentaerythritol)-PGE(30)-EO(120)
di(pentaerythritol)-PGE(30)-EO(180)
di(pentaerythritol)-PGE(30)-EO(210)
di(pentaerythritol)-PGE(30)-EO(240)
di(trimethylolpropane)-PGE(20)-EO(120)
3[mPEG2000-PGE(5)]-4-aminophenol triglycidyl ether
2[mPEG2000-PGE(6)]-dipotassium 1,2,4,5-benzene dicarboxylate
3[mPEG2000-PGE(6)]-1,3,5-benzenetricarbonyl
octylamine-PGE(10)-EO(60)
resorcinol DGE-1-dodecanethiol(2)-PGE(10)-EO(60)
resorcinol DGE-1-dodecanethiol(2)-PGE(10)-EO(80)
resorcinol DGE-1-dodecanethiol(2)-PGE(10)-EO(100)
triethanolamine-EHGE(3)-PGE(15)-EO(86)
triethanolamine-EHGE(3)-PGE(15)-EO(120)
triethanolamine-EHGE(3)-PGE(15)-EO(150)
triethanolamine-PGE(15)-EO(90)-SA(3)
triethanolamine-PGE(15)-EO(90)-SA(2)
triethanolamine-PGE(15)-EO(90)-SA(1)
triethanolamine-PGE(15)-GE(3)-EO(180)-SA(0.6)
triethanolamine-PGE(15)-GE(3)-EO(180)-SA(1.2)
triethanolamine-PGE(15)-GE(3)-EO(180)-SA(1.8)
triethanolamine-PGE(15)-GE(3)-EO(240)-SA(0.6)
triethanolamine-PGE(15)-GE(3)-EO(240)-SA(1.2)
triethanolamine-PGE(15)-GE(3)-EO(240)-SA(1.8)
triethanolamine-PGE(15)-EO(90)-BS (1:2)
triethanolamine-PGE(15)-EO(90)-BS (1:6)
triethanolamine-PGE(18)-[SO$_3$H(0.6)]-EO(105)
triethanolamine-PGE(18)-[SO$_3$H(0.6)]-EO(105)-SO$_3$H(3)
trimethylolpropane-AGE(3)-PGE(15)-EO(90)
trimethylolpropane-PGE(15)-GE(3)-EO(180)
trimethylolpropane-PGE(16)-GE(3)-EO(90)
trimethylolpropane-PGE(16)-GE(3)-EO(120)
trimethylolpropane-PGE(16)-GE(3)-EO(180)
trimethylolpropane-PGE(16)-GE(3)-EO(240)
2,4,6-tristyrylphenol-PGE(5)-EO(20)
2,4,6-tristyrylphenol-PGE(5)-EO(30)
2,4,6-tristyrylphenol-PGE(5)-EO(40)
2,4,6-tristyrylphenol-PGE(5)-EO(50)

AGE = allyl glycidyl ether;
DGE = diglycidyl ether;
PGE = phenyl glycidyl ether;
EO = ethylene oxide;
SA = succinic anhydride to cap;
BS = 1,4-butanesultone, 1/6 or 1/2 cap;
GE = glycidyl ether residue following acid-mediated deprotection after initial reaction with 1-ethoxyethyl glycidyl ether

TABLE 1B

More PGE Hydrophobes
Inventive 4-aminothiophenol-PGE(15)
benzenesulfonamide-PGE(10)
4,4'-diaminodiphenylmethane-PGE(20)
1,6-dihydroxynaphthalene-PGE(10)
2,2'-(ethylenedioxy)diethanethiol-PGE(10)
imidazole-PGE(5)
1,2-O-isopropylidene-α,D-glucofuranose-PGE(15)
2-mercaptoethanol-PGE(10)
morpholine-PGE(15)
morpholine-PGE(25)

TABLE 1B-continued

More PGE Hydrophobes
Inventive oleylamine-PGE(10)
pentaerythritol-styrene oxide(20)*
2,4,7,9-tetramethyl-5-decyn-4,7-diol-PGE(10)
thiophenol-PGE(4)-2-ethylhexyl glycidyl ether(1)
triethanolamine-2-biphenyl glycidyl ether(3)-PGE(9)
triethanolamine-3,4-epoxytetrahydrofuran(3)-PGE(12)
triethanolamine-1,2-epoxyhexadecane(3)-PGE(15)
triethanolamine-MPGE(15)

*In some aspects, it may be desirable to use styrene oxide to replace some or all of the PGE.
PGE = phenyl glycidyl ether;
MPGE = 2-methylphenyl glycidyl ether Synthesis of Polymeric Dispersants The procedures below can be used to produce the wide variety of inventive copolymers listed in Tables 1 and 1A. Additional dispersants are can be made similarly by adding ethylene oxide, propylene oxide, or combinations thereof, and optionally a capping group, to the hydrophobes listed in Table 1B.

1. Hydrophobe Synthesis (General Procedure):

A 4-neck round-bottom flask is equipped with a heating mantle, a temperature controller, an overhead stirrer, a thermocouple, a nitrogen inlet with a sparging tube, and a distillation adapter. To the adapter is attached an addition funnel, a water-cooled condenser, a gas outlet bubbler, and a collection flask. Under a flow of nitrogen, the flask is charged with a nucleophilic initiator and methyl tert-butyl ether (MTBE). The mass of MTBE used is about 2-3 times that of the nucleophilic initiator. Solid potassium methoxide is added, and the mixture is heated to 55-65° C. Rapid distillation of MTBE begins, and the first of five additions of phenyl glycidyl ether (PGE) from the addition funnel commences. For each addition, one equivalent of PGE is added for each mole of alcohol, disubstituted amine, or thiol initiator, and two equivalents of PGE are added for each mole of monosubstituted amine initiator. When the first addition is complete, and most of the MTBE has distilled off, the reaction temperature is slowly increased until an initial exotherm is observed. Depending on the identity of the nucleophilic initiator, the exotherm commences anywhere within the range of 70° C. to 140° C. During the first and subsequent exotherms, the reaction temperature is controlled by adjusting the stirring rate or the temperature set point, or by removing the heating mantle. When the first exotherm subsides, a second addition of PGE begins. From this point on, the reaction temperature is maintained within the range of 100° C. to 120° C. The remaining three additions of PGE proceed as before. After all of the PGE is added, the reaction temperature is kept at 105° C., and reaction progress is gauged by monitoring the consumption of PGE by $^1$H NMR. When the reaction is complete, the product is used in the next step without further manipulation. In general, the isolated material contains 0.35-0.55 wt. % potassium. The product is a mixture of compounds with an average of five units of PGE per nucleophilic site on the initiator.

2. Hydrophobe Alkoxylation (General Procedure):

A 600-mL Parr reactor, equipped with a mechanical stirrer, a nitrogen sparger, a thermocouple, and a sample port is charged with the potassium-containing hydrophobe prepared as described above. The reactor is sealed and the contents are slowly heated to 120° C. When the target temperature is reached, one or more alkylene oxides are added to begin the alkoxylation. For monoblock tails composed of a single alkylene oxide monomer or a random mixture of two or more alkylene oxide monomers, the alkylene oxide monomer(s) is(are) added in batches until the targeted number of moles of monomer have reacted. For tails composed of more than one alkylene oxide block, the above procedure is repeated for each additional segment. When the alkoxylation is considered complete, the product is removed from the reactor at 80-90° C.

Additional Synthetic Examples

1. Resorcinol diglycidyl ether-1-dodecanethiol(2)-PGE(10)

portion-wise addition of warmed (54° C.) resorcinol diglycidyl ether (40.0 g, 180 mmol) commences. The reagent is introduced by intermittently removing the gas outlet and adding the warm liquid by pipette. During the addition, the reaction temperature is maintained at or below 133° C. by controlling the rate of reagent addition and the stirring rate. After 10 min., the addition is complete, and the reaction mixture stirs and cools to 100° C. Complete consumption of resorcinol diglycidyl ether is observed by $^1$H NMR after stirring for 1 h at 100° C.

An addition funnel charged with phenyl glycidyl ether (270.4 g, 1801 mmol) is introduced, and the glycidyl ether is added over 34 min. while maintaining the reaction temperature at or below 123° C. by controlling the rate of reagent addition and the stirring rate. After the addition is complete, the reaction mixture stirs at 110° C. Reaction progress is monitored by measuring the consumption of the glycidyl ether by $^1$H NMR spectroscopy. After stirring for 4

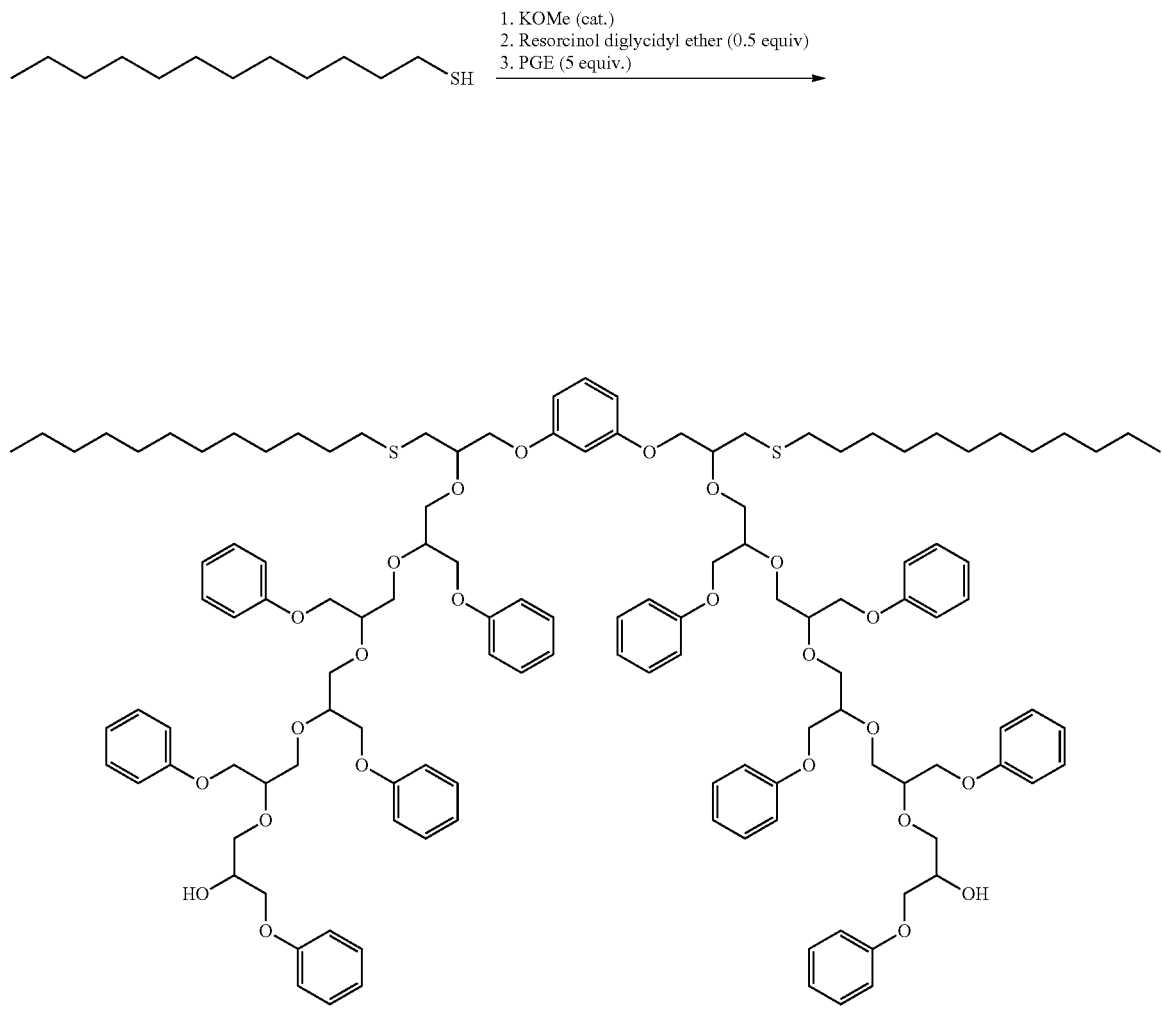

A round-bottom flask equipped with heating mantle, temperature controller, overhead stirrer, thermocouple, and nitrogen inlet is charged with 1-dodecanethiol (72.9 g, 360 mmol) and solid potassium methoxide (3.10 g, 44.2 mmol). The resulting mixture is heated to 105° C., whereupon h at 110° C., analysis confirms that the reaction is complete. The hot reaction mixture is poured into a jar and allowed to cool to room temperature. The product, resorcinol diglycidyl ether-1-dodecanethiol(2)-PGE(10) (374.6 g, 98%) contains 0.45 wt. % potassium.

2. Trimethylolpropane-PGE(15)-GE(3)

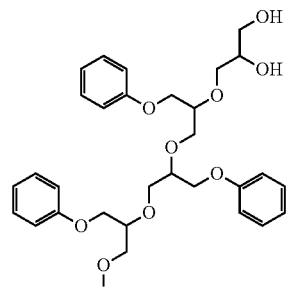

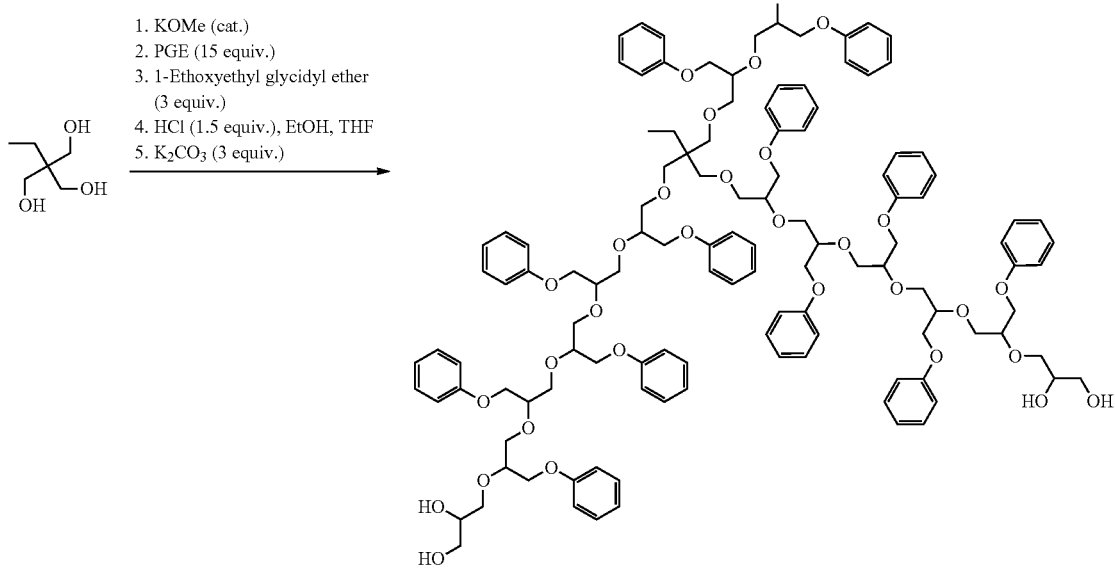

A round-bottom flask is equipped with a heating mantle, temperature controller, overhead stirrer, thermocouple, nitrogen inlet/sparging tube, and distillation adapter. To the adapter is attached an addition funnel, a water-cooled condenser, and a collection flask. The flask is charged under nitrogen with trimethylolpropane (154.6 g, 1.15 mol) and solid potassium methoxide (26.4 g, 0.377 mol). The resulting solid mixture is heated to 110° C. with stirring. After 15 min. at 110° C., a pale-yellow solution is obtained. Phenyl glycidyl ether (2597 g, 17.29 mol) is then added via the addition funnel over 90 min. During the addition, the reaction temperature is held at or below 140° C. by controlling the rate of reagent addition and the stirring rate. After the addition is complete, the reaction mixture stirs at 110° C. After 4 h, $^1$H NMR shows complete consumption of the phenyl glycidyl ether. Stirring is discontinued, the reaction mixture cools to room temperature, and the product is stored in the reaction flask under nitrogen overnight.

The solid reaction mixture is slowly heated to 100° C. Once the mixture begins to melt, the overhead stirrer is activated. When the mixture has liquefied, 1-ethoxyethyl glycidyl ether (505.8 g, 3.46 mol) is added by addition funnel over 0.5 h. When the addition is complete, the mixture stirs at 110° C. After 16 h, $^1$H NMR shows complete consumption of the 1-ethoxyethyl glycidyl ether.

The hot reaction mixture is transferred quantitatively to a large round-bottom flask using two rinses of tetrahydrofuran (300 g) to complete the transfer. Ethanol (2.2 kg) and more tetrahydrofuran (400 g) are added. An overhead stirrer and thermocouple are attached to the flask, and the mixture is stirred at 47° C. Aqueous hydrochloric acid (37%, 170 g, 1.72 mol) is added, and the resulting mixture stirs and slowly cools over 4.5 h to room temperature. While cooling, the mixture periodically becomes too viscous to stir efficiently, and tetrahydrofuran (3×300 g) is added. $^1$H NMR analysis shows complete consumption of the acetal functionality. Solid potassium carbonate (480 g, 3.47 mol) is added, and the reaction mixture is stirred at room temperature. After 18 h, stirring is stopped, and the solids are allowed to settle. Solids are removed by filtration and rinsed with tetrahydrofuran. The filtrates are combined, and volatiles are removed by distillation at 100-115° C. followed by vacuum drying (120° C., 44 mm Hg). Trimethylolpropane-PGE(15)-GE(3) (2.73 kg, 91.0%) is obtained.

3. Triethanolamine-1,2-epoxyhexadecane(3)-PGE(15)

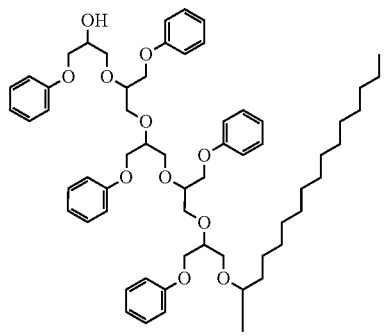

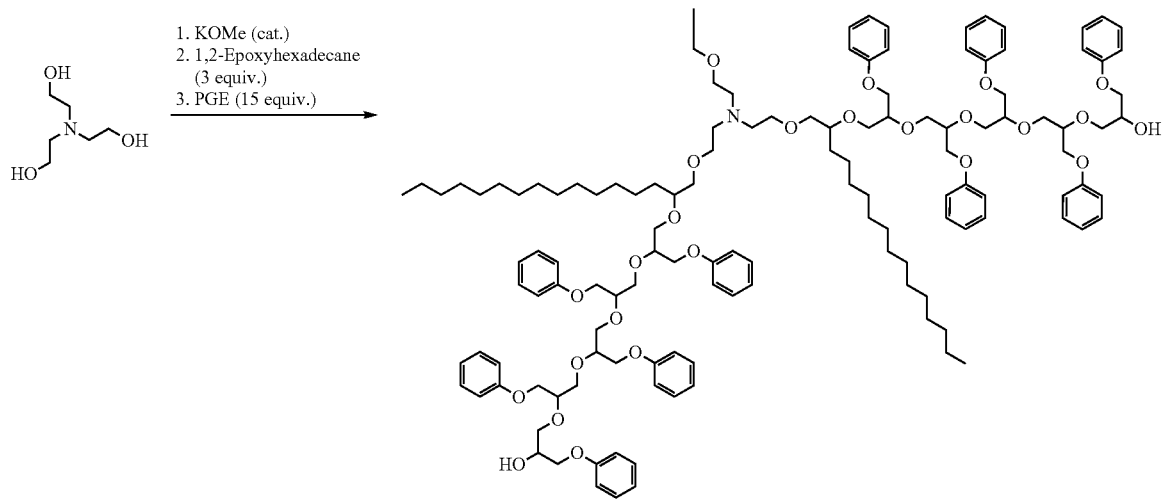

A round-bottom flask is equipped with a heating mantle, temperature controller, overhead stirrer, thermocouple, nitrogen inlet/sparging tube, and distillation adapter with a Teflon stopcock. To the adapter is attached an addition funnel charged with 1,2-epoxyhexadecane (116 g, 483 mmol), a condenser, and a collection flask. The flask is charged under nitrogen with triethanolamine (24.0 g, 161 mmol), solid potassium methoxide (4.06 g, 0.36 mmol), and MTBE (225 g). The reaction mixture is heated to 55° C., and distilled methyl t-butyl ether is collected. When about half of the solvent has been collected, 1,2-epoxyhexadecane is added over 8 min. After the epoxide addition is complete, no more solvent is collected. The reaction mixture is heated to 120° C. over 20 min. After stirring for 0.5 h, the reaction temperature is increased to 135° C. After another 0.5 h, $^1$H NMR shows complete consumption of 1,2-epoxyhexadecane. The mixture cools to 110° C.

An addition funnel charged with phenyl glycidyl ether (362 g, 2.41 mol) replaces the distillation apparatus. The glycidyl ether is added to the reaction mixture over 0.5 h. During the addition, the reaction temperature is held at or below 130° C. After the addition is complete, the reaction mixture stirs at 110° C. for 4 h. $^1$H NMR analysis shows complete consumption of phenyl glycidyl ether. The hot reaction mixture is poured into a jar and allowed to cool. The product, triethanolamine-1,2-epoxyhexadecane(3)-PGE(15) (497 g, 98.8%), contains 0.45 wt. % potassium.

4. 3[mPEG2000-PGE(6)]-1,3,5-benzenetricarbonyl

A round-bottom flask equipped with a heating mantle, temperature controller, overhead stirrer, thermocouple, and nitrogen inlet/sparging tube is charged under nitrogen with mPEG 2000 (equiv. wt.=2070 g/mol, 67.6 g, 32.6 mmol) and solid potassium methoxide (2.29 g, 32.7 mmol). The mixture is heated to 110° C. with stirring, whereupon phenyl glycidyl ether (29.5 g, 196 mmol) is added over 8 min. The reagent is introduced by intermittently removing the gas outlet and adding the warm liquid by pipette. During the addition, the reaction temperature is maintained at or below 120° C. by controlling both the rate of reagent addition and the stirring rate. When the addition is complete, the reaction temperature is held at 120° C. for 100 min. Analysis by $^1$H NMR shows complete consumption of phenyl glycidyl ether. The mixture cools to 60° C. and is stirred at this temperature.

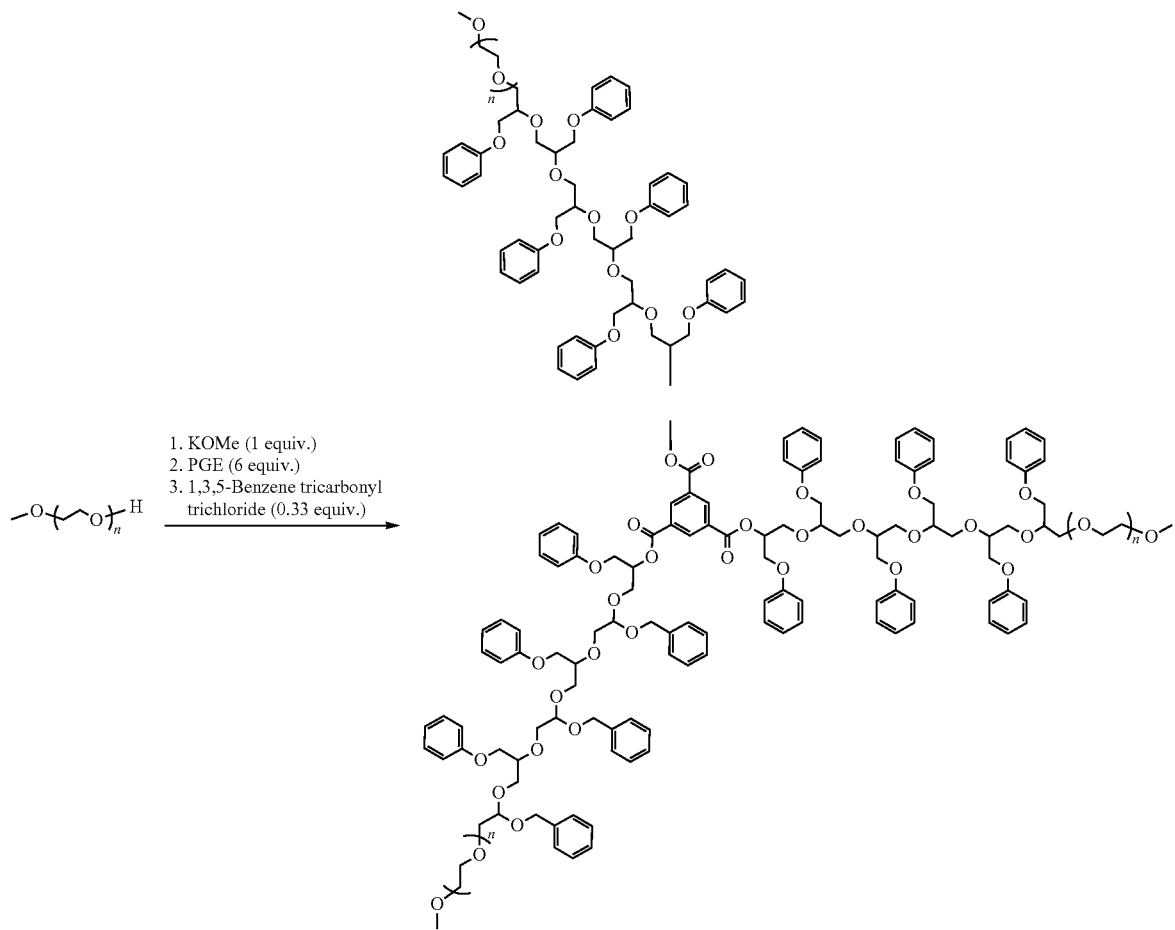

Solid 1,3,5-benzenetricarbonyl trichloride (2.90 g, 10.9 mmol) is added to the flask in portions over 5 min. During the addition, the reaction temperature is held at or below 70° C. The mixture stirs at 70° C. for 1 h, then at 90° C. for 1.5 h, at which point it is judged to be complete by ¹H NMR and infrared analysis. The hot reaction mixture is decanted from the solid potassium chloride into a jar and cools to room temperature. The product is 3[mPEG2000-PGE(6)]-1,3,5-benzenetricarbonyl (94.2 g, 93.9%).

5. Triethanolamine-PGE(15)-EO(90)-SA(3)

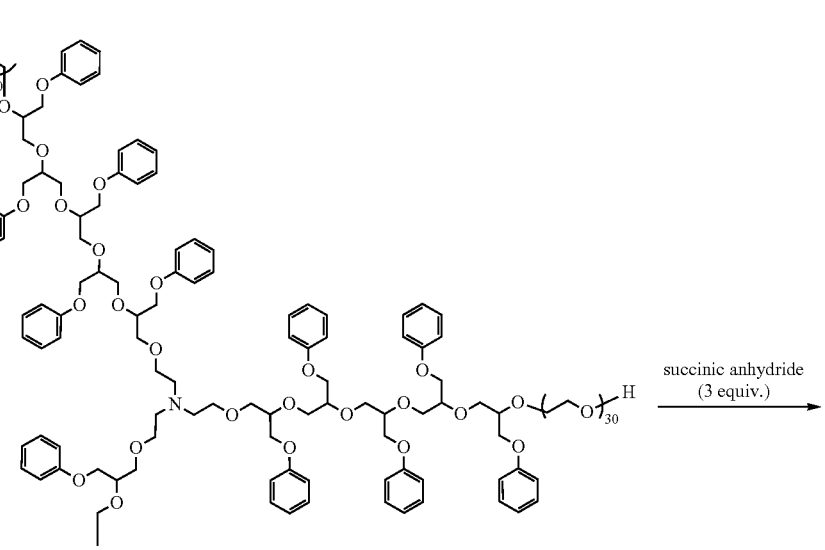

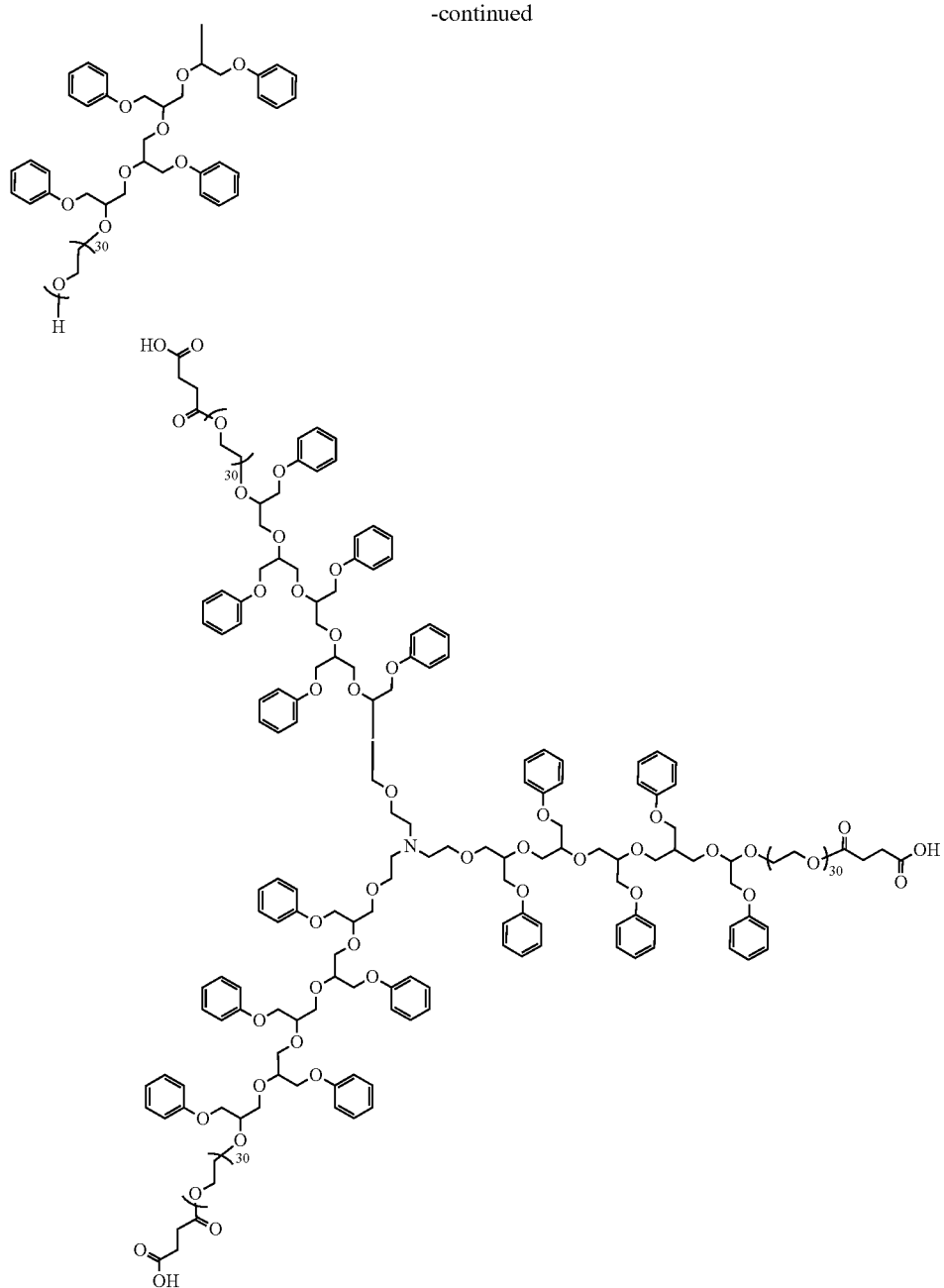

A jar is charged with a stir bar and warm (75° C.) triethanolamine-3[PGE(5)-EO(30)] (equiv. wt.=6363 g/mol, 10.0 g, 1.58 mmol). After stirring at 75° C. for 10 min., succinic anhydride (471 mg, 4.71 mmol) is added. The anhydride slowly goes into solution. After stirring for 3 h, $^1$H NMR analysis shows complete consumption of the succinic anhydride. The reaction mixture cools to room temperature to give triethanolamine-PGE(15)-EO(90)-SA(3) (10.5 g, 100%).

6. Triethanolamine-PGE(18)-[SO$_3$H(0.6)]-EO(105)-SO$_3$H(3)

Triethanolamine-PGE(18)-EO(105) (53.9 g, 29.9 mmol) is charged to a water-jacketed reactor with the water temperature set at 60° C. Liquid sulfur trioxide (2.92 g, 36.5 mmol) is added dropwise from an addition funnel to a vaporizer flask under a nitrogen flow rate of about 5 L/min., and the vaporized sulfur trioxide is introduced into the reactor to maintain a reaction temperature of about 65° C. When the addition is complete (about 10 min.), the reactor is purged with nitrogen for 5 min. The resulting acid is a highly viscous gel that is transferred to a jar and stored at −40° C. $^1$H NMR analysis shows a new signal at 4.2 ppm attributed to sulfate protons, and new signals at 7.3 ppm & 7.8 ppm attributed to sulfonate protons. Degree of arene sulfonation: about 5%.

7. Triethanolamine-PGE(18)-[SO$_3$H(0.6)]-EO(105)

A mixture of the sulfate/sulfonate product described immediately above (15.0 g) is combined with water (34.8 g) and heated on a hot plate for 4 h. The sulfate groups are converted to sulfonic acid groups, and the arene sulfonate groups are retained.

Polymeric Dispersant Solutions for Property Testing

The polymeric dispersant is diluted in deionized water to a concentration of 20-40 wt. % polymer for ease of incorporation in a testing formulation. The solutions are adjusted with acid or base to pH of 8.5 to 9.5 before evaluation of contact angle, interfacial tension (IFT), and foaming properties.

Contact angle is measured at 0.1 wt. % of inventive polymer dispersant on two types of surfaces: EMC quartz glass and Rinzle plastic micro-slides. The measurement is conducted with a pendant drop tensiometer (Kruss DSA 20) at ambient temperature. The average of five measurements is recorded.

Interfacial tension of the dispersants is measured against dodecane at 0.1 wt. % solids at ambient temperature using the pendant drop tensiometer.

Foams are tested at 0.2 wt. % of polymeric solution in tap water. The test solution (100 g) is added to a 500-mL graduated cylinder. The foam is kept to a minimum, and the cylinder is stoppered. The cylinder is placed in a mechanical shake foam machine and is inverted 10 times. The foam is allowed to settle for 15 seconds. An initial foam height value is then recorded. The foam height is measured and recorded again after 5 minutes.

Pigment Dispersions

Pigment dispersions are prepared by combining the polymeric dispersants with pigments in a formulation comprising 0.5 to 50 wt. % dispersant, 10 to 80 wt. % pigment, 0.5 to 6 wt. % additives (e.g., defoamer, rheology modifier, biocide, neutralizing agent, stabilizer) and 10 to 85 wt. % water or another liquid carrier. As shown in the formulation examples below, the proportion of dispersant solids to pigment can vary over a wide range and depends on the nature of the dispersant, the nature of the pigment, the dispersing medium, and other factors. The formulation may also contain 0 to 10 wt. % resin and 0 to 20 wt. % solvent. Preferably, the pigment is added last to the other formulation components. In general, the formulation components are shaken with an equal weight of 0.8 to 1-mm glass beads in a Red Devil paint shaker for 1 to 4 hours to produce the pigment dispersion.

Formulation Examples:

F1. Monoazo yellow pigment dispersion: An inventive polymeric dispersant (1.5 to 2.5 wt. % solids) is combined with BYK-024 defoamer (1.0 wt. % solids, product of BYK), NEOLONE® M-10 biocide (product of Dow, 0.1 wt. % solids), IRGALITE® Yellow L1254 HD (product of BASF, 50 wt. % solids), and water (q.s. to 100 wt. %). The mixture is shaken for 1 h to give the dispersion. See Tables 4, 4A, and 4B.

F2. Monoazo yellow pigment dispersion: The procedure of F1 is repeated with 2.6 wt. % of polymeric dispersant and 53 wt. % solids of yellow pigment. In this case, the mixture is shaken for 4 h to generate the pigment dispersion. See Table 5.

F3. Quinacridone violet pigment dispersion: An inventive polymeric dispersant (1.2 to 6.0 wt. % solids) is combined with BYK-024 defoamer (1.0 wt. % solids), NEOLONE® M-10 biocide (0.1 wt. % solids), CINQUASIA® Red L4100 HD (product of BASF, 40 wt. % solids), and water (q.s. to 100 wt. %). The mixture is shaken for 4 h to give the dispersion. See Tables 6 and 6A.

F4. Quinacridone violet pigment dispersion: The procedure of F3 is repeated with 2.5 wt. % solids of the polymeric dispersant and 50 wt. % solids of the pigment. The mixture is shaken for 4 h to give the dispersion. See Table 7.

F5. Phthalocyanine blue (15:4) pigment dispersion: An inventive polymeric dispersant (8.0 wt. % solids) is combined with BYK-024 defoamer (1.0 wt. % solids), NEOLONE® M-10 biocide (0.1 wt. % solids), HELIOGEN® Blue L7101 F (product of BASF, 40 wt. % solids), and water (q.s. to 100 wt. %). The mixture is shaken for 2 h to give the dispersion. See Table 8.

F6. Phthalocyanine blue (15:3) pigment dispersion: An inventive polymeric dispersant (6.0 or 8.0 wt. % solids) is combined with BYK-024 defoamer (1.0 wt. % solids), NEOLONE® M-10 biocide (0.1 wt. % solids), HELIOGEN® Blue L7085 (product of BASF, 40 wt. % solids), and water (q.s. to 100 wt. %). The mixture is shaken for 4 h to give the dispersion. See Table 9.

F7. Phthalocyanine blue (15:2) pigment dispersion: An inventive polymeric dispersant (3.0 to 5.0 wt. % solids) is combined with BYK-024 defoamer (1.0 wt. % solids), NEOLONE® M-10 biocide (0.1 wt. % solids), HELIOGEN® Blue L6875F (product of BASF, 40 wt. % solids), and water (q.s. to 100 wt. %). The mixture is shaken for 4 h to give the dispersion. See Table 10.

F8. Red iron oxide pigment dispersion: An inventive polymeric dispersant (6.0 wt. % solids) is combined with BYK-024 defoamer (1.0 wt. % solids), NEOLONE® M-10 biocide (0.1 wt. % solids), BAYFERROX® 120M (product of Lanxess, 60 wt. % solids), and water (q.s. to 100 wt. %). The mixture is shaken for 2 h to give the dispersion. See Table 11.

F9. Beta-naphthol orange pigment dispersion: An inventive polymeric dispersant (3.0 to 4.0 wt. % solids) is combined with BYK-024 defoamer (1.0 wt. % solids), NEOLONE® M-10 biocide (0.1 wt. % solids), MONOLITE® Orange 200504 (product of Heubach, 40 wt. % solids), and water (q.s. to 100 wt. %). The mixture is shaken for 4 h to give the dispersion. See Table 12.

F10. Carbon black pigment dispersion: An inventive polymeric dispersant (7.8 wt. % solids) is combined with BYK-024 defoamer (1.0 wt. % solids), NEOLONE® M-10 biocide (0.1 wt. % solids), FW 200 (product of Orion, 15.75 wt. % solids), and water (q.s. to 100 wt. %). The mixture is shaken for 4 h to give the dispersion. See Table 13.

F11. Carbon black pigment dispersion: An inventive polymeric dispersant (variable % solids) is combined with BYK-024 defoamer (1.0 wt. % solids), NEOLONE® M-10 biocide (0.1 wt. % solids), MONARCH® 120 (product of Cabot, 40 wt. % solids), and water (q.s. to 100 wt. %). The mixture is shaken for 4 h to give the dispersion. See Table 14.

Testing Pigment Dispersions:

Viscosity:

The viscosity of pigment dispersions is measured "as is" under a shear rate of 1-100 s$^{-1}$ at 25° C. using a rheometer (TA Instrument). The viscosity at 10 s$^{-1}$ is reported.

Particle Size:

Particle size is measured on diluted dispersions of 0.1 wt. % pigment using dynamic light scattering (Malvern Nanosizer) at 25° C. The values measured are Z-average particle sizes.

Dispersion Stability:

Dispersions are examined visually for uniformity and by measuring changes in viscosity as a function of time.

Scrub Resistance:

An interior satin base paint (Behr 7400) is tinted by using 40% quinacridone violet pigment dispersions containing 1.6% dispersant. The tinting ratio is 8 oz./gal. The tinted paint is tested for scrub resistance according to ASTM D2486-17, Test Method A. The paint film is scrubbed with a metal brush over the brass shim until a continuous line of paint is removed. The mean number of cycles of scrubbing to failure is recorded. A higher number of cycles indicates better scrub resistance.

In a control experiment with DISPERBYK® 190, the number of cycles to failure is 706. When triethanolamine-PGE(15)-EO(90) is used as the dispersant, the number of cycles to failure is 745.

Tint Strength
Let Down

Dispersion concentrates are diluted into base paint at 8 oz./gal. Behr interior satin enamel medium 7400 paint is used as the base paint. The resulting tinted base paint is shaken for 10 min. with the Red Devil shaker. Entrapped air is removed by gentle centrifuging before use. The tinted paint is drawn down with a 3-mil Bird bar applicator onto a Leneta chart 18B. The wet paint film is allowed to thicken and is then rubbed with a finger.

The color strength of the dried paint film is measured with a spectrophotometer (Minolta) using the CIE L* a* b* or alternatively, the L* C* h system. The color intensity can also be represented by Chroma C*.

If the pigment is not well dispersed or is separated, the mechanical motion of rubbing will re-disperse the pigment and make a paint film color stronger and more homogeneous. By comparing the color difference, ΔE, between the rubbed area and the un-rubbed area, the quality of the pigment dispersion can be revealed. The target is to have no color difference or minimal color difference of ΔE, where ΔE was defined as:

$$\Delta E = \sqrt{\Delta L^2 + \Delta a^2 + \Delta b^2}$$

where ΔL, Δa, and Δb refer to differences in light/dark, red/green, and yellow/blue, respectively. See Tables 16, 17, and 18 for results. The inventive dispersants perform as well as or better than the control.

Blocking Resistance:

Blocking resistance evaluates a film's face-to-face stickiness. The test is conducted according to ASTM D4946-89. Blocking resistance is rated based on how well the paint film seals together or tackiness. A higher rating indicates reduced tackiness or seal. An interior satin base paint (Behr 7400) is tinted at 8 oz/gal by preparing pigment dispersions using the inventive dispersant and a control dispersant, both at the optimal dispersant concentrations. Table 20, below, shows that the inventive dispersant has better blocking resistance compared to the control.

Universal Compatibility:

The inventive polymer dispersants demonstrate surprising universal compatibility and tinting ability for both water- and solvent-based paints. An oil-based alkyd paint (Behr 3800) is tinted with the water-based pigment dispersions at 12 oz/gal. In most cases, the inventive dispersants show much higher Chroma values compared to the control, which indicates better compatibility and strong color after tinting the oil-based white paint. Results appear in Table 21.

TABLE 2

Contact Angle and Interfacial Tension (0.1 wt. % dispersant)

| Ex. | Dispersant | Contact angle, degrees, plastic | Contact angle, degrees, quartz | IFT, dodecane (mN/m) |
|---|---|---|---|---|
| C1* | butanol-PGE(6.4)-EO(40) | 67.8 | 48.9 | 15.0 |
| C2* | phenol-PGE(5)-EO(40) | 67.7 | 56.9 | 20.4 |
| C3* | DISPERBYK ®-190 | 67.7 | 52.7 | 23.3 |
| 4 | benzylamine-PGE(10)-EO(60) | 66.0 | 43.9 | 17.4 |
| 5 | bisphenol S-PGE(10)-EO(60) | 66.8 | 44.8 | 10.4 |
| 6 | farnesol-PGE(5)-EO(40) | 70.0 | 48.7 | 12.6 |
| 7 | isosorbide-PGE(10)-EO(60) | 69.3 | 55.9 | 14.6 |
| 8 | morpholine-PGE(5)-EO(20) | 63.1 | 36.9 | 15.4 |
| 9 | morpholine-PGE(5)-EO(30) | 66.5 | 48.7 | 16.6 |
| 10 | morpholine-PGE(5)-EO(40) | 69.4 | 38.5 | 25.8 |
| 11 | piperazine-PGE(10)-EO(60) | 69.7 | 52.2 | 17.1 |
| 12 | 1,3-propanediol-PGE(10)-EO(40) | 68.8 | 59.8 | 15.3 |
| 13 | 1,3-propanediol-PGE(10)-EO(80) | 67.5 | 56.2 | 21.3 |
| 14 | resorcinol-PGE(10)-EO(40) | 70.5 | 58.1 | 16.1 |
| 15 | resorcinol-PGE(10)-EO(60) | 70.5 | 53.5 | 17.6 |
| 16 | resorcinol-PGE(10)-EO(80) | 72.0 | 59.5 | 19.7 |
| 17 | thiophenol-PGE(5)-EO(40) | 64.4 | 48.3 | 15.9 |

*Comparative examples

DISPERBYK ®-190 is a product of BYK Additives and Instruments.

The contact angle data shows that the inventive copolymers can wet both hydrophilic and hydrophobic surfaces. The interfacial tension data also demonstrates that the copolymers are potentially useful as emulsifiers because they can lower the IFT between dodecane and water from about 53 mN/m to less than 20 mN/m in most cases.

TABLE 3

Foam Testing Results

| Ex. | Dispersant | Foam vol., initial (mL) | Foam vol., 5 min. (mL) |
|---|---|---|---|
| C18* | DISPERBYK ®-190 | 168 | 150 |
| C19* | butanol-PGE(6.4)-EO(40) | 170 | 143 |
| C20* | phenol-PGE(5)-EO(40) | 148 | 133 |
| 21 | farnesol-PGE(5)-EO(40) | 158 | 148 |
| 22 | morpholine-PGE(5)-EO(20) | 150 | 125 |
| 23 | morpholine-PGE(5)-EO(30) | 163 | 105 |
| 24 | morpholine-PGE(5)-EO(40) | 158 | 128 |
| 25 | 1,3-propanediol-PGE(10)-EO(40) | 148 | 133 |
| 26 | 1,3-propanediol-PGE(10)-EO(80) | 160 | 143 |
| 27 | resorcinol-PGE(10)-EO(40) | 133 | 128 |
| 28 | resorcinol-PGE(10)-EO(80) | 155 | 140 |
| 29 | thiophenol-PGE(5)-EO(40) | 158 | 128 |

*Comparative examples

A dispersant that provides a low or unstable foam is desirable for paints and other dispersion products. Some of the inventive copolymers, e.g., the morpholine-initiated dispersants, show surprisingly rapid dissipation of the foam compared to control samples.

TABLE 4

50 wt. % Monoazo yellow pigment dispersions
with 2.5 wt. % dispersant (pH 8-10, Ex. F1)

| Ex. | Dispersant | Viscosity at 10 s$^{-1}$ (cP) |
|---|---|---|
| C30* | DISPERBYK ®-190 | 337 |
| C31* | butanol-PGE(6.4)-EO(20) | high** |
| 32 | benzylamine-PGE(10)-EO(40) | 409 |
| 33 | benzylamine-PGE(10)-EO(60) | 345 |
| 34 | bisphenol S-PGE(10)-EO(60) | 68 |
| 35 | isosorbide-PGE(10)-EO(60) | 124 |
| 36 | morpholine-PGE(5)-EO(20) | 112 |
| 37 | morpholine-PGE(5)-EO(30) | 1413 |
| 38 | morpholine-PGE(5)-random EO/PO(24/6) | 110 |
| 39 | morpholine-PGE(5)-PO(5)-EO(25) | 86 |
| 40 | 1,8-octanediol-PGE(10)-EO(40) | 514 |
| 41 | pentaerythritol-PGE(20)-EO(120) | 403 |
| 42 | piperazine-PGE(10)-EO(60) | 118 |
| 43 | 1,3-propanediol-PGE(10)-EO(40) | 342 |
| 44 | resorcinol-PGE(10)-EO(40) | 578 |
| 45 | resorcinol-PGE(10)-EO(60) | 274 |
| 46 | thiophenol-PGE(5)-EO(20) | 101 |
| 47 | triethanolamine-PGE(15)-EO(90) | 166 |

*Comparative examples
**Viscosity was too high to measure.

TABLE 4B 50 wt. % Monoazo yellow pigment dispersions
from dispersant blends (pH 8-10, Ex. F1)

| Ex. | Dispersant | Dispersant Conc. (wt. %) | Viscosity at 10 s$^{-1}$, cP |
|---|---|---|---|
| 75 | Blend of thiophenol-PGE(5)-EO(30) and di(trimethylolpropane)-TSPGE(4)-EO(160) @ 20/80 ratio | 2.0 | 73 |
| 76 | Blend of triethanolamine-PGE(18)-EO(105) and isosorbide-PGE(10)-EO(60) @ 80/20 | 2.0 | 200 |
| 77 | Blend of triethanolamine-PGE(18)-EO(105) and isosorbide-TSPGE(2)-EO(60) @ 80/20 | 2.0 | 195 |
| 78 | Blend of triethanolamine-PGE(18)-EO(105) and 2,4,6-tristyrylphenol-PGE(5)-EO(30) @ 80/20 | 2.0 | 62 |

TABLE 4A 50 wt. % Monoazo yellow pigment dispersions (pH 8-10, Ex. F1)

| Ex. | Dispersant | Dispersant Conc. (wt. %) | Viscosity at 10 s$^{-1}$, cP |
|---|---|---|---|
| C48 | DISPERBYK ®-190 | 2.0 | 91 |
| 49 | di(pentaerythritol)-PGE(30)-EO(120) | 2.0 | 72 |
| 50 | di(pentaerythritol)-PGE(30)-EO(240) | 2.5 | 156 |
| 51 | di(trimethylolpropane)-PGE(20)-EO(120) | 2.5 | 180 |
| 52 | isosorbide-SO(10)-EO(60) | 2.5 | 76 |
| 53 | isosorbide-SO(10)-EO(80) | 2.5 | 112 |
| 54 | morpholine-PGE(5)-EO(25)-PO(5) | 2.5 | 62 |
| 55 | morpholine-PGE(3)-EO(30) | 2.5 | 57 |
| 56 | morpholine-PGE(8)-EO(30) | 2.5 | 161 |
| 57 | 2[mPEG2000-PGE(6)]-dipotassium 1,2,4,5-benzene dicarboxylate | 2.5 | 40 |
| 58 | 3[mPEG2000-PGE(6)]-1,3,5-benzenetricarbonyl | 2.0 | 57 |
| 59 | resorcinol DGE-1-dodecanethiol(2)-PGE(10)-EO(80) | 2.5 | 158 |
| 60 | triethanolamine-PGE(15)-PO(21)-EO(105) | 2.5 | 712 |
| 61 | triethanolamine-PGE(18)-EO(105) | 2.0 | 45 |
| 62 | triethanolamine-PGE(18)-[SO$_3$H(0.6)]-EO(105)-SO$_3$H(3) | 2.0 | 56 |
| 63 | triethanolamine-PGE(18)-[SO$_3$H(0.6)]-EO(105) | 1.5 | 45 |
| 64 | triethanolamine-PGE(15)-EO(90)-SA(2) | 1.5 | 14 |
| 65 | triethanolamine-PGE(15)-EO(90)-SA(1) | 2.0 | 30 |
| 66 | triethanolamine-EHGE(3)-PGE(15)-EO(86) | 2.5 | 24 |
| 67 | triethanolamine-PGE(15)-GE(3)-EO(180)-SA(1.8) | 2.0 | 163 |
| 68 | triethanolamine-PGE(15)-GE(3)-EO(240)-SA(0.6) | 2.5 | 176 |
| 69 | triethanolamine-PGE(15)-EO(90)-BS | 1.5 | 11 |
| 70 | trimethylolpropane-AGE(3)-PGE(15)-EO(90) | 2.0 | 30 |
| 71 | trimethylolpropane-PGE(16)-GE(3)-EO(180) | 2.5 | 672 |
| 72 | trimethylolpropane-PGE(15)-EO(90) | 2.0 | 62 |
| 73 | 2,4,6-tristyrylphenol-PGE(5)-EO(30) | 2.5 | 94 |
| 74 | 2,4,6-tristyrylphenol-PGE(5)-EO(50) | 2.5 | 239 |

TABLE 5

53 wt. % Monoazo yellow pigment dispersions (pH 8-10, Ex. F2)

| Ex. | Dispersant | Viscosity at 10 s$^{-1}$ (cP) | 2 week viscosity | 4 week viscosity |
|---|---|---|---|---|
| C79* | DISPERBYK ®-190 | 239 | 157 | 241 |
| 80 | benzylamine-PGE(10)-EO(60) | 80 | 93 | 97 |
| 81 | isosorbide-PGE(10)-EO(60) | 151 | | |
| 82 | morpholine-PGE(5)-EO(20) | 231 | | |
| 83 | 1,8-octanediol-PGE(10)-EO(40) | 240 | | |
| 84 | resorcinol-PGE(10)-EO(60) | 246 | | |
| 85 | thiophenol-PGE(5)-EO(30) | 77 | 75 | 77 |

*Comparative example

TABLE 6

40 wt. % Quinacridone violet pigment dispersions with 6 wt. % dispersant (pH 8-10, Ex. F3)

| Ex. | Dispersant | Viscosity at 10 s$^{-1}$ (cP) |
|---|---|---|
| C86* | DISPERBYK ®-190 | 12,900 |
| C87* | butanol-PGE(6.4)-EO(20) | 5190 |
| C88* | butanol-PGE(6.4)-EO(30) | 36,700 |
| 89 | benzylamine-PGE(10)-EO(40) | 364 |
| 90 | benzylamine-PGE(10)-EO(60) | 182 |
| 91 | 1,4-cyclohexanedimethanol-PGE(10)-EO(60) | 3090 |
| 92 | ethylenediamine-PGE(20)-EO(120) | 4400 |
| 93 | farnesol-PGE(5)-EO(20) | 197 |
| 94 | farnesol-PGE(5)-EO(30) | 751 |
| 95 | isosorbide-PGE(10)-EO(60) | 152 |
| 96 | N-methylaniline-PGE(5)-EO(20) | 538 |
| 97 | morpholine-PGE(5)-EO(20) | 77 |
| 98 | morpholine-PGE(5)-EO(30) | 110 |
| 99 | morpholine-PGE(5)-EO(40) | 186 |
| 100 | morpholine-PGE(5)-random EO/PO(24/6) | 58 |
| 101 | morpholine-PGE(5)-PO(5)-EO(25) | 36 |
| 102 | 1,8-octanediol-PGE(10)-EO(40) | 161 |
| 103 | pentaerythritol-PGE(20)-EO(120) | 403 |
| 104 | piperazine-PGE(10)-EO(60) | 152 |
| 105 | thiophenol-PGE(5)-EO(20) | 177 |
| 106 | triethanolamine-PGE(15)-EO(90) | 3830 |

*Comparative examples.

TABLE 6A 40 wt. % Quinacridone violet pigment dispersions (pH 8-10, Ex. F3)

| Ex. | Dispersant | Dispersant Conc. (wt. %) | Viscosity at 10 s$^{-1}$, cP |
|---|---|---|---|
| C107* | DISPERBYK ®-190 | 2.0 | 38 |
| 108 | di(pentaerythritol)-PGE(30)-EO(120) | 2.0 | 11 |
| 109 | di(pentaerythritol)-PGE(30)-EO(240) | 2.0 | 17 |
| 110 | di(trimethylolpropane)-PGE(20)-EO(120) | 1.2 | 11 |
| 111 | isosorbide-SO(10)-EO(60) | 2.0 | 15 |
| 112 | isosorbide-SO(10)-EO(80) | 2.0 | 14 |
| 113 | 2[mPEG2000-PGE(6)]-dipotassium 1,2,4,5-benzene dicarboxylate | 1.6 | 8 |
| 114 | 3[mPEG2000-PGE(6)]-1,3,5-benzenetricarbonyl | 1.6 | 18 |
| 115 | resorcinol DGE-1-dodecanethiol(2)-PGE(10)-EO(80) | 1.6 | 89 |
| 116 | triethanolamine-EHGE(3)-PGE(15)-EO(86) | 1.6 | 7 |
| 117 | triethanolamine-PGE(18)-EO(105) | 2.0 | 10 |
| 118 | triethanolamine-PGE(18)-[SO$_3$H(0.6)]-EO(105)-SO$_3$H(3) | 1.2 | 1050 |
| 119 | triethanolamine-PGE(18)-[SO$_3$H(0.6)]-EO(105) | 1.6 | 27 |
| 120 | triethanolamine-PGE(15)-EO(90)-SA(2) | 1.6 | 12 |
| 121 | triethanolamine-PGE(15)-EO(90)-SA(1) | 1.6 | 9 |
| 122 | triethanolamine-PGE(15)-EO(90)-BS(1/6) | 1.6 | 11 |
| 123 | triethanolamine-PGE(15)-GE(3)-EO(180) | 2.0 | 11 |
| 124 | triethanolamine-PGE(15)-GE(3)-EO(180)-SA(1.8) | 1.6 | 11 |
| 125 | triethanolamine-PGE(15)-GE(3)-EO(240)-SA(0.6) | 2.0 | 14 |
| 126 | triethanolamine-PGE(15)-PO(21)-EO(105) | 2.0 | 122 |
| 127 | trimethylolpropane-AGE(3)-PGE(15)-EO(90) | 1.6 | 8 |
| 128 | trimethylolpropane-PGE(15)-EO(90) | 1.2 | 19 |
| 129 | trimethylolpropane-PGE(16)-GE(3)-EO(180) | 1.6 | 16 |
| 130 | trimethylolpropane-PGE(16)-GE(3)-EO(240) | 2.0 | 20 |

TABLE 7

50 wt. % Quinacridone violet pigment dispersions (pH 8-10, Ex. F4)

| Ex. | Dispersant | Viscosity at $10\ s^{-1}$ (cP) |
|---|---|---|
| C131* | DISPERBYK ®-190 | 19,000 |
| 132 | isosorbide-PGE(10)-EO(60) | 599 |
| 133 | morpholine-PGE(5)-EO(20) | 92 |
| 134 | morpholine-PGE(5)-PO(5)-EO(25) | 57 |
| 135 | piperazine-PGE(10)-EO(60) | 8950 |
| 136 | resorcinol-PGE(10)-EO(60) | 60 |
| 137 | thiophenol-PGE(5)-EO(30) | 316 |

*Comparative example

TABLE 8

40 wt. % Phthalocyanine blue (15:4) pigment dispersions (pH 8-10, F5)

| Ex. | Dispersant | Viscosity at $10\ s^{-1}$ (cP) |
|---|---|---|
| C138* | DISPERBYK ®-190 | 1050 |
| 139 | benzylamine-PGE(10)-EO(40) | 805 |
| 140 | benzylamine-PGE(10)-EO(60) | 476 |
| 141 | benzylamine-PGE(10)-EO(80) | 1050 |
| 142 | 1,4-cyclohexanedimethanol-PGE(10)-EO(60) | 406 |
| 143 | diethanolamine-PGE(15)-EO(90) | 491 |
| 144 | ethylenediamine-PGE(20)-EO(120) | 1520 |
| 145 | isosorbide-PGE(10)-EO(60) | 380 |
| 146 | morpholine-PGE(5)-EO(20) | 863 |
| 147 | morpholine-PGE(5)-EO(30) | 433 |
| 148 | morpholine-PGE(3)-EO(30) | 180 |
| 149 | morpholine-PGE(8)-EO(30) | 171 |
| 150 | morpholine-PGE(5)-random EO/PO(24/6) | 700 |
| 151 | morpholine-PGE(5)-PO(5)-EO(25) | 758 |
| 152 | 1,8-octanediol-PGE(10)-EO(40) | 1580 |
| 153 | pentaerythritol-PGE(20)-EO(120) | 883 |
| 154 | piperazine-PGE(10)-EO(60) | 398 |
| 155 | 1,3-propanediol-PGE(10)-EO(40) | 555 |
| 156 | resorcinol-PGE(10)-EO(60) | 385 |
| 157 | thiophenol-PGE(5)-EO(30) | 227 |
| 158 | triethanolamine-PGE(15)-EO(90) | 408 |

*Comparative example

TABLE 9

40 wt. % Phthalocyanine blue (15:3) pigment dispersions (pH 8-10, F6)

| Ex. | Dispersant | Viscosity at $10\ s^{-1}$ (cP) with 6 wt. % dispersant | Viscosity at $10\ s^{-1}$ (cP) with 8 wt. % dispersant |
|---|---|---|---|
| C159* | DISPERBYK ®-190 | 158 | 556 |
| 160 | benzylamine-PGE(10)-EO(60) | 75 | 193 |
| 161 | morpholine-PGE(5)-EO(20) | 343 | 167 |
| 162 | thiophenol-PGE(5)-EO(30) | 78 | 87 |

*Comparative example

TABLE 10

40 wt. % Phthalocyanine blue (15:2) pigment dispersions (pH 8-10, F7)

| Ex. | Dispersant | Dispersant Conc. (wt. %) | Viscosity at $10\ s^{-1}$, cP |
|---|---|---|---|
| C163* | DISPERBYK ®-190 | 5.0 | 97 |
| 164 | di(pentaerythritol)-PGE(30)-EO(120) | 5.0 | 84 |
| 165 | di(pentaerythritol)-PGE(30)-EO(240) | 3.0 | 62 |
| 166 | di(trimethylolpropane)-PGE(20)-EO(120) | 4.0 | 76 |
| 167 | isosorbide-SO(10)-EO(60) | 4.0 | 79 |
| 168 | isosorbide-SO(10)-EO(80) | 4.0 | 96 |
| 169 | 2[mPEG2000-PGE(6)]-dipotassium 1,2,4,5-benzene dicarboxylate | 4.0 | 152 |
| 170 | 3[mPEG2000-PGE(6)]-1,3,5-benzenetricarbonyl | 3.6 | 43 |
| 171 | resorcinol DGE-1-dodecanethiol(2)-PGE(10)-EO(80) | 4.0 | 28 |
| 172 | triethanolamine-EHGE(3)-PGE(15)-EO(86) | 4.0 | 92 |
| 173 | triethanolamine-PGE(18)-EO(105) | 5.0 | 109 |
| 174 | triethanolamine-PGE(18)-[SO$_3$H(0.6)]-EO(105)-SO$_3$H(3) | 3.0 | 39 |
| 175 | triethanolamine-PGE(18)-[SO$_3$H(0.6)]-EO(105) | 3.0 | 29 |
| 176 | triethanolamine-PGE(15)-EO(90)-SA(2) | 3.0 | 53 |
| 177 | triethanolamine-PGE(15)-EO(90)-SA(1) | 3.0 | 42 |
| 178 | triethanolamine-PGE(15)-EO(90)-BS(1/2) | 3.4 | 74 |
| 179 | triethanolamine-PGE(15)-GE(3)-EO(180) | 3.6 | 17 |
| 180 | triethanolamine-PGE(15)-GE(3)-EO(180)-SA(1.8) | 4.0 | 128 |
| 181 | triethanolamine-PGE(15)-GE(3)-EO(240)-SA(0.6) | 4.0 | 53 |
| 182 | triethanolamine-PGE(15)-PO(21)-EO(105) | 4.0 | 210 |
| 183 | trimethylolpropane-AGE(3)-PGE(15)-EO(90) | 4.0 | 61 |
| 184 | trimethylolpropane-PGE(15)-EO(90) | 5.0 | 107 |
| 185 | trimethylolpropane-PGE(16)-GE(3)-EO(180) | 3.0 | 65 |
| 186 | trimethylolpropane-PGE(16)-GE(3)-EO(240) | 4.0 | 90 |
| 187 | 2,4,6-tristyrylphenol-PGE(5)-EO(30) | 5.0 | 102 |
| 188 | 2,4,6-tristyrylphenol-PGE(5)-EO(50) | 5.0 | 106 |

*Comparative example

TABLE 11

Red iron oxide pigment dispersions (pH 8-10, F8)

| Ex. | Dispersant | Viscosity at 10 s$^{-1}$ (cP) | Particle size (nm) |
|---|---|---|---|
| C189* | DISPERBYK ®-190 | 793 | 197 |
| C190* | phenol-PGE(5)-EO(40) | 4970 | 181 |
| C191* | butanol-PGE(6.4)-EO(40) | 3380 | 165 |
| 192 | isosorbide-PGE(10)-EO(60) | 841 | 235 |
| 193 | morpholine-PGE(5)-EO(30) | 2040 | 169 |
| 194 | morpholine-PGE(5)-EO(40) | 750 | 165 |
| 195 | resorcinol-PGE(10)-EO(80) | 2110 | 237 |

*Comparative examples

TABLE 12

40 wt. % Beta-naphthol orange pigment dispersions (pH 8-10, F9)

| Ex. | Dispersant | Dispersant Conc. (wt. %) | Viscosity at 10 s$^{-1}$, cP |
|---|---|---|---|
| C196* | JEFFSPERSE ® X3503 (Huntsman) | 3.0 | 29 |
| 197 | triethanolamine-PGE(18)-EO(105) | 4.0 | 14 |
| 198 | trimethylolpropane-PGE(16)-GE(3)-EO(240) | 3.0 | 32 |

*Comparative example

TABLE 13

Carbon Back Dispersions (Ex. F10)

| Ex. | Dispersant | Viscosity at 10 s$^{-1}$ (cP) | Particle size (nm) | Particle size (nm), 4-days |
|---|---|---|---|---|
| C199* | DISPERBYK ®-190 | 18 | 139 | 138 |
| 200 | benzylamine-PGE(10)-EO(60) | 19 | 128 | 127 |
| 201 | isosorbide-PGE(10)-EO(60) | 22 | 129 | 127 |
| 202 | morpholine-PGE(5)-EO(20) | 113 | 381 | 287 |
| 203 | morpholine-PGE(5)-EO(30) | 33 | 154 | 155 |
| 204 | morpholine-PGE(5)-EO(40) | 21 | 134 | 135 |
| 205 | thiophenol-PGE(5)-EO(30) | 17 | 131 | 128 |

*Comparative example

TABLE 14

40 wt. % MONARCH ® 120 carbon black dispersions (pH 8-10, F11)

| Ex. | Dispersant | Dispersant Conc. (wt. %) | Viscosity at 10 s$^{-1}$, cP |
|---|---|---|---|
| C206* | DISPERBYK ®-190 | 1.6 | 16 |
| 207 | triethanolamine-PGE(15)-EO(90) | 2.0 | 12 |
| 208 | trimethylolpropane-PGE(16)-GE(3)-EO(240) | 3.0 | 16 |

*Comparative example

TABLE 15

Long-Tail Examples

| | | | Viscosity at 10 s$^{-1}$, cP | | |
|---|---|---|---|---|---|
| Ex. | Dispersant | pH | PY-74 | PV-19 | PB-15:4 |
| 209 | bisphenol A-PGE(10)-EO(60) | 5.78 | high | 69 | 761 |
| 210 | bisphenol A-PGE(10)-EO(90) | 5.95 | high | 8250 | 1240 |

TABLE 15-continued

Long-Tail Examples

| | | | Viscosity at 10 s$^{-1}$, cP | | |
|---|---|---|---|---|---|
| Ex. | Dispersant | pH | PY-74 | PV-19 | PB-15:4 |
| 211 | bisphenol A-PGE(10)-EO(110) | 5.95 | high | high | 2010 |

PY-74 is 50 wt. % mono azo yellow with 2.5 wt. % dispersant; PV-19 is 40 wt. % quinacridone violet with 6 wt. % dispersant; PB-15:4 is 40 wt. % phthalocyanine blue with 8 wt. % dispersant.

TABLE 16

Color strength and color change for a paint tinted with 40 wt. % Quinacridone violet pigment dispersions at 8 oz/gal ratio

| Ex. | Dispersant | Dispersant Conc. (wt. %) | Chroma, C | ΔE |
|---|---|---|---|---|
| C212* | DISPERBYK ®-190 | 4.0 | 44.0 | 0.67 |
| 213 | benzylamine-PGE(10)-EO(60) | 4.0 | 45.0 | 0.30 |
| 214 | morpholine-PGE(5)-EO(19) | 4.0 | 44.4 | 0.64 |
| 215 | 1,8-octanediol-PGE(10)-EO(40) | 4.0 | 45.0 | 0.47 |
| 216 | thiophenol-PGE(5)-EO(30) | 4.0 | 44.5 | 0.20 |

*Comparative example

The examples in Table 16 are dispersions made in a VOC-free formulation with water as the only solvent. The inventive dispersants perform as well as or better than the control.

TABLE 17

Color strength and color change for a paint tinted with 40 wt. % phthalocyanine blue (15:2) pigment dispersions at 8 oz/gal ratio

| Ex. | Dispersant | Dispersant Conc. (wt. %) | Chroma, C | ΔE |
|---|---|---|---|---|
| C217* | DISPERBYK ®-190 | 4.0 | 53.0 | 0.76 |
| 218 | triethanolamine-PGE(18)-EO(105) | 6.0 | 56.8 | 0.70 |
| 219 | triethanolamine-PGE(18)-EO(105) sulfonate | 3.0 | 53.9 | 0.27 |
| 220 | trimethylolpropane-PGE(16)-GE(3)-EO(240) | 3.0 | 52.4 | 0.39 |
| 221 | Blend of triethanolamine-PGE(18)-EO(105) and di(trimethylolpropane)-TSPGE(4)-EO(160) @ 60:40 | 4.0 | 55.4 | 0.88 |
| 222 | Blend of triethanolamine-PGE(18)-EO(105) and thiophenol-PGE(5)-EO(30) @ 80/20 | 4.0 | 55.4 | 0.51 |

*Comparative example

TABLE 18

Color strength and color change for a paint tinted with 50 wt. % monoazo yellow pigment dispersion at 8 oz/gal ratio

| Ex. | Dispersant | Dispersant Conc. (wt. %) | Chroma, C | ΔE |
|---|---|---|---|---|
| C223* | JEFFSPERSE ® X3503 (Huntsman) | 2.0 | 74.6 | 1.07 |
| 224 | thiophenol-PGE(5)-EO(30) | 2.0 | 75.6 | 0.22 |
| 225 | triethanolamine-PGE(18)-EO(105) | 2.0 | 75.4 | 0.43 |

TABLE 18-continued

Color strength and color change for a paint tinted with 50 wt. % monoazo yellow pigment dispersion at 8 oz/gal ratio

| Ex. | Dispersant | Dispersant Conc. (wt. %) | Chroma, C | ΔE |
|---|---|---|---|---|
| 226 | Blend of di(trimethylolpropane)-TSPGE(4)-EO(160) and thiophenol-PGE(5)-EO(30) @ 80/20 | 2.0 | 77.3 | 0.80 |
| 227 | Blend of di(trimethylolpropane)-TSPGE(4)-EO(160) and trimethylolpropane-PGE(16)-GE(3)-EO(240) @ 80/20 | 2.0 | 76.4 | 0.45 |
| 228 | Blend of triethanolamine-PGE(18)-EO(105) and thiophenol-PGE(5)-EO(30) @ 80/20 | 2.0 | 76.9 | 0.36 |

*Comparative example

In some cases, a small proportion of solvent can help with film-forming properties of a paint or coating, as in the formulation examples shown in Table 19.

TABLE 19

Sample pigment dispersion formulations

| Component | Ex. 229 | Ex. 230 |
|---|---|---|
| farnesol-PGE(5)-EO(40) | 6% | 6% |
| BYK-024 defoamer | 1% | 1% |
| CINQUASIA ® Red pigment L4100 HD | 40% | 40% |
| butyl acetate | 1.3% | — |
| propylene glycol | — | 4.8% |
| NEOLONE ® M-10 biocide | 0.1% | 0.1% |
| water | q.s. to 100 wt. % | q.s. to 100 wt. % |
| dispersion viscosity (cP at 10 s$^{-1}$) | 404 | 2390 |

TABLE 20

Blocking resistance results

| Ex. | Dispersant | Blocking resistance rating with monoazo yellow pigment dispersion | Blocking resistance rating with quinacridone violet pigment dispersion |
|---|---|---|---|
| C231* | TEGO ® 755W (Evonik) | 7.3 | 9.0 |
| 232 | triethanolamine-PGE(18)-EO(105) | 8.0 | 9.0 |

*Comparative example

TABLE 21

Color strength for an oil-based paint tinted with 3 different types of pigment dispersions

| Ex. | Dispersant | Yellow[1] Chroma, C | Red[2] Chroma, C | Blue[3] Chroma, C |
|---|---|---|---|---|
| C233* | DISPERBYK ®-190 | 54.4 | 21.6 | 35.2 |
| 234 | resorcinol DGE-1-dodecanethiol(2)-PGE(10)-EO(80) | 61.1 | 32.4 | 34.6 |
| 235 | resorcinol DGE-1-dodecanethiol(2)-PGE(10)-EO(100) | NA | 36.4 | 34.2 |
| 236 | triethanolamine-EHGE(3)-PGE(15)-EO(120) | 59.2 | 35.2 | 39.6 |
| 237 | triethanolamine-PGE(15)-EO(90) | 63.2 | 26.2 | 35.8 |
| 238 | trimethylolpropane-PGE(16)-GE(3)-EO(240) | NA | NA | 44.0 |
| 239 | Blend of resorcinol-DGE 1-dodecanethiol(2)-TSP-GE(2)-EO(100) and trimethylolpropane-PGE(15)-GE(3)-EO(120) @ 3/1 | 64.5 | 39.7 | 41.3 |

*Comparative example

[1] 2.5 wt. % dispersant & 50 wt. % monoazo yellow pigment dispersion.
[2] 1.6 wt. % dispersant & 40 wt. % quinacridone violet pigment dispersion.
[3] 4 wt. % dispersant & 40 wt. % phthalocyanine blue (15:2) pigment dispersion.

Performance in Agricultural Formulations

1. Wettable Powders

The inventive copolymers are evaluated as dispersants for wettable powder formulations with three agricultural actives: atrazine, chlorothalonil, and imidacloprid.

Samples are prepared by combining 80 to 95 wt. % agricultural active, 0.1 to 5 wt. % wetting agent, and 0-10 wt. % additives (e.g., antifoaming agent, clay). The mixture is milled to a desired particle size (5-30 µm). A dispersant solution is made by combining the polymeric dispersant (0.1 g) with water (50 mL). The milled actives formulation (1.0 g) is added to the dispersant solution, and the resulting mixture is diluted to volume in a 100-mL graduated cylinder. The cylinder is inverted 15 times and evaluated after 0.5 h, 1 h, 2 h, and 24 h for degree of separation. Results appear in Table 22. In each case, the inventive copolymer performs about as well as the control surfactant, STEPFAC® TSP-PE N (a tristyrylphenol ethoxylate phosphate salt).

Formulations:
- a. Atrazine (92.0 wt. %); STEPWET® DF-90 wetting agent (product of Stepan, 1.0 wt. %); dispersant (7.0 wt. %, see Table 22).
- b. Chlorothalonil (92.8 wt. %); STEPWET® DF-90 wetting agent (1.0 wt. %); dispersant (6.2 wt. %, see Table 22).
- c. Imidacloprid (73.7 wt. %); STEPWET® DF-95 wetting agent (product of Stepan, 0.5 wt. %); RUBBERSIL™ RS-200 precipitated silica (product of Glassven C.A., 0.5 wt. %); kaolin clay (19.3 wt. %); dispersant (6.0 wt. %, see Table 22).

2. Suspension Concentrates

The inventive copolymers are evaluated as dispersants for suspension concentrate formulations with two agricultural actives: tebuconazole and imidacloprid. The tebuconazole formulations are evaluated for initial and two-week suspensibility. All of the tested inventive copolymers perform well in this test. The imidacloprid samples are evaluated for two-week oven suspensibility and freeze-thaw (five cycles) suspensibility.

The suspension concentrates are prepared by combining the copolymer dispersant (0.5 to 3.5 wt. %), agricultural active (20 to 60 wt. %), additives (e.g. rheology modifier, antifoam agent, antifreeze agent, biocide; 0.1 to 10 wt. %), and water (25 to 75 wt. %). The proportion of dispersant solids to active ingredient can vary over a wide range and depends on the nature of the dispersant, the nature of the active ingredient, and other factors. Preferably, the active ingredient is added last to the other formulation components. In general, the formulation components are wet milled to the desired d50 particle size of 1-3 µm. The rheology modifier can be incorporated following the milling process.

Formulations:
- a. Tebuconazole (45.0 wt. %); STEPFLOW® 26F wetting agent (product of Stepan, 1.0 wt. %); dispersant (2.0 wt. %); SAG™ 1572 antifoam agent (product of Momentive Performance Materials, 0.20 wt. %), propylene glycol (5.0 wt. %), 2% xanthan solution (10.0 wt. %), and water (36.8 wt. %).
- b. Imidacloprid (20.0 wt. %; STEPFLOW® 26F wetting agent (1.3 wt. %); dispersant (2.70 wt. %); SAG™ 1572 antifoam agent (0.20 wt. %); propylene glycol (5.0 wt. %); 2% xanthan solution (10.0 wt. %), TOXIMUL® 8240 nonionic surfactant (product of Stepan, 2.0 wt. %); and water (58.8 wt. %).

Suspensibility Evaluation

A suspension concentrate formulation (10 g) is added to a 250-mL graduated cylinder containing 1000 ppm TDS water (200 mL). The sample is diluted to volume and inverted 15 times. After 0.5 h, the top 225 mL is removed using a vacuum apparatus. The remaining solution is transferred to a tared dish and allowed to dry for the weight measurement of non-suspended solids. In addition, a sample of the suspension concentrate formulation is measured for solids content using a 50° C. oven to identify the percentage of solids suspended in the diluted solution. Results appear in Table 23.

TABLE 22

Evaluation of Copolymers as Dispersants for Wettable Powder Formulations

| | | % Separation after 24 h | | |
|---|---|---|---|---|
| Ex. | Dispersant | atrazine | chlorothalonil | imidacloprid |
| | blank (no dispersant) | 12.0 | 11.0 | 5.5 |
| C240* | STEPFAC ® TSP-PE N* | 2.0 | 2.0 | 2.0 |
| C241* | butanol-PGE(5)-EO(40)* | 2.0 | 2.0 | 2.0 |
| 242 | benzylamine-PGE(10)-EO(80) | 2.5 to 3.0 | 1.5 | 2.0 |
| 243 | bisphenol S-PGE(10)-EO(80) | 2.5 | 1.5 | 2.5 |
| 244 | farnesol-PGE(5)-EO(40) | 2.0 | 2.0 | 1.5 to 2.0 |
| 245 | morpholine-PGE(5)-EO(30) | 2.0 to 2.5 | 2.0 to 2.5 | 2.0 to 2.5 |
| 246 | morpholine-PGE(5)-EO(40) | 2.0 | 2.0 | 2.0 |
| 247 | 1,8-octanediol-PGE(10)-EO(80) | 2.0 to 2.5 | 1.5 | 2.0 |
| 248 | 1,3-propanediol-PGE(10)-EO(80) | 2.5 | 1.5 | 2.0 |
| 249 | resorcinol-PGE(10)-EO(80) | 2.0 to 2.5 | 1.5 | 2.0 |
| 250 | thiophenol-PGE(5)-EO(40) | 2.0 to 2.5 | 2.0 | 2.0 |

*Comparative examples

TABLE 23

Evaluation of Copolymers as Dispersants for Suspension Concentrate Formulations

| | | tebuconazole | | imidacloprid | |
|---|---|---|---|---|---|
| Ex. | Dispersant | initial suspensibility (%) | 2-week oven suspensibility (%) | 2-week oven suspensibility (%) | freeze/thaw suspensibility (%) |
| C251* | STEOL ® TSP 16N* | 94.3 | 89.6 | 98.1 | 98.8 |
| 252 | butanol-PGE(5)-EO(40)* | 96.3 | 89.6 | 98.5 | 94.0 |
| 253 | benzylamine-PGE(10)-EO(80) | 92.3 | 92.3 | 94.8 | 97.4 |
| 254 | bisphenol S-PGE(10)-EO(80) | 95.9 | 89.4 | 94.0 | 97.3 |
| 255 | farnesol-PGE(5)-EO(40) | 95.1 | 91.4 | 96.3 | 97.1 |
| 256 | morpholine-PGE(5)-EO(30) | 95.8 | 89.3 | 95.8 | 99.1 |
| 257 | morpholine-PGE(5)-EO(40) | 96.9 | 91.9 | 95.9 | 96.4 |
| 258 | 1,8-octanediol-PGE(10)-EO(80) | 96.0 | 89.3 | 96.2 | 96.9 |
| 259 | 1,3-propanediol-PGE(10)-EO(80) | 96.3 | 89.6 | 89.2 | 98.0 |
| 260 | resorcinol-PGE(10)-EO(80) | 95.9 | 89.3 | 94.4 | 96.4 |
| 261 | thiophenol-PGE(5)-EO(40) | 95.7 | 88.7 | 100 | 97.6 |

*Comparative example

The preceding examples are illustrations only; the following claims define the scope of the invention.

We claim:

1. A dispersion comprising a pigment, water, a pH adjusting agent, and a copolymer comprising a reaction product of:
   (a) a polyhydroxyl nucleophilic initiator selected from the group consisting of alcohols, phenols, and deprotonated species thereof, the initiator containing from 2 to 6 nucleophilic moieties;
   (b) from 1 to 30 recurring units per active hydrogen equivalent of the initiator of a phenyl glycidyl ether; and
   (c) from 1 to 100 recurring units per active hydrogen equivalent of the initiator of one or more alkylene oxides (AO) selected from the group consisting of ethylene oxide, propylene oxide, butylene oxides, and combinations thereof;
   wherein the copolymer comprises 20 to 60 wt. % of the phenyl glycidyl ether recurring units based on the combined amounts of the phenyl glycidyl ether and AO recurring units, and the copolymer comprises branches wherein a branch is defined as a segment of the copolymer composed of a block of phenyl glycidyl ether followed by a block of AO units, the number of branches being an integer and uniformly equal to the number of nucleophilic moieties; and
   wherein the copolymer has a number-average molecular weight within the range of 1,900 to 56,000 g/mol.

2. The dispersion of claim 1 wherein the pigment is an organic pigment selected from the group consisting of monoazos, diazos, anthraquinones, anthrapyrimidines, quinacridones, quinophthalones, dioxazines, flavanthrones, indanthrones, isoindolines, isoindolinones, metal complexes, perinones, perylenes, phthalocyanines, pyranthrones, thioindigos, triphenylmethanes, anilines, benzimidazolones, diarylides, diketopyrrolopyrroles, naphthols, and aldazines.

3. The dispersion of claim 1 wherein the pigment is an inorganic pigment selected from the group consisting of white pigments, black pigments, chromatic pigments, and luster pigments.

4. A wettable polymer composition comprising 80 to 95 wt. % of at least one agricultural active, 0.1 to 5 wt. % of an anionic surfactant, and 1 to 20 wt. % of a copolymer comprising a reaction product of:
   (a) a polyhydroxyl nucleophilic initiator selected from the group consisting of alcohols, phenols, and deprotonated species thereof, the initiator containing from 2 to 6 nucleophilic moieties;
   (b) from 1 to 30 recurring units per active hydrogen equivalent of the initiator of a phenyl glycidyl ether; and
   (c) from 1 to 100 recurring units per active hydrogen equivalent of the initiator of one or more alkylene oxides (AO) selected from the group consisting of ethylene oxide, propylene oxide, butylene oxides, and combinations thereof;
   wherein the copolymer comprises 20 to 60 wt. % of the phenyl glycidyl ether recurring units based on the combined amounts of the phenyl glycidyl ether and AO recurring units, and the copolymer comprises branches wherein a branch is defined as a segment of the copolymer composed of a block of phenyl glycidyl ether followed by a block of AO units, the number of branches being an integer and uniformly equal to the number of nucleophilic moieties; and
   wherein the copolymer has a number-average molecular weight within the range of 1,900 to 56,000 g/mol.

5. A suspension concentrate comprising 20 to 60 wt. % of at least one agricultural active, 25 to 75 wt. % of water, and 0.5 to 3.5 wt. % of a copolymer comprising a reaction product of:
   (a) a polyhydroxyl nucleophilic initiator selected from the group consisting of alcohols, phenols, and deprotonated species thereof, the initiator containing from 2 to 6 nucleophilic moieties;
   (b) from 1 to 30 recurring units per active hydrogen equivalent of the initiator of a phenyl glycidyl ether; and
   (c) from 1 to 100 recurring units per active hydrogen equivalent of the initiator of one or more alkylene oxides (AO) selected from the group consisting of ethylene oxide, propylene oxide, butylene oxides, and combinations thereof;
   wherein the copolymer comprises 20 to 60 wt. % of the phenyl glycidyl ether recurring units based on the combined amounts of the phenyl glycidyl ether and AO recurring units, and the copolymer comprises branches wherein a branch is defined as a segment of the copolymer composed of a block of phenyl glycidyl ether followed by a block of AO units, the number of branches being an integer and uniformly equal to the number of nucleophilic moieties; and wherein the copolymer has a number-average molecular weight within the range of 1,900 to 56,000 g/mol.

6. A water-dispersible granule or a seed coating comprising an agricultural active and a copolymer comprising a reaction product of:
(a) a polyhydroxyl nucleophilic initiator selected from the group consisting of alcohols, phenols, and deprotonated species thereof, the initiator containing from 2 to 6 nucleophilic moieties;
(b) from 1 to 30 recurring units per active hydrogen equivalent of the initiator of a phenyl glycidyl ether; and
(c) from 1 to 100 recurring units per active hydrogen equivalent of the initiator of one or more alkylene oxides (AO) selected from the group consisting of ethylene oxide, propylene oxide, butylene oxides, and combinations thereof;

wherein the copolymer comprises 20 to 60 wt. % of the phenyl glycidyl ether recurring units based on the combined amounts of the phenyl glycidyl ether and AO recurring units, and the copolymer comprises branches wherein a branch is defined as a segment of the copolymer composed of a block of phenyl glycidyl ether followed by a block of AO units, the number of branches being an integer and uniformly equal to the number of nucleophilic moieties; and wherein the copolymer has a number-average molecular weight within the range of 1,900 to 56,000 g/mol.

* * * * *